(12) United States Patent
Pesach

(10) Patent No.: US 7,891,721 B2
(45) Date of Patent: Feb. 22, 2011

(54) CAR BABY SEAT

(75) Inventor: Gidon Pesach, 40200 Kfar Vitkin (IL)

(73) Assignees: Gidon Pesach, Kfar Vitkin (IL); Zadok Fuerst, Meitar (IL)

( * ) Notice: Subject to any disclaimer, the term of this patent is extended or adjusted under 35 U.S.C. 154(b) by 668 days.

(21) Appl. No.: 11/884,301

(22) PCT Filed: Feb. 16, 2006

(86) PCT No.: PCT/IL2006/000206

§ 371 (c)(1),
(2), (4) Date: Aug. 14, 2007

(87) PCT Pub. No.: WO2006/087719

PCT Pub. Date: Aug. 24, 2006

(65) Prior Publication Data

US 2008/0211279 A1    Sep. 4, 2008

(30) Foreign Application Priority Data

Feb. 17, 2005  (IL) .................................. 166957
Aug. 1, 2005   (IL) .................................. 170021

(51) Int. Cl.
*B60J 7/00* (2006.01)

(52) U.S. Cl. ................ 296/65.11; 296/68.1; 296/65.05; 297/256.1; 297/256.12; 297/256.14

(58) Field of Classification Search .................. 296/63, 296/64, 65.01, 68.1, 65.05, 65.11, 65.12; 297/250.1, 256.1, 256.12, 256.14

See application file for complete search history.

(56) References Cited

U.S. PATENT DOCUMENTS

| 4,664,443 | A | 5/1987 | Casale et al. |
| 4,902,070 | A | 2/1990 | Casale et al. |
| 5,588,700 | A | 12/1996 | Homier et al. |
| 6,199,949 | B1 | 3/2001 | DaSilva |
| 6,283,545 | B1 | 9/2001 | Ernst |
| 6,572,189 | B1 | 6/2003 | Blaymore |
| 7,070,239 | B1 * | 7/2006 | Ugrekhelidze et al. ...... 297/238 |
| 7,364,213 | B2 * | 4/2008 | Romolo ..................... 296/68.1 |

FOREIGN PATENT DOCUMENTS

EP    1 354 753    10/2003

* cited by examiner

*Primary Examiner*—Joseph D Pape
(74) *Attorney, Agent, or Firm*—Roach Brown McCarthy & Gruber, P.C.; Kevin D. McCarthy

(57) ABSTRACT

The present invention relates to a car baby seat system, which comprises: (a) a baby seat; (b) a supporting device for the baby seat; (c) positioning mechanism associated with said supporting device and baby seat, for transversally moving the supporting device and baby seat along the rear passengers' seat between at least three states, a safe center-car state, a side-car state, and a loading/unloading state, wherein in the loading/unloading state the baby seat is positioned by said mechanism at least partially outside the car in a rotated orientation relative to the normal use orientation, thereby enabling convenience of loading and unloading of the baby, and additional space for rotation.

29 Claims, 47 Drawing Sheets

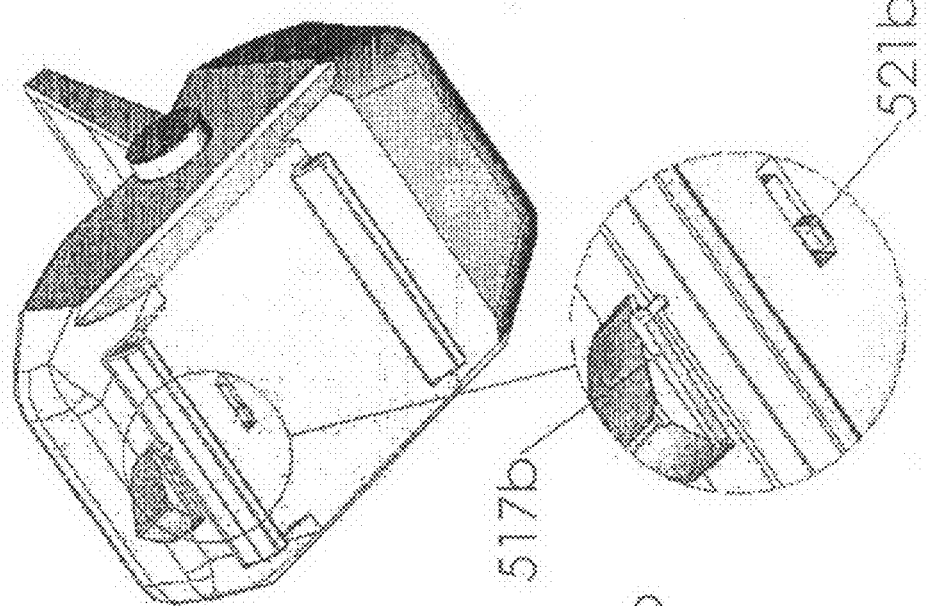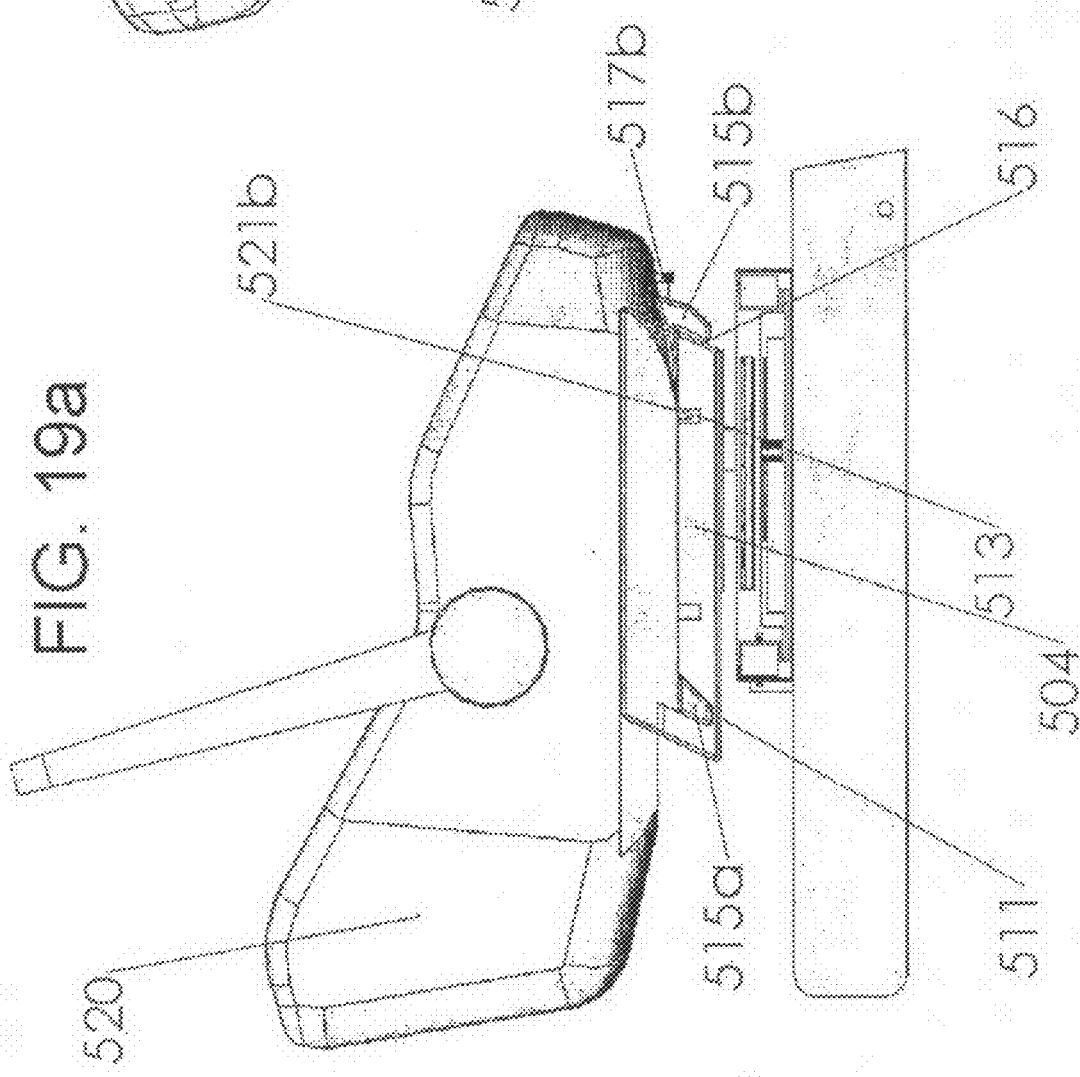

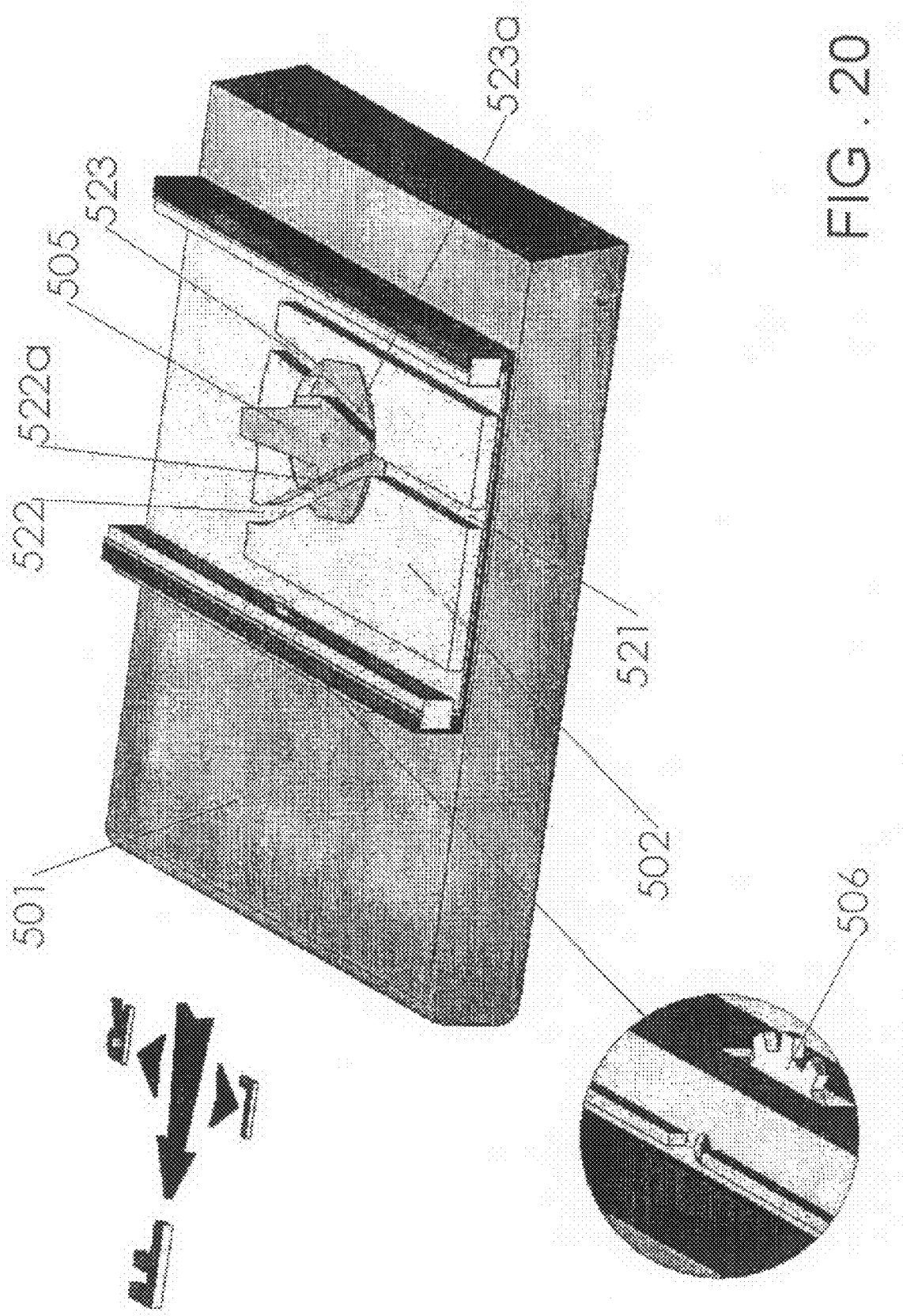

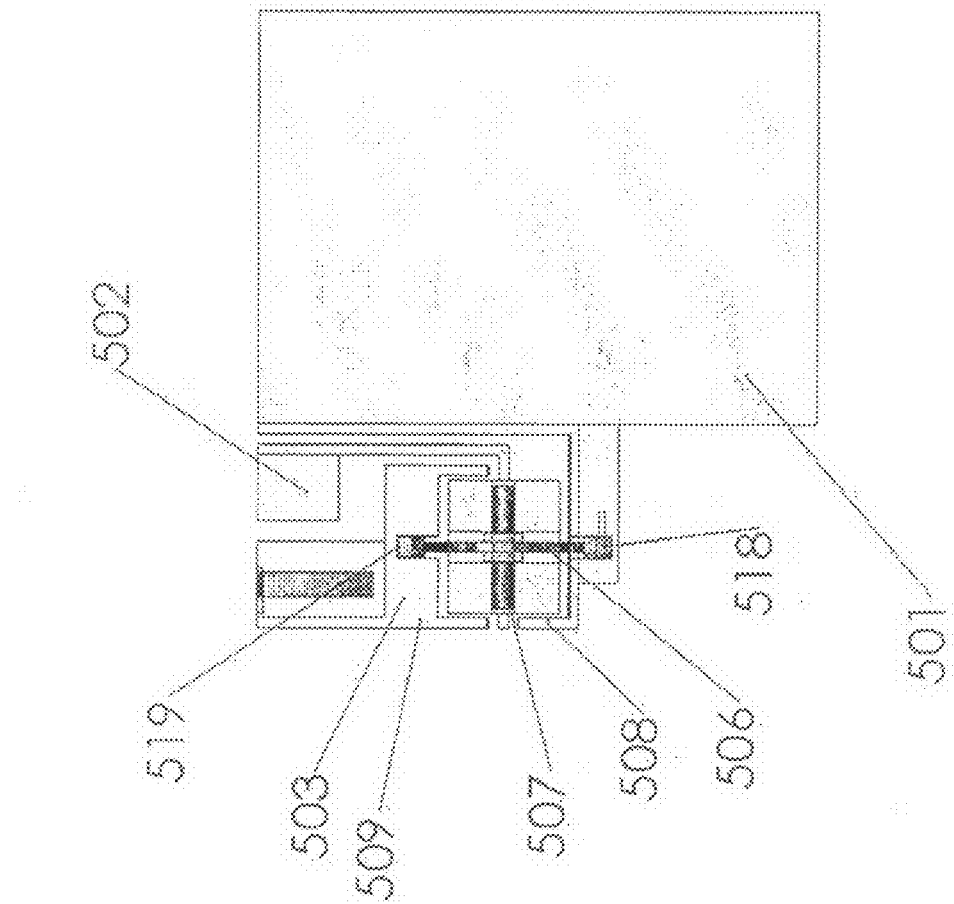
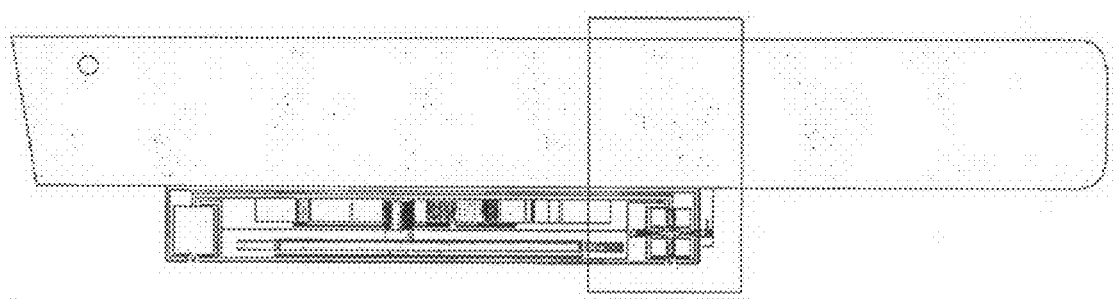
FIG. 21a

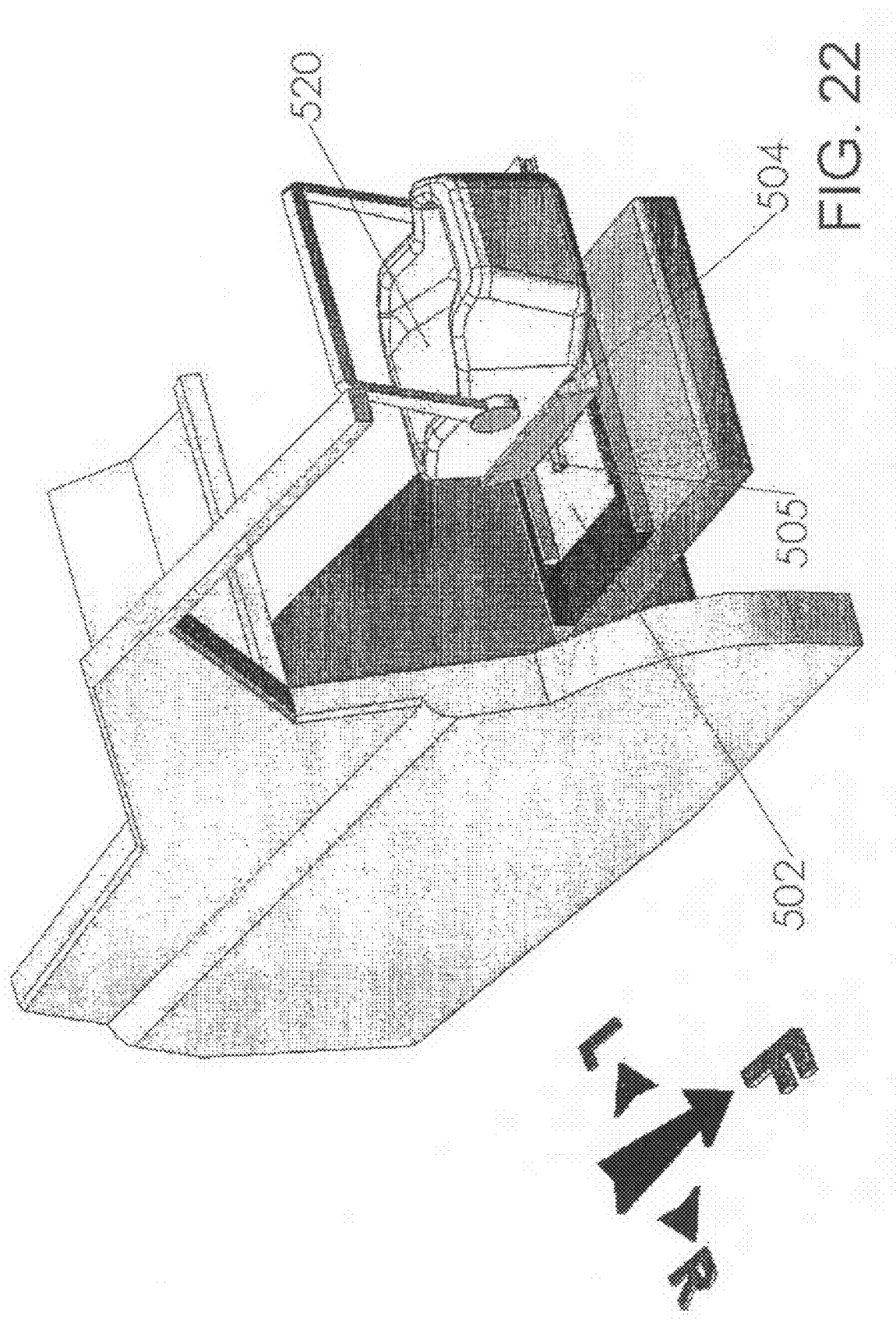

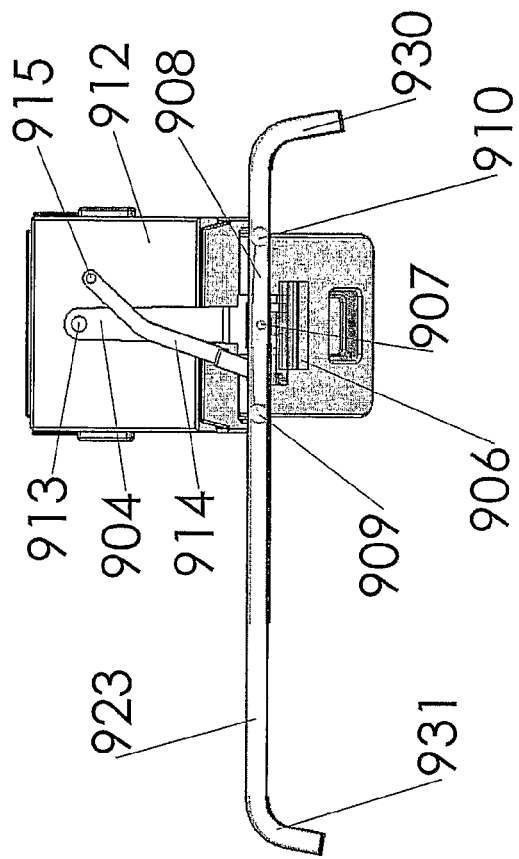
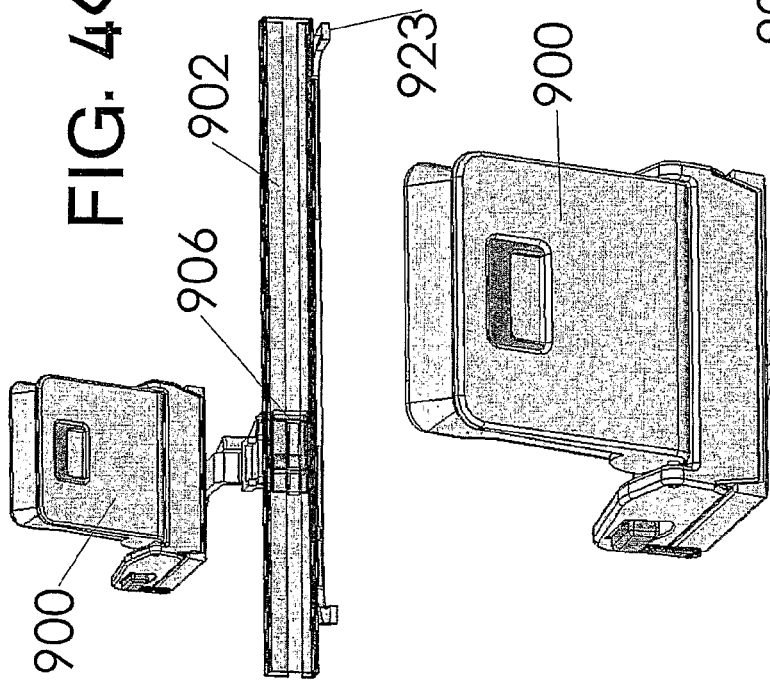
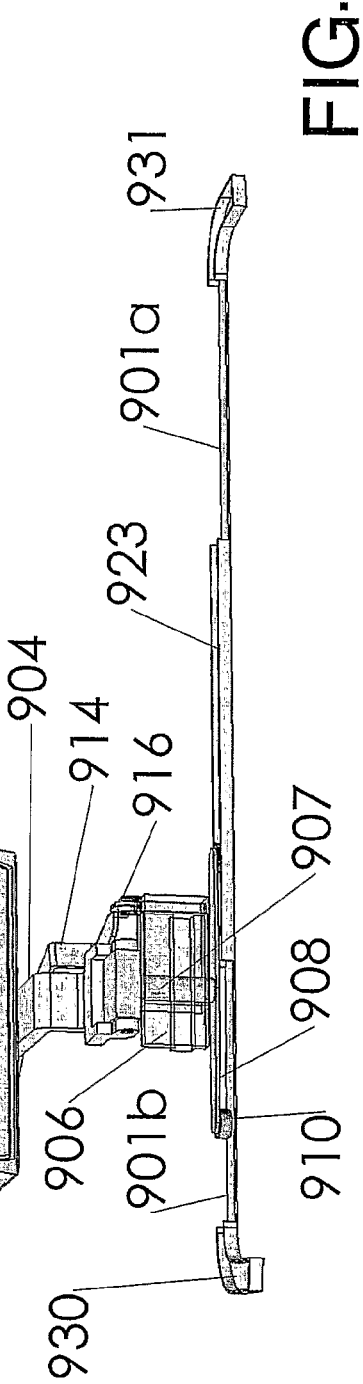

CAR BABY SEAT

CLAIM OF PRIORITY

This application claims priority to PCT/IL2006/000206 filed on Feb. 16, 2006, which claims priority to Israeli patent application serial number 166957, filed Feb. 17, 2005 and Israeli patent application serial number 170021, filed Aug. 1, 2005.

FIELD OF THE INVENTION

The present invention relates to a baby car seat. More particularly, the present invention relates to a car seat for a baby or infant, which is more comfortable for use by the baby and parent, and safer in a case of accident.

BACKGROUND OF THE INVENTION

Safety regulations in most countries require babies and young children to be seated in a special car seat. In general, there is a first type of car seat for infants up to the age of 9-12 months, a second type for babies up to the age of 3-4 years, and a third type of seat for young children in the age of 4-8 years. The first embodiment of the present invention relates to a car seat of said second type, i.e., for babies in the age of 1-4 years. The second embodiment of the invention relates to a car seat system which enables alternative use and replacement between said first type of seat (i.e., infants up to the age of 12 months) and said second type of seat (for older babies of the age of 1-4 years old). The third embodiment of the present invention relates to a baby seat which occupies a minimal space in normal use state, and which is easily foldable into the car trunk during a storage state.

There are various types of car seats for babies. A most conventional baby seat is a separate seat that is positioned on the back (or front) seat of the car, and maintained in place by means of the car safety belts. The baby himself is kept within his seat by means of another set of safety belts that are part of the baby seat. Said type of baby seat provides safety to the baby, while it still occupies the space of one passenger, as long as it is installed in the car. Generally, said conventional baby seat is relatively big and cumbersome, and its release from the belts is not so an easy task. Moreover, these seats are generally installed close to one of the car doors, as otherwise, when the seat is installed at the center of the rear passengers' seat, the positioning and removal of the baby into and out of the seat becomes a relatively hard task. Furthermore, in said conventional seats there are some cases in which the car safety belts are not properly connected to the baby seat, or unintentionally unlocked, therefore introducing a risk to the baby safety in case of an accident. Some efforts have been made in order to provide a car baby seat that is less cumbersome, which enables easier removal, or folding of the seat for enabling a regular passenger to sit instead. For example. U.S. Pat. No. 4,902,070 and U.S. Pat. No. 4,664,443 disclose a foldable car baby seat which is an integral part of the back of the passenger seat. Such a seat provides a relatively easy transformation from a "baby" mode to a "passenger" mode and saves the storage space that is occupied by the conventional baby seat (when not in use).

EP 1,354,753 discloses still another baby seat system. The system comprises a base, a carriage adapted to receive a baby seat, and an extendable mechanism attaching said carriage to said base, the extendable mechanism is adapted to move the carriage to an outboard passenger loading position (but still inside the car), and to passenger riding position. Said publication proposes locating the base at the center of the car for safety reasons, and extending the extendable mechanism toward the side door of the car for loading or unloading the baby. This system further proposes rotating the carriage during the loading or unloading for convenience of the parent. However, as the carriage is located within the car, the rotation of the carriage and baby seat requires at least a distance of W/2 from the front of the back support of the rear passengers' seat, and at least a distance of W/2 from the rear side of the back support of the driver seat (or from the back of the front passenger seat, as is applicable) in order to enable the rotation of the baby seat or carriage, wherein W is the width of the carriage or of the baby seat—whichever is the largest. Both of said two conditions have to be satisfied together in order to enable rotation. However, such conditions cannot normally be satisfied in view of the length of the baby seat. The present invention overcomes this limitation by providing extensions that perform the rotation of the baby seat at least partially outside the car space of the car. Moreover, even when such two conditions are satisfied, the loading and unloading of a baby within the car space, as is proposed in said publication is less convenient in comparison with the present invention in which the loading and downloading are performed at least partially outside the space of the car. Furthermore, the present invention suggest a transversal linear movement of the baby seat, which when approaching close to the car door is synchronized with rotation of the baby seat in order to enable easy loading and unloading of the baby outside of the car space.

U.S. Pat. No. 6,572,189 discloses a baby seat system which is positioned proximate to the side door, not at the center of the car. This system, which proposes rotating the baby seat by means of a side, off center vertical axis, requires a distance of W from the rear side of the back support of the driver seat. Furthermore, the loading and unloading of the baby is carried out when the baby seat is rotated 90 degrees relative to the longitudinal axis of the car, and when located fully inside the car. Such a position and orientation, although convenient in cars having a door which is slides on rails for opening, is inconvenient for most family cars in which the door has a one vertical axle for opening, and in which the opening angle is limited to about 45-60 degrees.

There are two main problems associated with the baby seats of the prior art. A first problem involves in the safety of the baby. Most of the prior art baby seats are generally installed by the parents (in the case of the conventional seats) or located (in the case of said integral type) at the side of the back passenger seat. The reason for such positioning involves the comfort of the parents. Generally, it is relatively complicated for the parent to position the baby in his seat when the seat is located at the center of the back passenger seat, a relatively long distance away from the car door. However, there is no doubt that locating the baby at the side of the car, close to the door reduces his safety in case of a side impact due to an accident. Furthermore, locating the baby at the center of the car has still another advantage, by enabling the driver to easily view and supervise the baby using the car mirror, which cannot be carried out when the baby seat is positioned proximate to the car door.

A second problem involves the comfort of the parent while positioning (i.e., loading or unloading) the baby in his seat. Generally, it is very uncomfortable for the parent to put the baby at his seat, when the seat is inside the car, facing the front of the car (babies in the age of 1-4 years old) or the rear of the car (infants up to 12 months old). This problem is particularly due to the fact that the parent has to hold the baby by one of his hands, and therefore has only one free hand by which he can operate. The present invention solves also this problem, by making the loading of the baby into his seat to be simpler, and much more comfortable for the parent.

It is an object of the present invention to enable easy positioning of the baby seat at the center of the rear passengers' seat, thereby to significantly increase the safety of the baby. It is another object to achieve this goal without sacrificing the parent comfort while positioning the baby in his seat.

It is still another object of the invention to provide a baby seat which can move from a position at the side of the car back passengers' seat to a position at the center of the car rear passengers' seat.

It is still another object of the present invention to enable much easier loading or unloading of the baby into or out of his seat. This object is achieved by the providing of rails to which the baby seat is attached, an arrangement that enables pulling the car seat to a location out of the car space. Moreover, when out of the car space, the baby seat rotates to face the parent to provide even more comfort to the parent.

It is still another object of the present invention to provide a baby seat that occupies less space than the conventional baby seats, when not in use.

It is still another object of the invention to provide an easy transformation of the car rear passengers' seat between a "baby" mode and "adult passenger" mode.

It is still another embodiment of the present invention to provide a baby seat system which occupies during normal baby use a minimal passengers' space of the rear passengers' seat, and no space of the rear passenger's seat during storage state of the baby car seat, while maintaining very easy transformation between said two states.

It is still another object of the present invention to provide said baby seat which has all the above advantages, and which also enables replacement between an infant seat, and an older baby seat.

Other objects of the present invention will become apparent as the description proceeds.

SUMMARY OF THE INVENTION

The present invention relates to a car baby seat system, which comprises: (a) a baby seat; (b) a supporting device for the baby seat; (c) positioning mechanism associated with said supporting device and baby seat, for transversally moving the supporting device and baby seat along the rear passengers' seat between at least three states, a safe center-car state, a side-car state, and a loading/unloading state, wherein in the loading/unloading state the baby seat is positioned by said mechanism at least partially outside the car in a rotated orientation relative to the normal use orientation, thereby enabling convenience of loading and unloading of the baby, and additional space for rotation.

Preferably, in the loading/unloading state at least 25% of the baby seat is positioned outside of the car space.

Preferably, when a transversal movement is applied to the supporting device and baby seat, and when approaching said loading/unloading state, said positioning mechanism provides to said baby seat a transversal movement synchronized with a rotation movement until finally reaching said loading/unloading state at least partially out of the car space.

Preferably, in the loading/unloading state the rotated orientation of the baby seat is between 25° and 90° relative to the car's longitudinal direction.

Preferably, said positioning mechanism is adapted to move the baby seat to a fourth, storage state in which the baby seat being positioned within the trunk of the car.

Preferably, the baby seat is foldable, and in the storage state said positioning mechanism positions the baby seat within the trunk in a folded configuration.

Preferably, said positioning mechanism and said supporting device are included within a base, wherein said base is positioned on top of the rear surface of one of the back support portions of the rear passengers' seat while said back support portion is in its folded down state.

Preferably, said positioning mechanism is adapted to move the baby seat to a fourth, storage state in which the baby seat is positioned within the trunk of the car, and wherein said transfer of the baby seat to its storage state within the trunk involves the unfolding of the back support of the rear passengers' seat.

In a first embodiment of the invention the base is a multi-portion base, and at least one of its portions is stationary and positioned on top of the rear surface of a portion of the back support of the passengers' seat, when said seat portion being folded down, and wherein at least another portion of said multi-portion base is movable between said at least three states, a side car state, a center car state, and a loading/unloading state at least partially out of the car space.

Preferably, in said first embodiment the baby seat is supported by the base portion which is movable.

Preferably the base portion which is movable is connected to, and moves on rails.

Preferably, said stationary portion of the multi-portion base is positioned on top of the rear surface of a side portion of the back support of the passengers' seat.

Preferably, the system further comprises locking means for preventing relative movement between the stationary and moveable base portions while in normal, driving use.

Preferably, said movement and rotation is performed by means of providing at least one wheel having at least one roller connected thereto, and wherein said roller being maintained within at least one slot, and wherein the baby seat being connected to the wheel, and wherein rotation of the wheel causes a corresponding rotation of the baby seat.

Preferably, said rotation is obtained by means of providing a curve within the slot.

Preferably, the system further comprises a seat carriage connected to said movable base portion, said carriage being adapted for selectively receiving either a seat for an older baby or a seat for an infant.

Preferably, during driving with the older baby seat, the head of the baby faces the driving direction, and during driving with the infant seat, the head of the baby faces the rear of the car, opposite to the driving direction.

Preferably, the system further comprises a switch for causing a first direction of rotation when using an older baby seat, and an opposite direction of rotation when using an infant seat.

Preferably, the multi-portion base of the baby seat is supported by a base unit, wherein said base unit having a first portion which is connected to the bottom surface of the car trunk, and a second portion which is movable between two states, a normal use state in which it supports the baby seat within the passengers space of the car, and a storage state in which it maintains the baby seat within the space of the trunk.

In an additional embodiment of the invention, the supporting device is an arm which protrudes from the trunk into the passengers' space of the car through a transverse passengers' seat slot formed between the back support of the rear passengers' seat and the lower portion of said passengers' seat, said arm having a proximal end which supports the baby seat, and a distal end which is connected in the trunk to said positioning mechanism.

Preferably, said positioning mechanism in the trunk comprises:

a transversal plate attached to the trunk floor, said plate having at least one guiding slot adapted for accepting a carriage;

a carriage which is slidably connected to said plate, and adapted for performing a transversal guided movement along said at least one slot, said distal end of said arm being connected to said carriage thereby causing the arm to follow the carriage movement; and axial means within said carriage for enabling rotation of said distal end of said arm relative to said carriage about a vertical axis.

Preferably, the system further comprises axial means at the proximal end of said arm, for enabling rotation about a vertical axis of said baby seat relative to the proximal end of the arm.

Preferably, said guiding slot elongates along most of the width of the car.

Preferably, the system further comprises synchronizing means for causing a synchronized movement when approaching or leaving the loading/unloading state, in which transversal movement of the arm and rotation of the baby seat about said arm are simultaneously performed.

Preferably, the system further comprises horizontal axial means at the distal end of said arm, for enabling rotation of the arm about a horizontal axis, thereby transferring the system between a fourth, storage state in which said arm being in an essentially vertical orientation and the baby seat being positioned within the trunk, and between a normal use state in which the arm being in an essentially horizontal orientation, and the baby seat being positioned within the passengers' space of the car.

The invention also relates to a procedure for transferring a baby seat system according to said additional embodiment from a storage state within the trunk to a normal use state, which comprises the steps of: (a) folding down a first portion of the passengers' seat back support; (b) lowering the arm supporting the seat into an essentially horizontal orientation; (c) applying a transversal movement to said arm and supported seat to protrude through said seat slot which is formed between a second portion of the passengers' seat back support and the lower portion of said passengers' seat; and (d) unfolding said folded first portion of the passengers' seat back support to its normal state; (e) optionally, transversally moving the baby seat to a selected location, and locking it in said selected location.

Preferably, said first portion of the passengers' seat back support is a side portion, and wherein said second portion of the passengers' seat back support is a central portion.

Preferably, in said a normal use state the baby seat is positioned at the center of the passengers' seat.

The invention also relates to a procedure for loading a baby into a baby seat in a system according to said first embodiment, which comprises the steps of: (a) opening the car door; (b) unlocking, and then applying to the seat a transversal movement, which when approaching loading/unloading state performs a transversal movement synchronized with rotation of the baby seat until finally reaching the loading/unloading state at least partially out of the car; (c) loading the baby into the seat; (d) applying to the seat a transversal movement, which when leaving the loading/unloading state performs a transversal movement synchronized with rotation of the baby seat until reaching the normal use state inside the car, preferably at the center of the car; and (e) locking the seat at said position.

BRIEF DESCRIPTION OF THE DRAWINGS

In the Drawings:

FIG. 19a is a side view of the baby car seat system, with an infant seat, according to the second embodiment of the invention;

FIG. 19b is a bottom view of the infant seat according to the second embodiment of the invention;

FIG. 20 shows the switch of the base in its "older baby seat" state;

FIG. 21a provides a cross sectional view made along axis x-x.

FIG. 22 shows the car system according to the second embodiment of the invention in its middle-car state, while containing an infant seat;

FIG. 46*a* is a perspective view showing the system in its transitional state toward the center of the car;

FIG. 46*b* is a perspective view similar to the one of FIG. 46*a*, showing particularly the main rail and carriage; and FIG. 46*c* is a bottom view showing the system in its transitional state toward the center of the car;

DETAILED DESCRIPTION OF PREFERRED EMBODIMENTS

Figure 1:
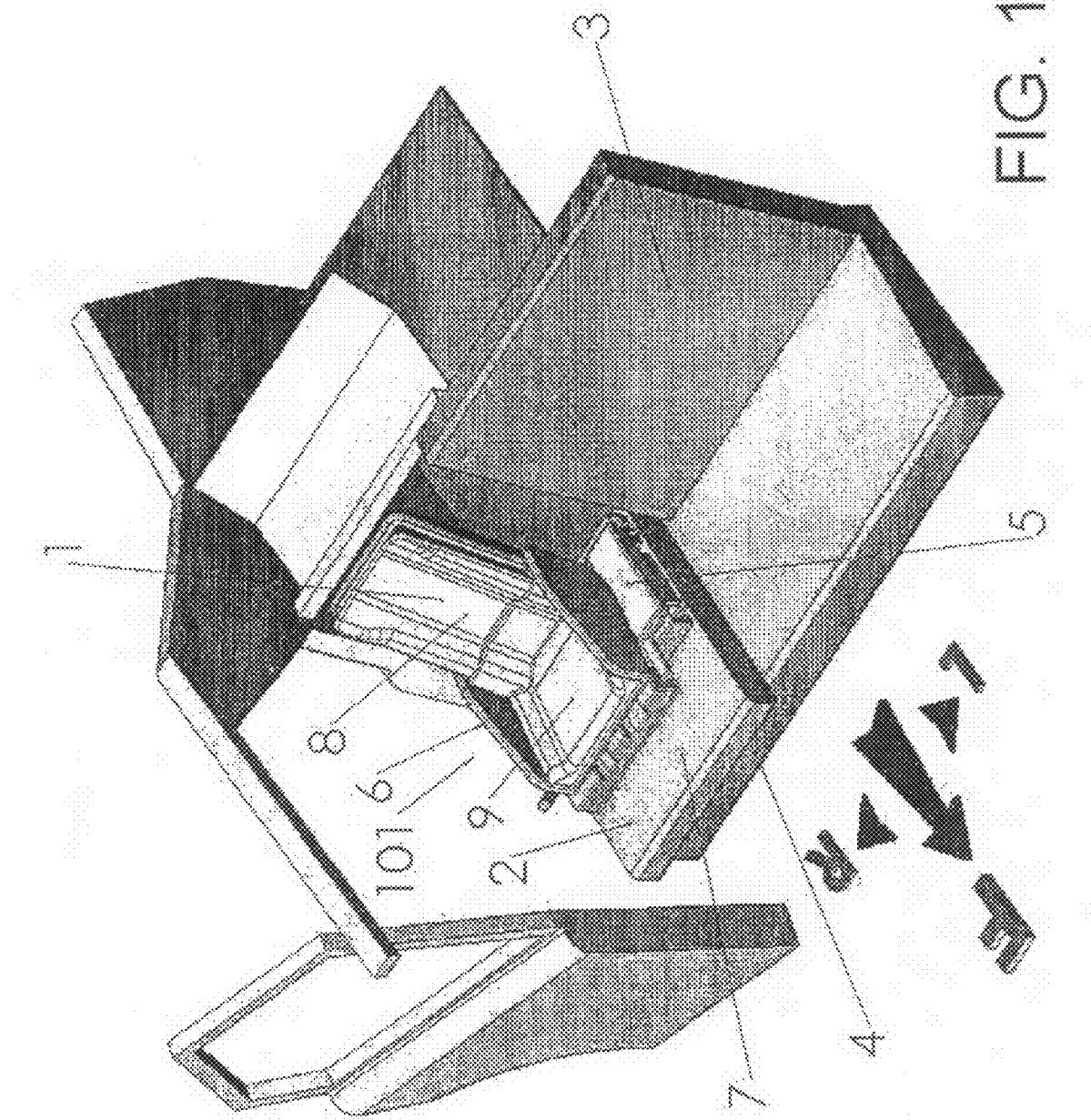
FIG. 1 is a general view of the baby car seat system according to a first embodiment of the present invention.

FIG. 1 generally shows the system 101 of the baby car seat according to an embodiment of the present invention. This embodiment of the baby seat system has two modes. A first, active mode in which the baby seat is ready for use, and a second, storage mode, in which the baby seat is not in use, and the back car passengers' seat is fully adapted for use by an adult. FIG. 1 shows the system 101 in its active mode. In the active mode, a portion 2 of the passenger back support 3 of the car back seat is folded from its conventional state to rest on the lower portion 4 of the back passengers seat. In the folded state, in which the system 101 is in active mode, the two portions 2 and 4 may be affixed together by some conventional attachment means (not shown), or not. The baby car seat 1 mainly comprises of two portions, a base 5, and the baby seat body 6. The baby seat system is mounted on the rear surface 7 of portion 2 of the back support of the rear passengers seat as shown. In a preferable embodiment of the invention, the baby seat 1 is also foldable. The back portion 8 of the baby seat 1 is connected to the lower portion 9 of the baby seat 1 by means of a transversal axle (not shown).

Figure 2:
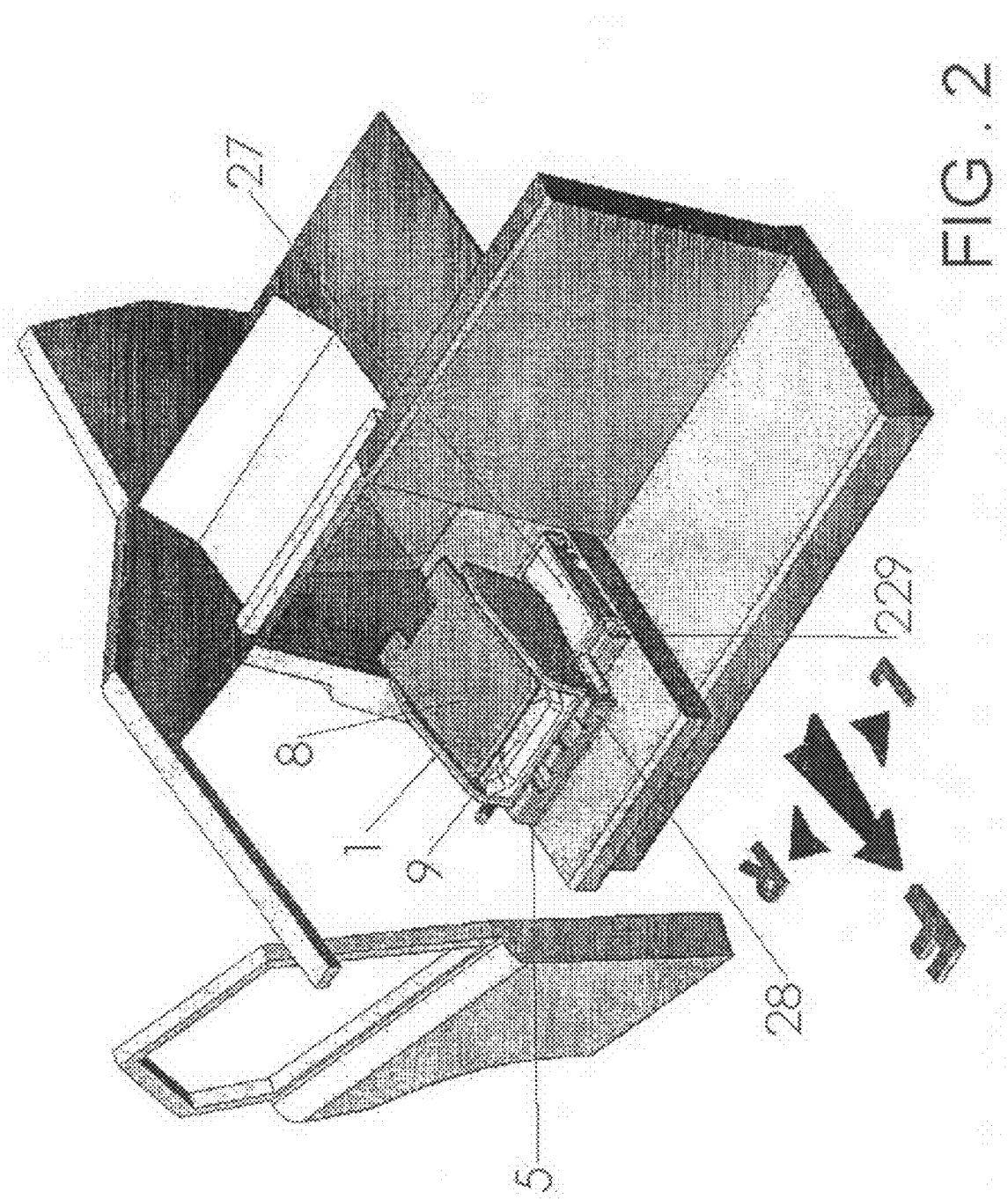
FIG. 2 shows the baby seat system of FIG. 1 in its folded state.

It should be noted herein that throughout this application the terms "longitudinal" and "transversal" are used in relation to the car forward moving direction (i.e., "longitudinal" is parallel to the car forward direction, and "transversal" is perpendicular to the car forward direction). The baby seat in its folded state is shown in FIG. 2.

Figure 3:
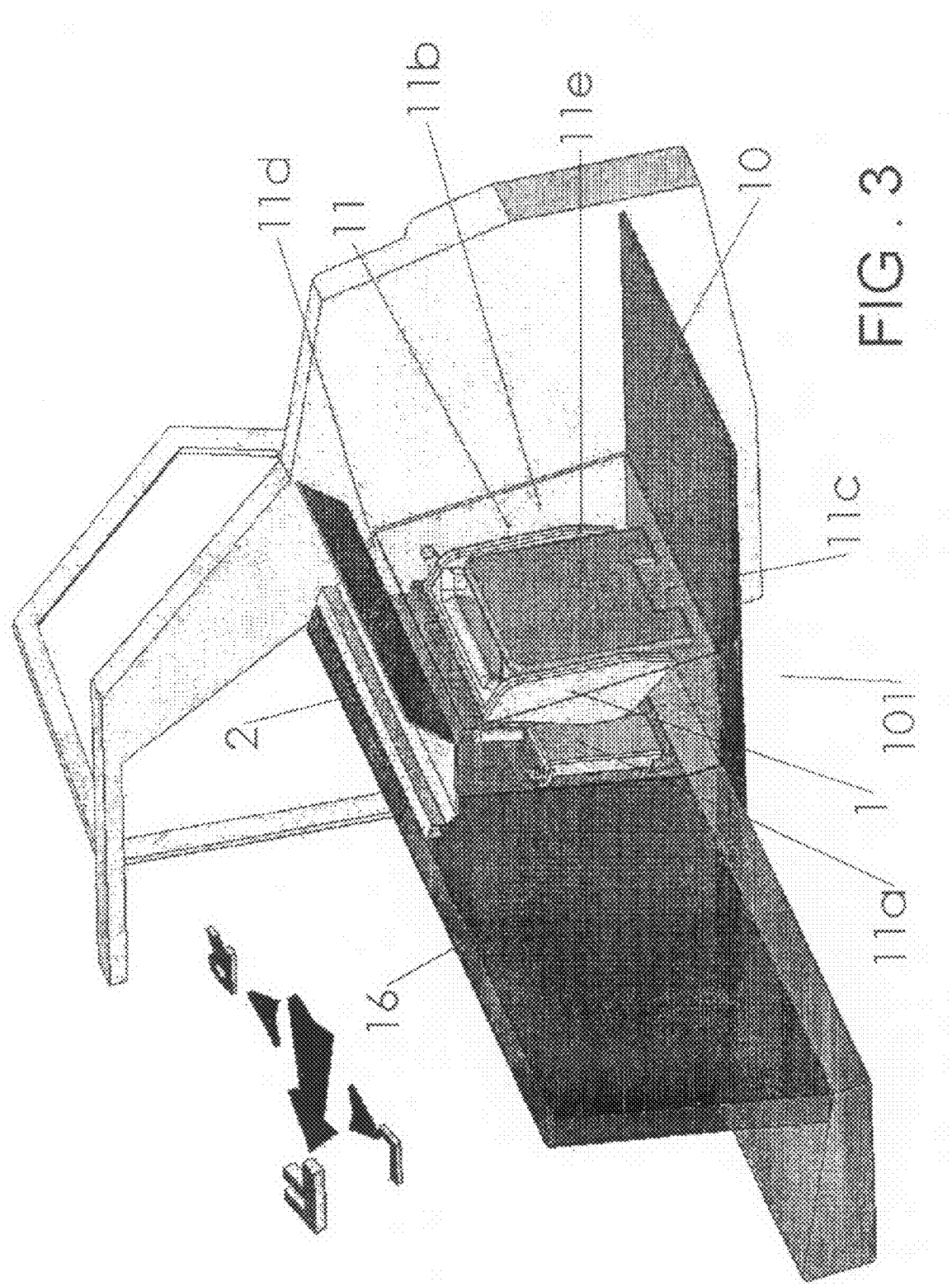
FIG. 3 shows the baby seat system of FIG. 1 in its storage state.

FIG. 3 shows the system 101 in its storage (inactive) mode. In the inactive mode, the portion 2 of the back support of the rear passengers seat is in its normal use state, thereby positioning the baby seat 1 in the trunk space 10 of the car. Preferably, in this mode the baby seat 1 is in its folded state, as shown in FIG. 3, therefore occupying a minimal space of the trunk. Furthermore, a storage box 11 may be provided to buffer between the baby seat and the rest of the trunk 10. The storage box 11 has one more object, i.e., to prevent smells from the trunk to enter the passengers' space of the car when the system is in its active mode. Still another object of box 11 is to eliminate the danger of the passengers of being hit by articles in the trunk, which may move during accident toward the passengers space of the car. The box 11 has 5 surfaces, left 11*a*, right 11*b*, bottom 11*c*, top 11*d*, and rear lie (not clearly seen due to transparency). In one variant of the invention, the storage box 11 is attached to the rear of the passengers' seat back support portion 16, a portion other than the portion back support 2 to which seat system 101 is affixed. In this manner the box remains in its place even when the back support 2 together with baby seat 1 is folded. Another option for maintaining the box 11 in this place is to anchor the box to the bottom floor of the trunk 10, or to another rigid point within the trunk 10.

Figure 4:
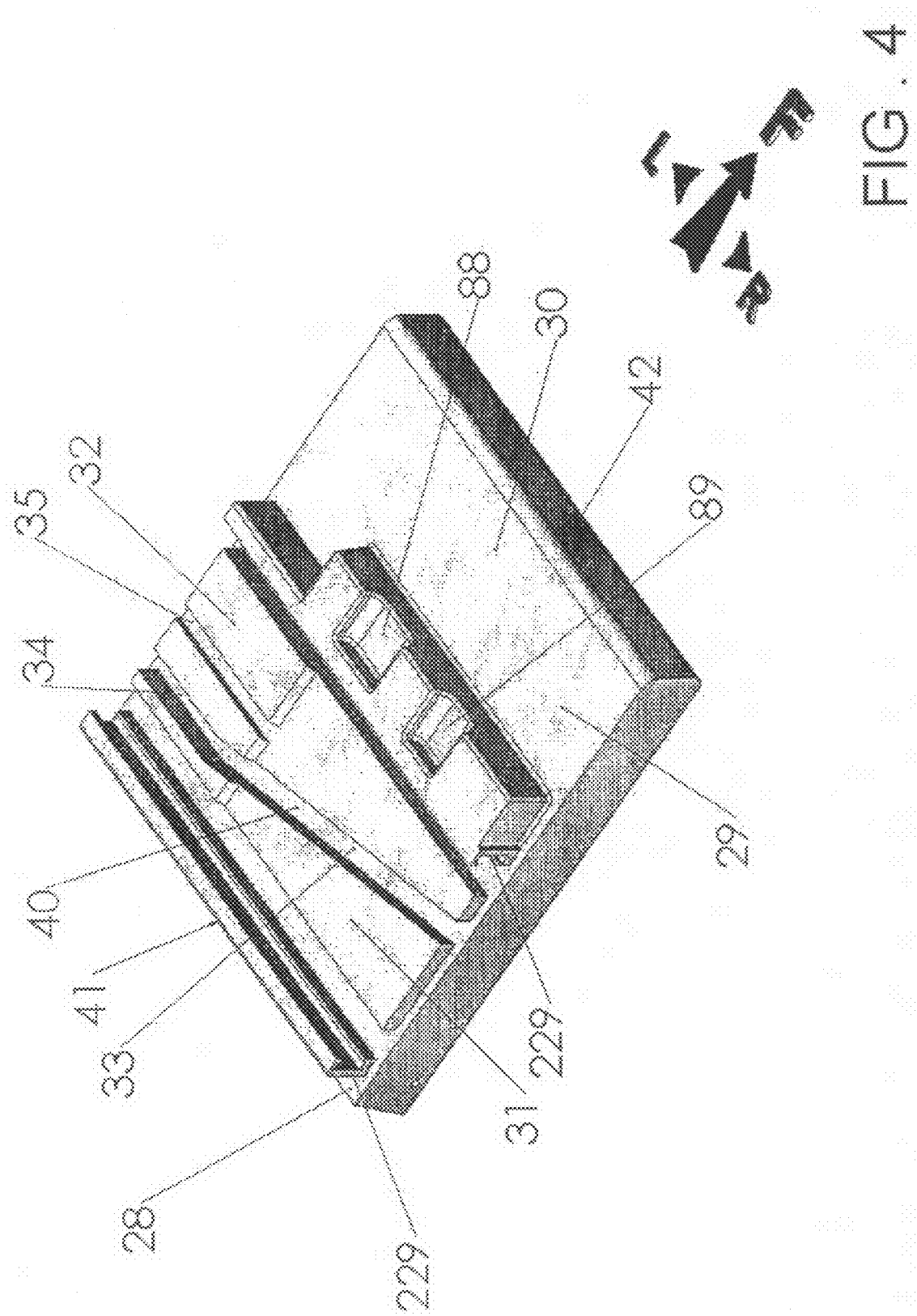
FIG. 4 shows the structure of the lower base portion of the seat system of FIG. 1.

The base 5 (FIG. 2) is a two-portion base. It comprises an upper base portion 27, and a lower base portion 28. The said two base-portions can slide transversally one with respect to the other, for example by means of rails 229. FIG. 4 shows the structure of the lower base portion 28. The upper surface 29 of base portion 28 has 3 levels from the bottom to top as follows: lowest level 30, middle level 31, and upper level 32. Said 3 levels define two roller routes for three wheel rollers, as follows: (a) Roller route 40 having two sections, slanted section 33 and parallel section 34 (it should be noted that the routes terms "slanted" and "parallel" mentioned herein are with respect to the transversal sides 41 and 42 of the base 28); and (b) Roller route 35 which is fully parallel to transversal sides 41 and 42.

Figure 5:
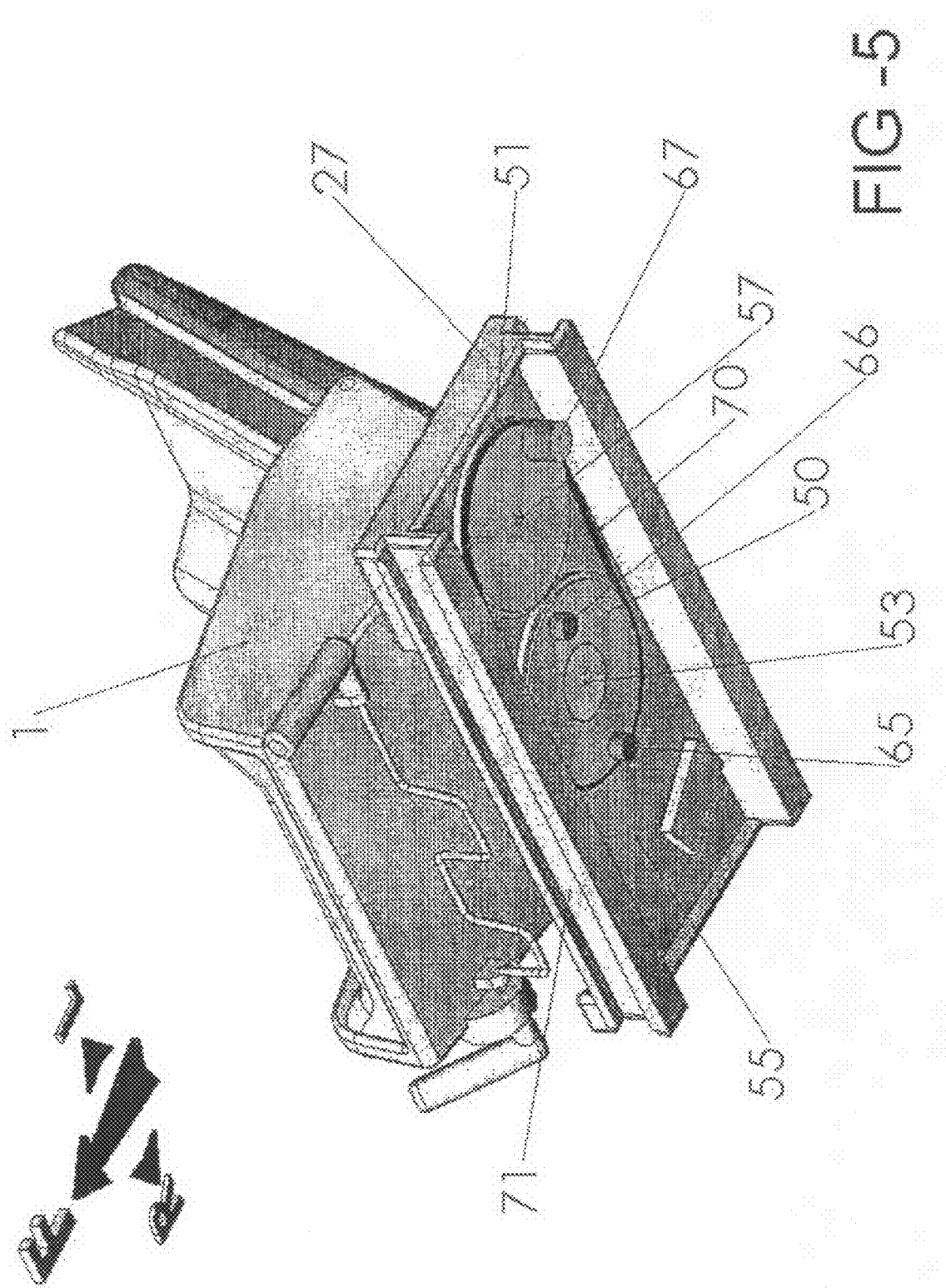
FIG. 5 shows a bottom view of the baby seat system of FIG. 1, and a bottom view of the upper base portion.

FIG. 5 shows a bottom view of seat 1, and upper base portion 27. Upper base portion 27 comprises two wheels, first wheel 50, and second wheel 51. First wheel 50 is rotated about central axis 53 (not shown) to which seat 1 is rigidly attached passing through plate 55. The wheel 50 and seat 1 are so attached by means of said central axle that any angular rotation of first wheel 50 causes a corresponding same angular rotation of seat 1. Second wheel 51 is attached to plate 55 by means of second central axle 57 extending from plate 55 in a manner that it can freely rotate about axle 57.

First wheel 50 has at its bottom two rollers, roller 65, and roller 66, both positioned on a diametric line crossing the axial point 53. Second wheel 51 comprises one roller 67. The two wheels, first wheel 50 and second wheel 51 are connected by means of belt 70, which causes a coordinated rotation of the said two wheels. The upper base portion 27 is so installed that its rails 71 are accommodated within rails 229 (FIG. 4) of the lower base portion 28. Furthermore, roller 67 is accommodated within route 40, and rollers 65 and 66 are both accommodated within route 35 (although not always at the same time).

Figure 7:
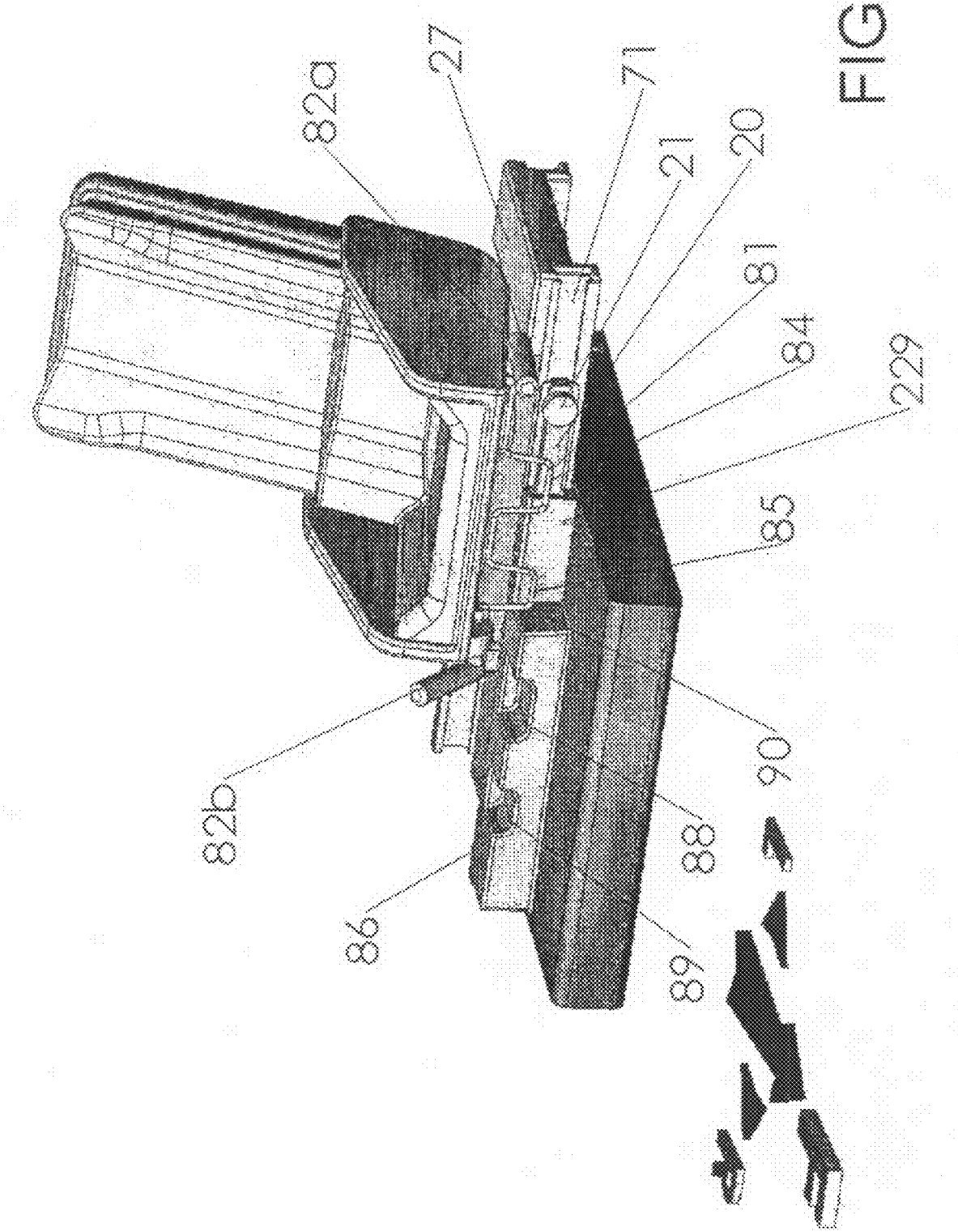
FIG. 7 shows the baby seat system of FIG. 1 in its center-car position (or state)
Figure 8:
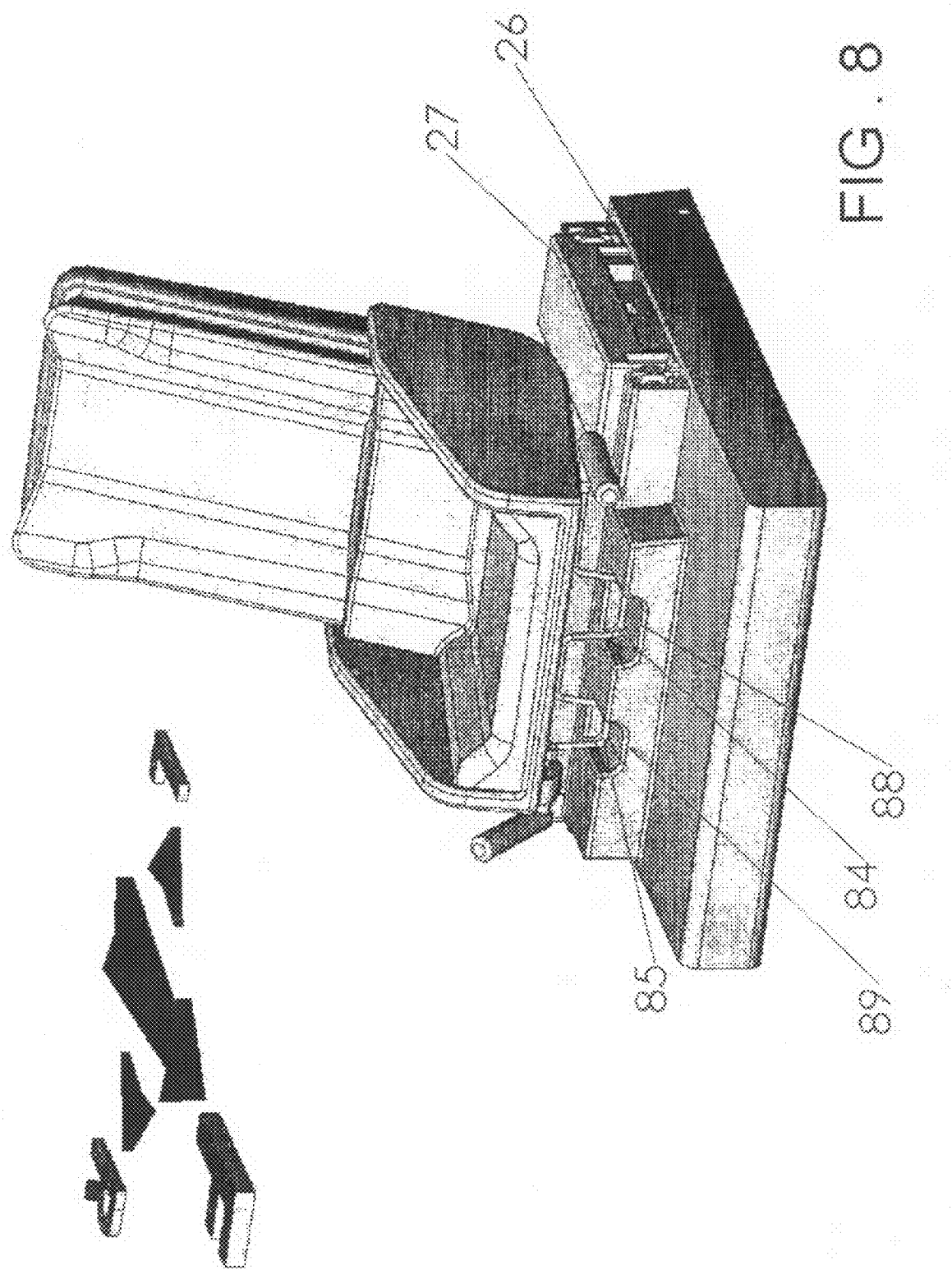
FIG. 8 shows how the car seat is firmly locked in its normal use position proximate to the side car door, preventing any transversal relative movement between the two base portions.

To the bottom of the car seat, there is provided a seat positioning unit (FIG. 7), which comprises a curved axle 81, and two side handles 82a and 82b connected to it. The positioning unit also comprises a spring (not shown) providing to curved axle 81 rotation, enforcing curves 84 and to be in continuous contact with surface 86, as long as they are not raised from it by means of one of the handles 82a or 82b. Moreover, the curves 84 and 85 are adapted to be firmly situated within recesses 88 and 89 when the seat is in its normal use position proximate to the side car door, preventing any transversal relative movement between the two base portions 27 and 28 (as shown in FIG. 8). Moreover, whenever the car seat 1 is located at the center of the car, as shown in FIG. 7, (a state that will be described hereinafter), the two curves are situated within recess 90, also preventing transversal left relative movement between the two base portions, and firmly holding the seat in this center-car position. A right transversal movement is prevented by means of the end of rails 71 and 229.

Figure 6:
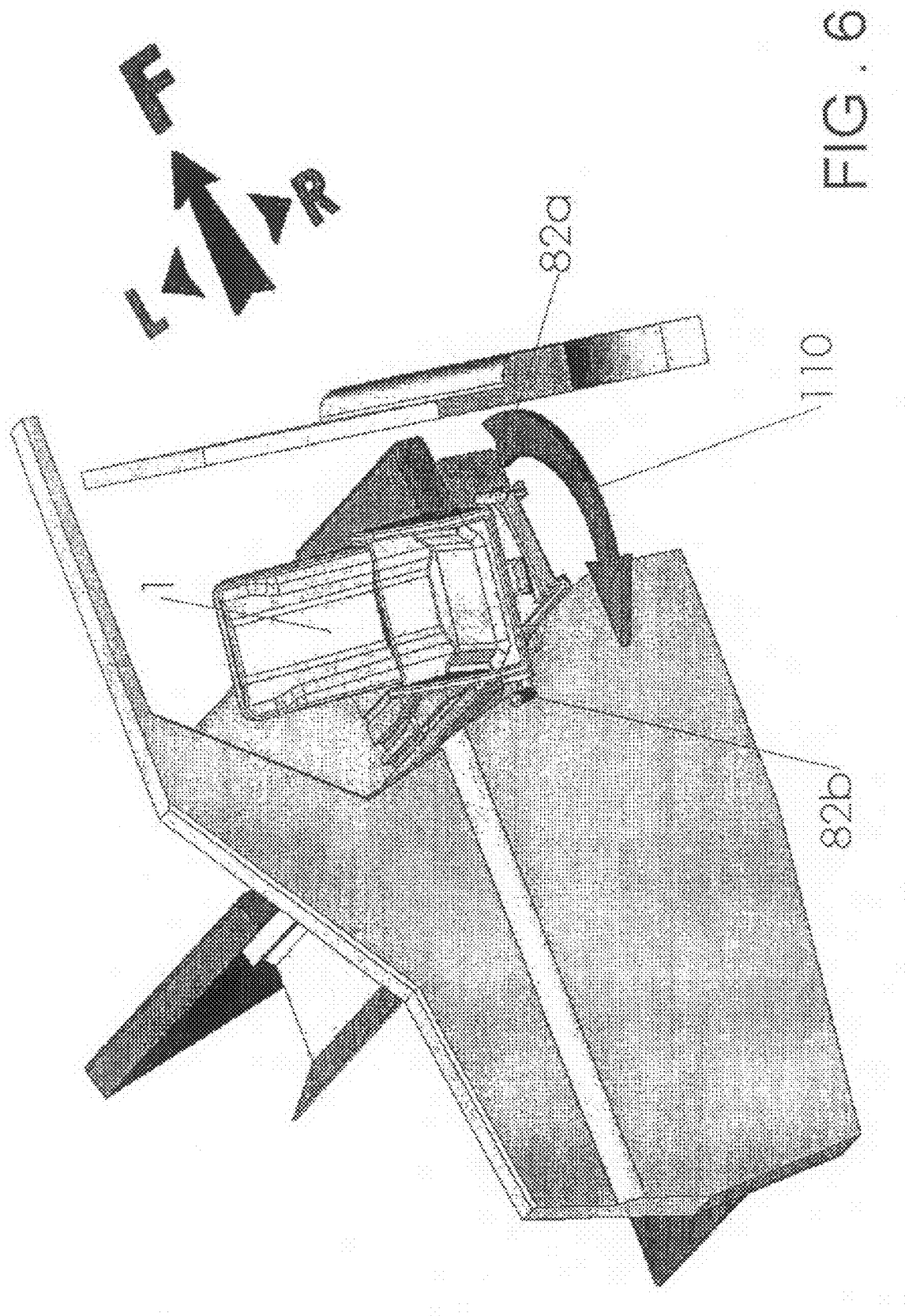
FIG. 6 shows the baby seat system of FIG. 1 in its loading/unloading position (or state)
Figure 9:
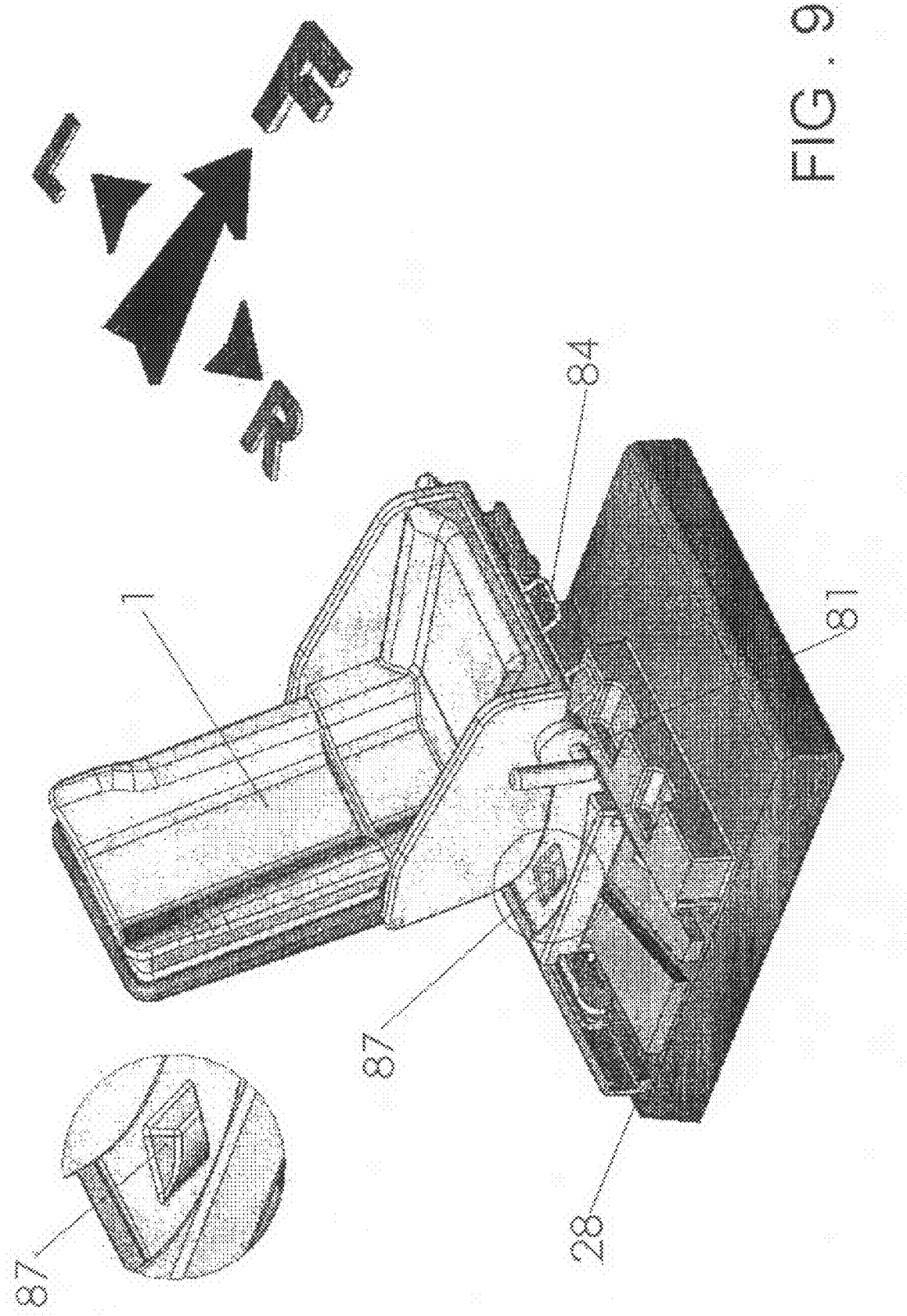
FIGS. 9 and 10 show how the car seat of FIG. 1 can be locked in its loading/unloading position.
Figure 10:
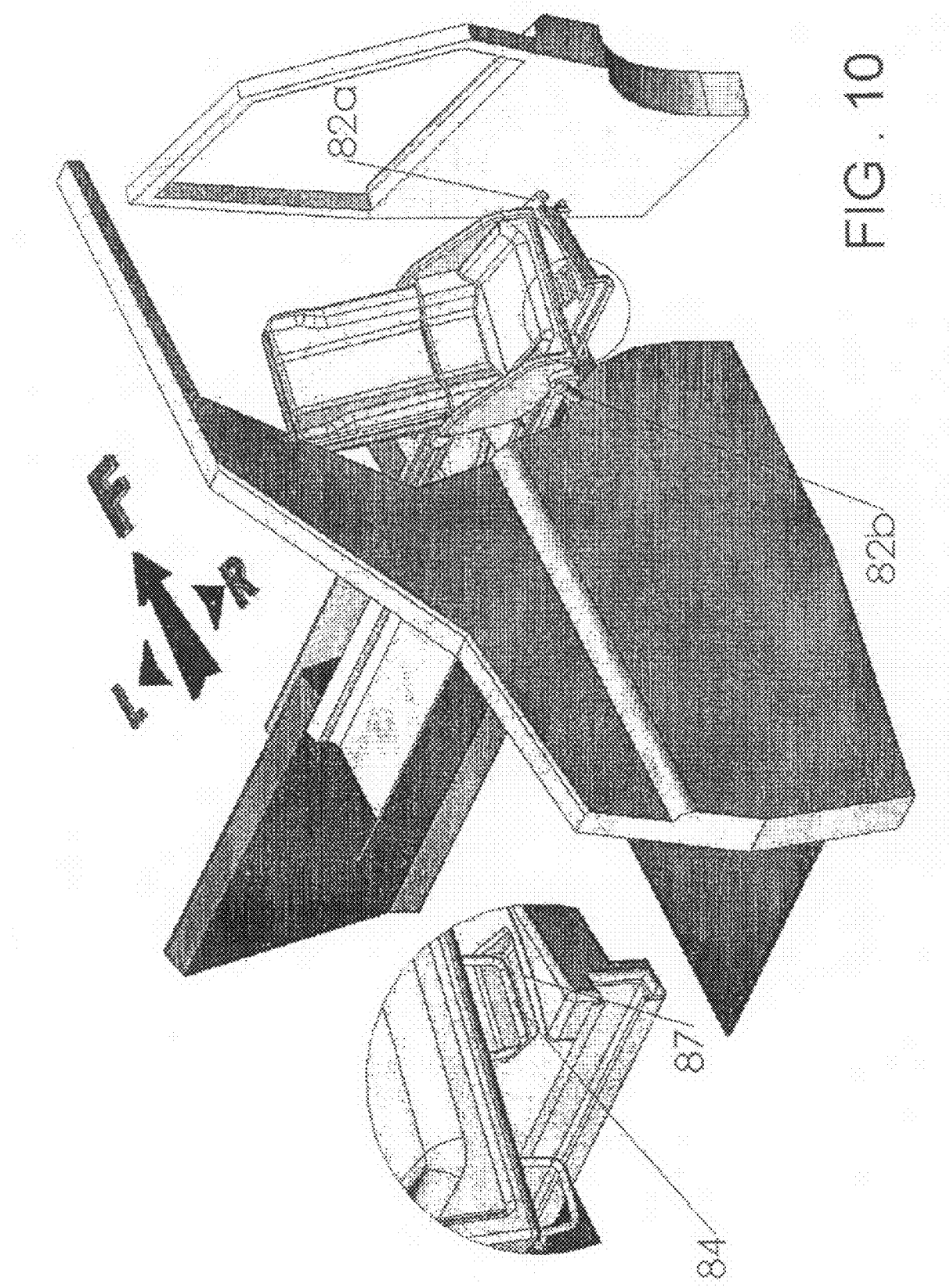

The seat system acts as follows:

With reference to FIG. 6, whenever one of the side handles 82a and 82b (preferably the one close to the door) is raised, and car seat 1 is pulled toward the proximate door (for the purpose of loading or unloading the baby), the seat 1 makes, in addition to the transversal movement, about a 100®-135° rotation about axis 53 (shown in FIG. 5), as indicated by arrow 110. Whenever ending this rotation, the baby seat reaches the loading/unloading position, which is shown in FIG. 6. It can be easily seen that this seat position and orientation is very convenient for the loading or unloading purposes, as in this state the baby seat 1 faces the parent, and is outside of the car space. After loading or unloading of the baby, the parent can push the seat back to its normal position as shown in FIG. 1. During the transversal pushing, the seat 1 also makes a reverse, counter rotation to the one shown by arrow 110 (of FIG. 6), until the baby seat 1 reaches its normal position. As said, in the normal position the baby seat 1 is secured in its place by means of curved axle 81, as the curves 84 and 85 are firmly situated within recesses 88 and 89 respectively. Furthermore, and as seen in FIG. 9, the base portion 28 further comprises an additional recess 87. In the loading/unloading position of seat 1 (when the seat is out of the car space) curve 84 of the curved axle 81 is situated within said recess 87, locking and preventing further rotation of seat 1. This is only an example. Of course, other conventional means may be provided for locking and preventing the seat rotation while in the loading/unloading position. FIG. 10 also shows the seat in its loading/unloading position in which curve 84 is situated within recess 87. Releasing the seat 1 from this locked state is performed by means of raising one of the side handles 82a or 82b.

As said, the baby seat 1 may also be moved right, to be positioned at the center of the car, a location which provides more safety to the baby, especially during side-impact accidents. The center-car position of the baby seat 1 is shown in FIG. 7. In order to bring the seat to this position, the parent has to raise one of the handles 82a or 82b, to push the seat 1 transversally toward the center of the car, and to release the handle, so that the curves 84 and 85 are situated and secured within recess 90.

Figure 11:
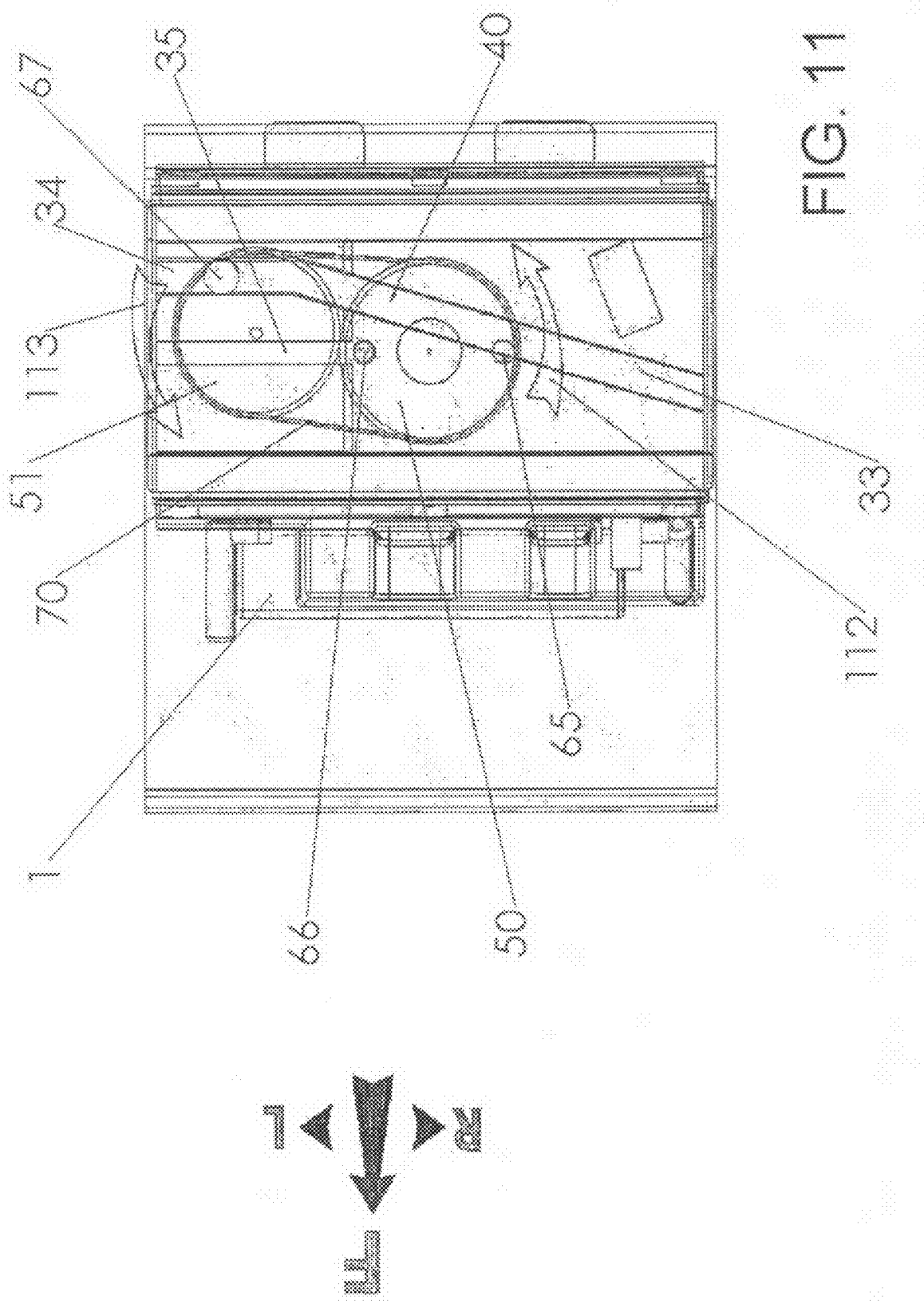
FIG. 11 shows a bottom view of the car seat of FIG. 1 in its normal state wherein roller 67 of wheel 51 is located within the parallel section 34 of roller route 40.
Figure 12:
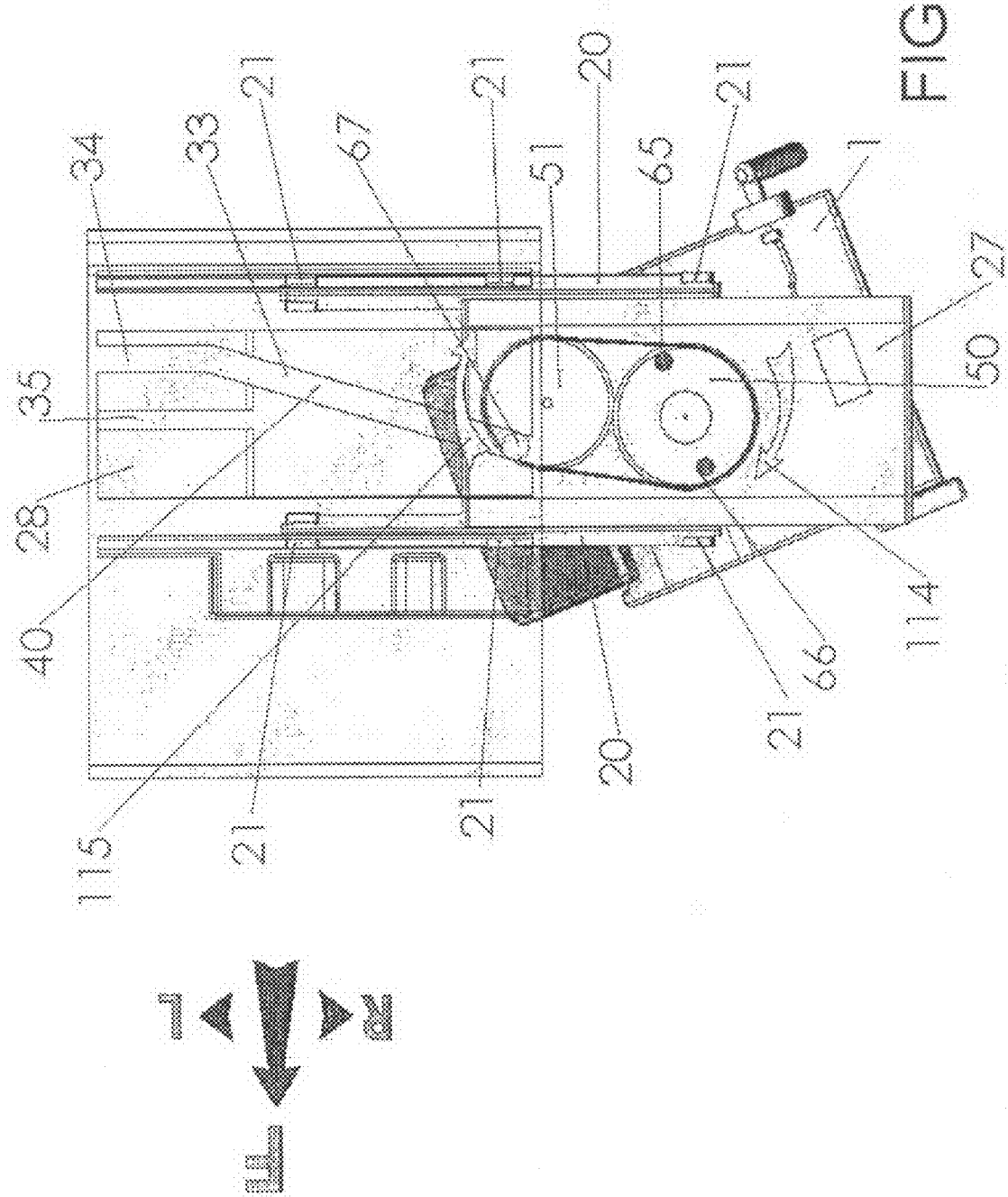
FIG. 12 is a bottom view showing the car seat system of FIG. 1 in its loading/unloading state.
Figure 13:
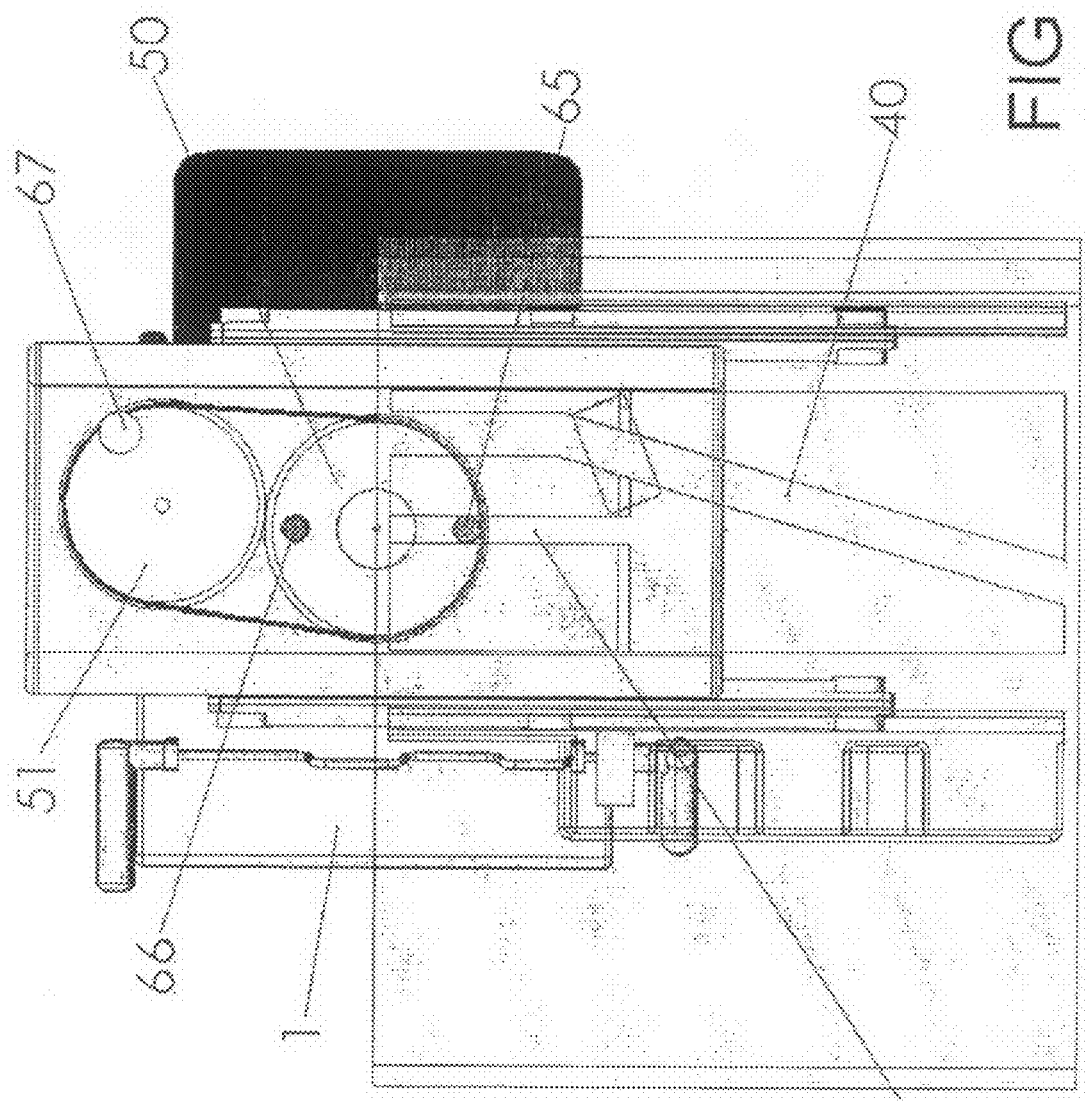
FIG. 13 is a bottom view of the car seat system of FIG. 1 in its center-car state.

FIGS. 11, 12, and 13 are bottom views of the baby seat system 101, in the normal, loading/unloading, and center car states respectively.

As seen in FIG. 11, in the normal state roller 67 of wheel 51 is located within the parallel section 34 of roller route 40. Rollers 65 and 66 are free to move and rotate, as they are not located within, or limited by any roller route. While pushing seat 1 to the left toward the loading/unloading the seat goes through two movement modes as follows:

1. First movement mode during which roller 67 is located within parallel section 34. In this mode wheel 51 does not rotate, and therefore wheel 50 (and seat 1) which is coordinated with wheel 51 by means of belt 70 also does not rotate; and 2. Second movement mode in which roller 67 pass through the slanted section 33 of roller route 40. In this mode roller 67 causes wheel 51 to perform some angular rotation in the direction of arrow 113. Wheel 51 rotation causes also a corresponding rotation of wheel 50 in the direction of arrow 112, as wheels 50 and 51 are coordinated by means of belt 70. Of course, the rotation of wheel 50 also causes a corresponding rotation of seat 1, until it arrives the loading/unloading state. During the second movement mode, seat 1 makes an angular rotation of about 100°-135° in the direction of arrow 112, until it arrives the loading/unloading state of FIG. 12.

FIG. 12 is a bottom view of the car baby seat system 101 in the loading/unloading state. In this state, roller 67 arrives the end of the slanted section 33 of roller route 40. As also seen, seat 1 has completed a rotation of about 100°-135° with respect to its normal state of FIG. 11. Pushing seat 1 to the right will cause a reverse rotation of seat 1 in a manner opposite to the one described above in said first and second movements modes. During the movement of roller 67 within the slanted section 33, the wheels 50 (and also seat 1) and 51 rotate in the direction as marked by arrows 114 and 115 respectively.

FIG. 13 is a bottom view of the system 101 in the center-car state. In this state roller 67 is out of the roller route 40. However, roller 65 is within roller route 35. During the movement of seat 1 from its normal state (shown in FIG. 11) toward the center-car state of FIG. 13, first roller 66 passes through roller route 35, then leaving it (as shown). Roller 65 follows roller 66 in route 35, but in the center-car state it remains within route 35. During all the movement of seat 1 from its normal state (FIG. 11) toward the center-car state no rotation of the wheels 50 or 51 is caused. Therefore, baby seat 1 is also not rotated during this movement.

As shown in FIGS. 4, 7 and 12, two rail arms 20, each with a plurality of rail rollers 21 are provided within rails 71 and 229 in order to provide a smooth relative movement between the two base portions 27 and 28.

As shown, the system 101 provides more convenience to the parent while loading or unloading the baby. It is also much safer to the baby, as he is seated in a firm seat, which can also be easily positioned at the center of the car, a location which is much safer during side-impact accidents.

FIGS. 14 to 25 illustrate a second embodiment of the baby seat of the present invention, which is adapted for alternatively accommodating an older baby seat (as of the previous embodiment) or an infant seat. Generally, there are two types of baby seats:

a. a seat for a baby older than about 8 to 12 months of age. For safety reasons, such a seat is generally installed with the baby head facing the front of the car, and the baby is in a sitting state; and b. an infant seat for a baby up to about 8 to 12 months of age. In such a seat, and for the sake of safety, the infant is placed while his head faces the rear of the car, and generally in a lying position.

Figure 14:
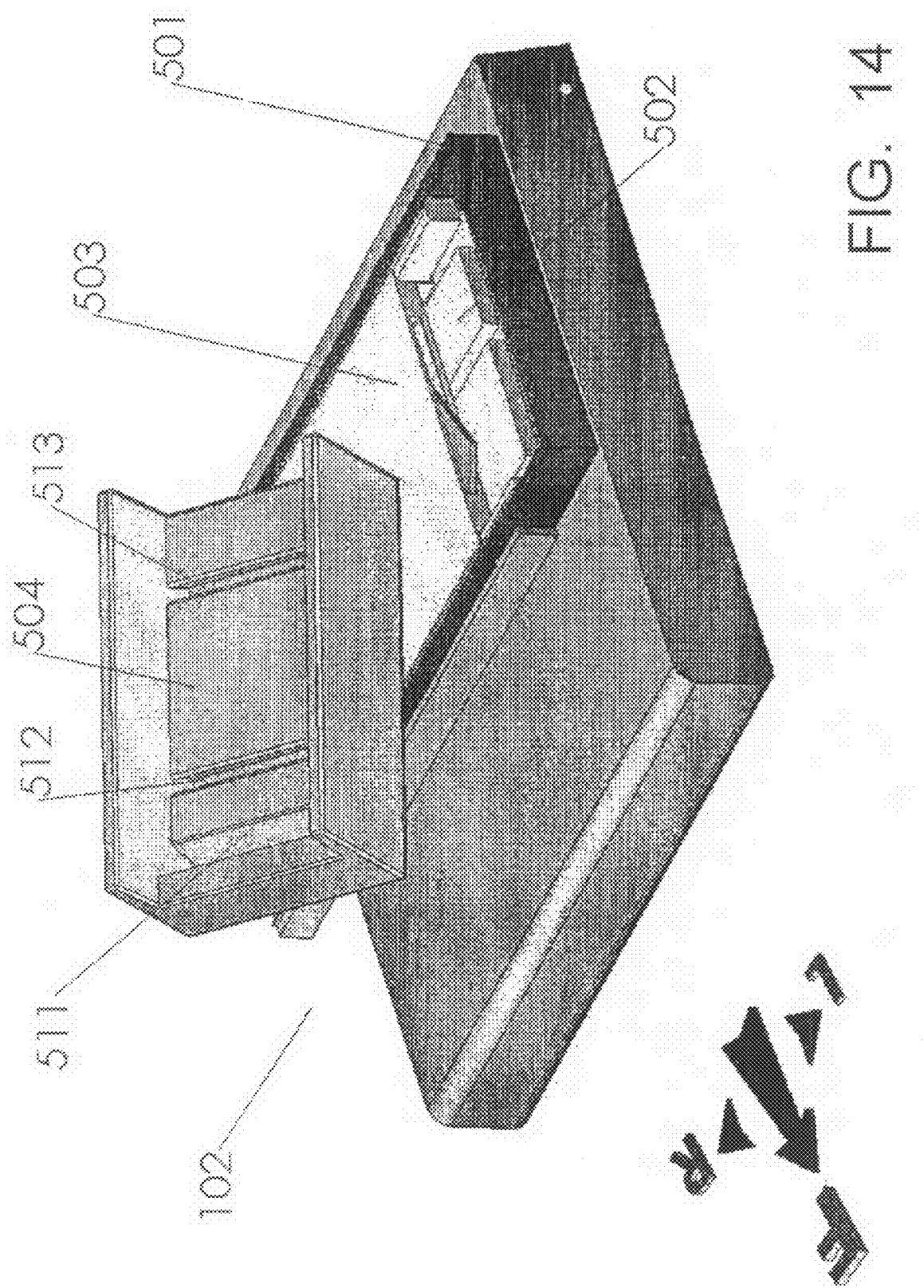
FIG. 14 shows the general structure of the car seat system (without the replaceable seat itself) according to a second embodiment of the invention.
Figure 15:
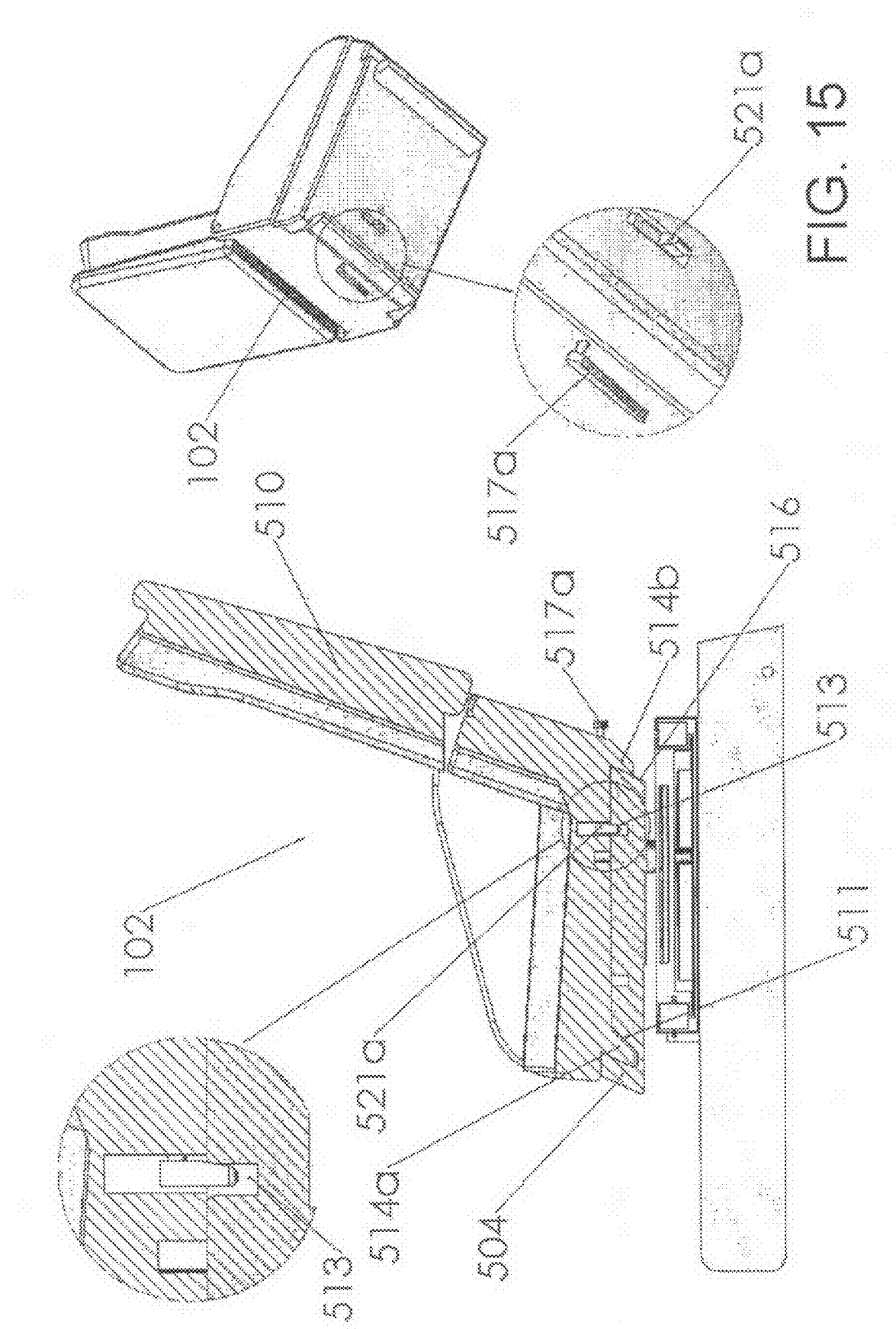
FIG. 15 is a side view showing the general structure of the car seat system (with an older baby replaceable seat) according to a second embodiment of the invention.
Figure 16:
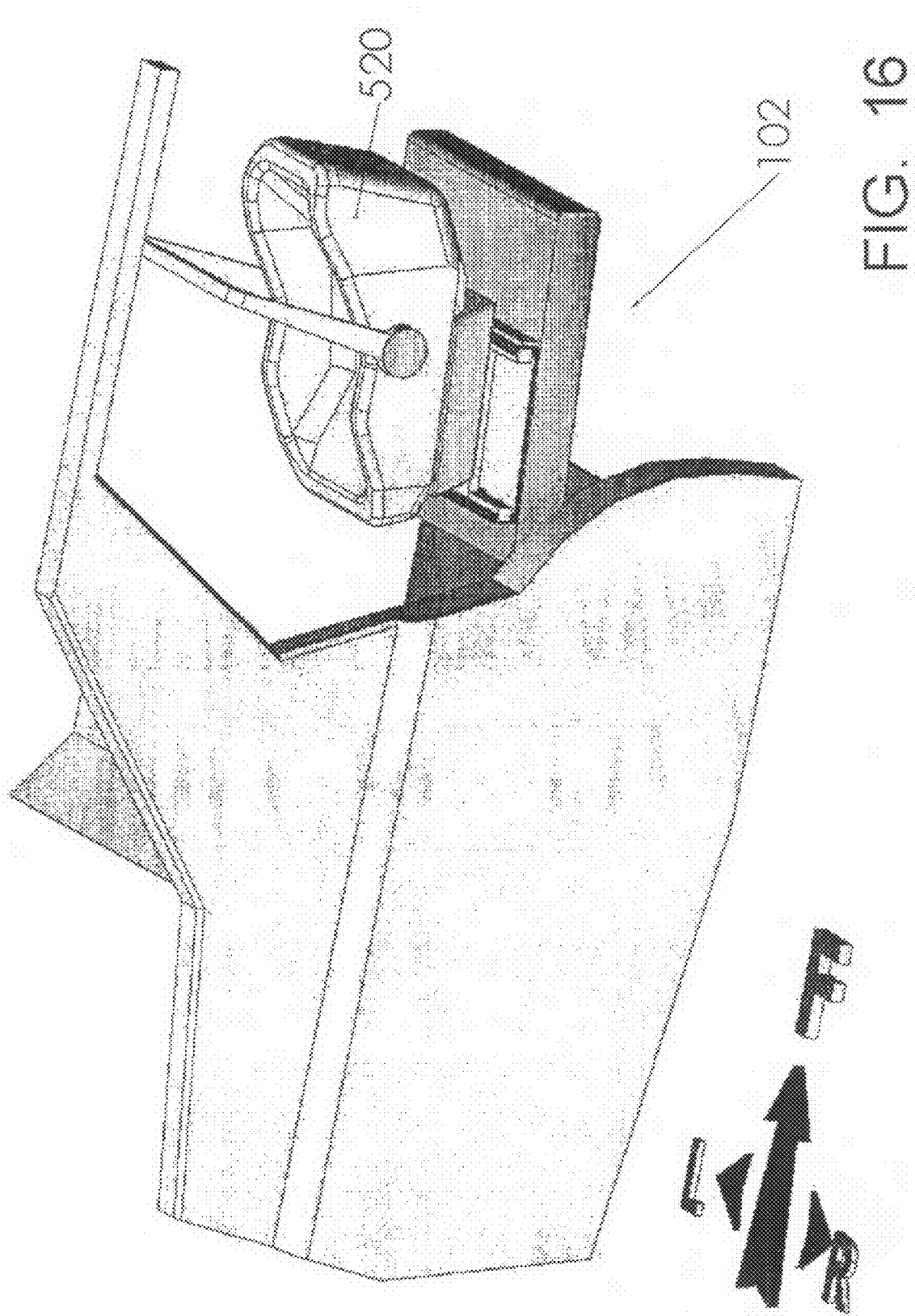
FIG. 16 shows the seat system of the second embodiment of the invention while accommodating an infant seat.
Figure 17:
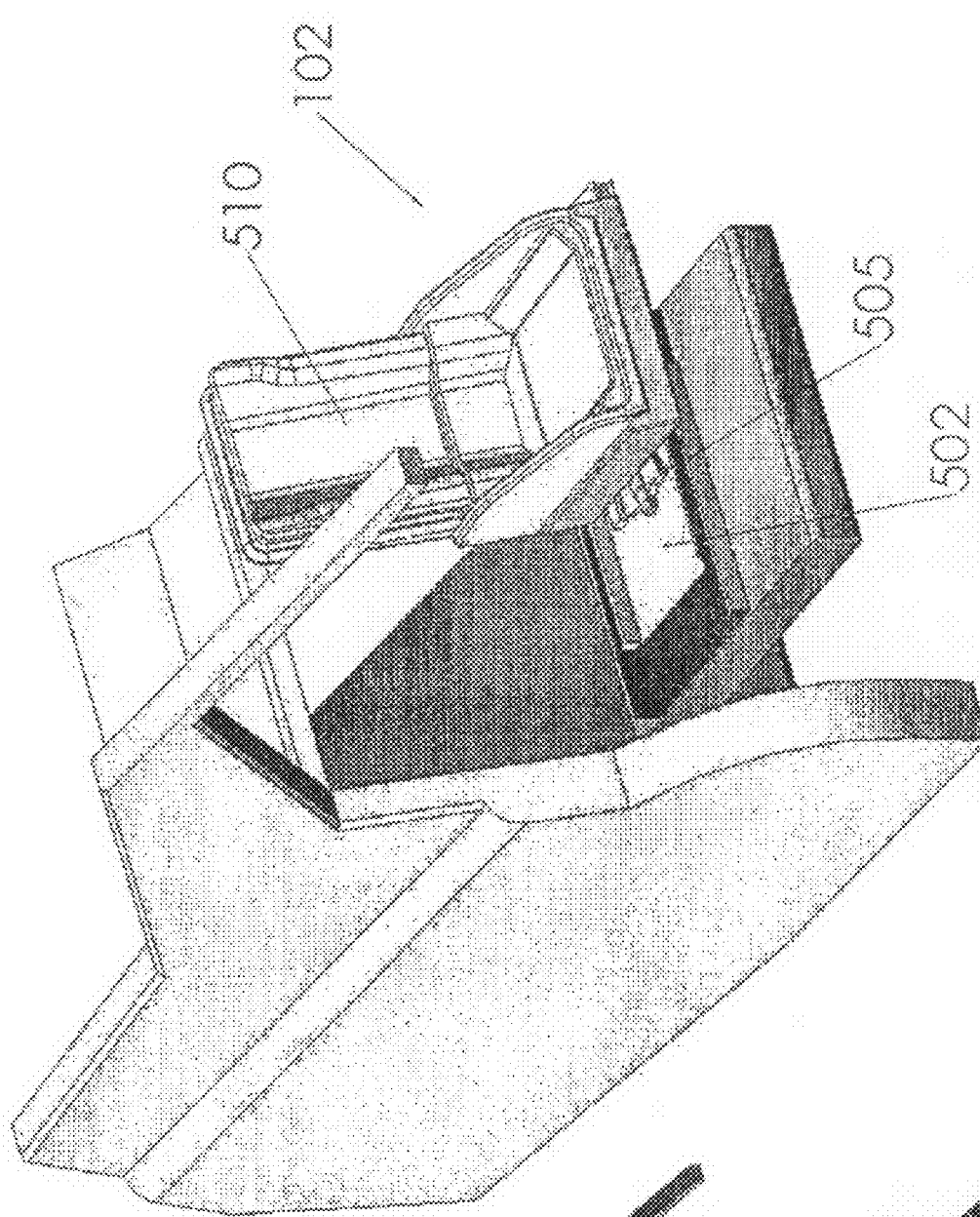
FIG. 17 shows the baby seat system according to the second embodiment of the invention while accommodating an older baby seat, in the center of the car. The figure also shows the switch in its "older baby seat"

FIG. 14 shows the general structure of the seat system 102 (without the replaceable seat itself) according to the second embodiment of the invention. The seat system comprises the following main potions: (a) a lower base portion 501 which is stationary relative to the lower portion of the rear passenger seat 4; (b) an intermediate, moveable base portion 502; (c) an upper, moveable base portion 503; and (d) a seat supporting portion 504. FIGS. 15 and 17 show the seat system 102 of the second embodiment while accommodating an older baby seat 510 facing the front of the car (of course during normal driving state). FIG. 16 shows the seat system 102 of the second embodiment while accommodating an infant seat 520. In a normal driving state, the infant seat is positioned such that the infant head faces the rear of the car.

The seat supporting portion 504 is adapted for selectively accommodating either one of the said two replaceable seats. In the example of this second embodiment, the adaptation is obtained by means of the shape of supporting portion 504, which has three slots 511, 512, 513, and slanted front or back. Furthermore, each of the seats 510 and 520 has a locker 521a-521b respectively (FIGS. 15 and 19). The lockers 521a-521b are adapted to engage with the compatible slot 513 of the supporting portion 504. Furthermore, the seats 510 and 520 have compatible extensions 514a-514b and 515a-515b respectively, which engage with the slanted rear surface 516 of support 504, and slanted slot 511 respectively. The locker 521a (or 521b), together with the engagement of extensions 514a-514b or 515a-515b ensure the safe maintaining of the corresponding seat in its place during the driving. Moreover, each of the infant and baby seats 510 and 520 has a locking/releasing handle 517a and 517b respectively for locking the seats in their place or releasing them from engagement with support 504. The locking handles 517a-517b are directly connected to lockers 521a-521b respectively, in order to enable the raising (i.e., releasing) of the lockers or lowering (i.e., locking) of the lockers.

As will be discussed further hereinafter, the intermediate base 502 has a switch 505 (FIGS. 17, 20, and 22) having two states, a first "baby seat" state for operation with an older baby seat 510, and a second "infant seat state" for operation with an infant seat 520. The appropriate state of the switch is set accordingly before the installation of the selected seat within support 504.

Figure 21B:
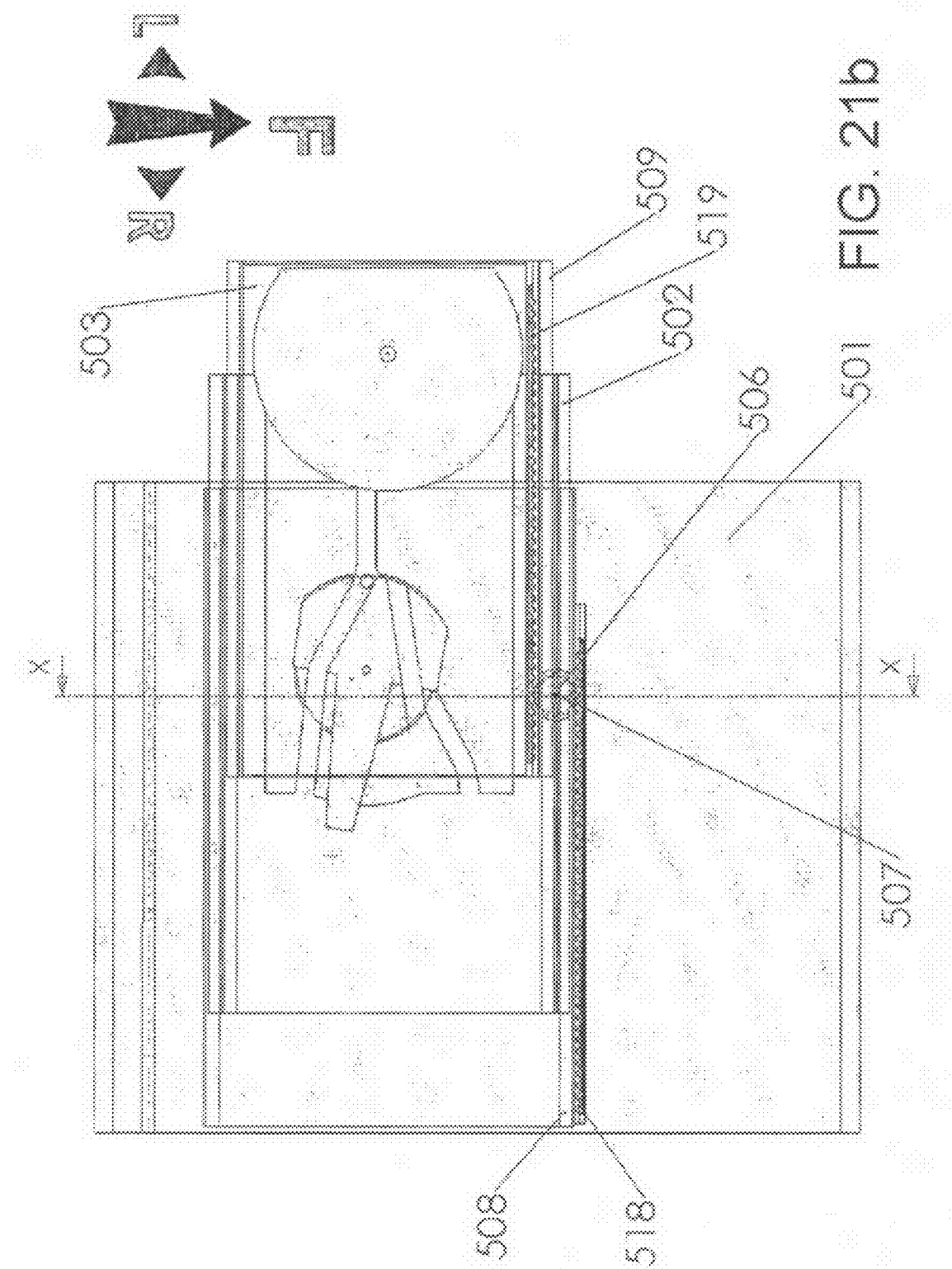
FIG. 21b is an upper view showing the engagement between the three base portions of the baby car seat system according to the second embodiment of the invention.

FIGS. 21a and 21b illustrate the relative connection between the three base portions 501, 502, and 503. FIG. 21b is an upper view, and FIG. 21a is a cross sectional view made along axis x-x. The intermediate base portion 502 is connected to the two other base portions 501 and 503 by means of two rail units, a first rail unit 508 defining the engagement between base portions 502 and 501, and a second rail unit 509 defining the engagement between base portions 502 and 503. As best shown in FIG. 21b, a gear wheel 506 is mounted in the side of base portions 502, and said gear wheel engages the two side gear surfaces 518 and 519 of base portions 501 and 503 respectively. Wheel gear 506 can rotate freely about axis 507. Such an arrangement causes base portion 503, when moved, to make a relative displacement with respect to stationary base portion 501 of twice the amount that base portion 502 makes with respect to said base portion 501.

Figure 23:
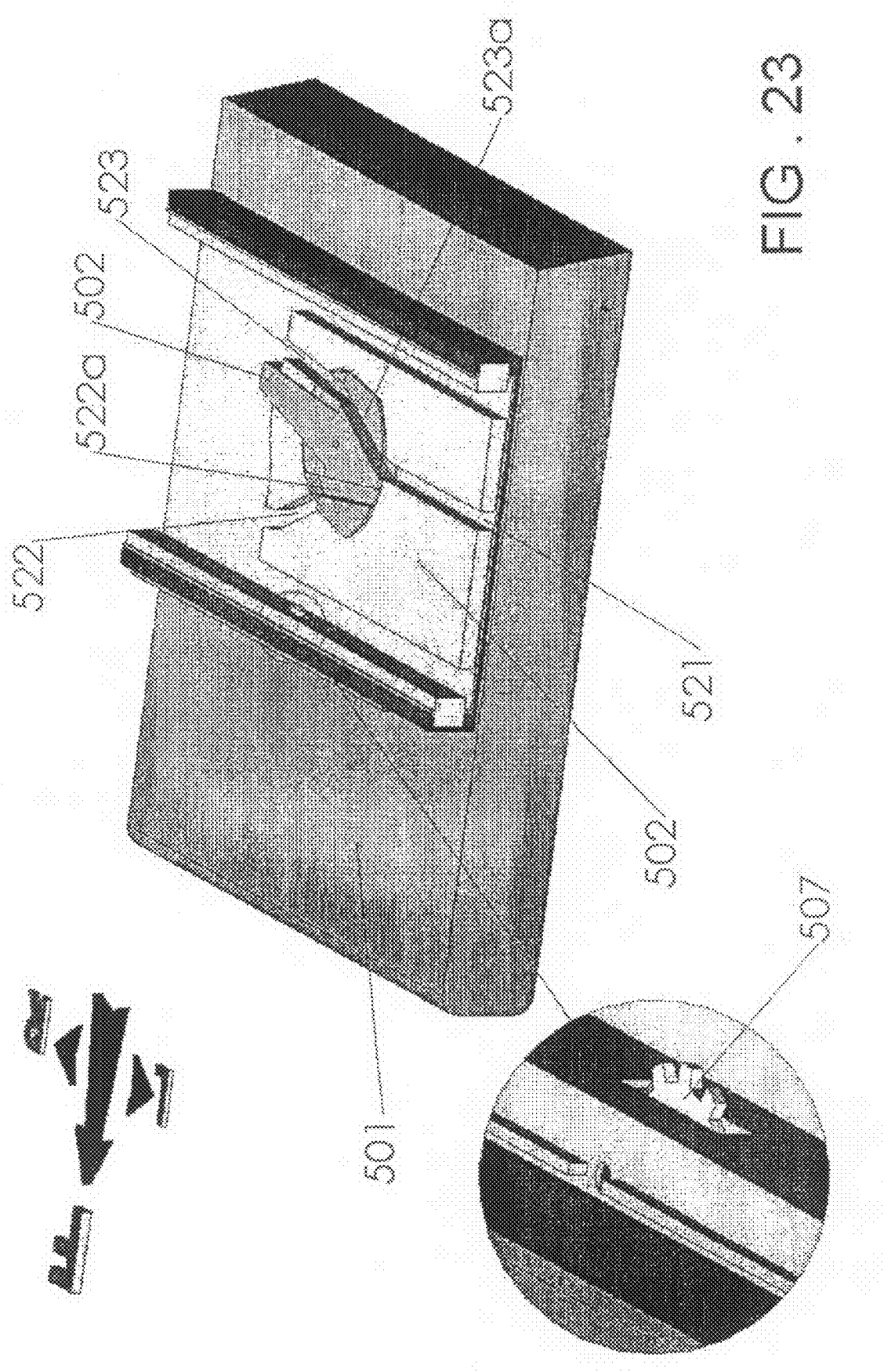
FIG. 23 shows the switch of the base in its "infant seat state"
Figure 24:
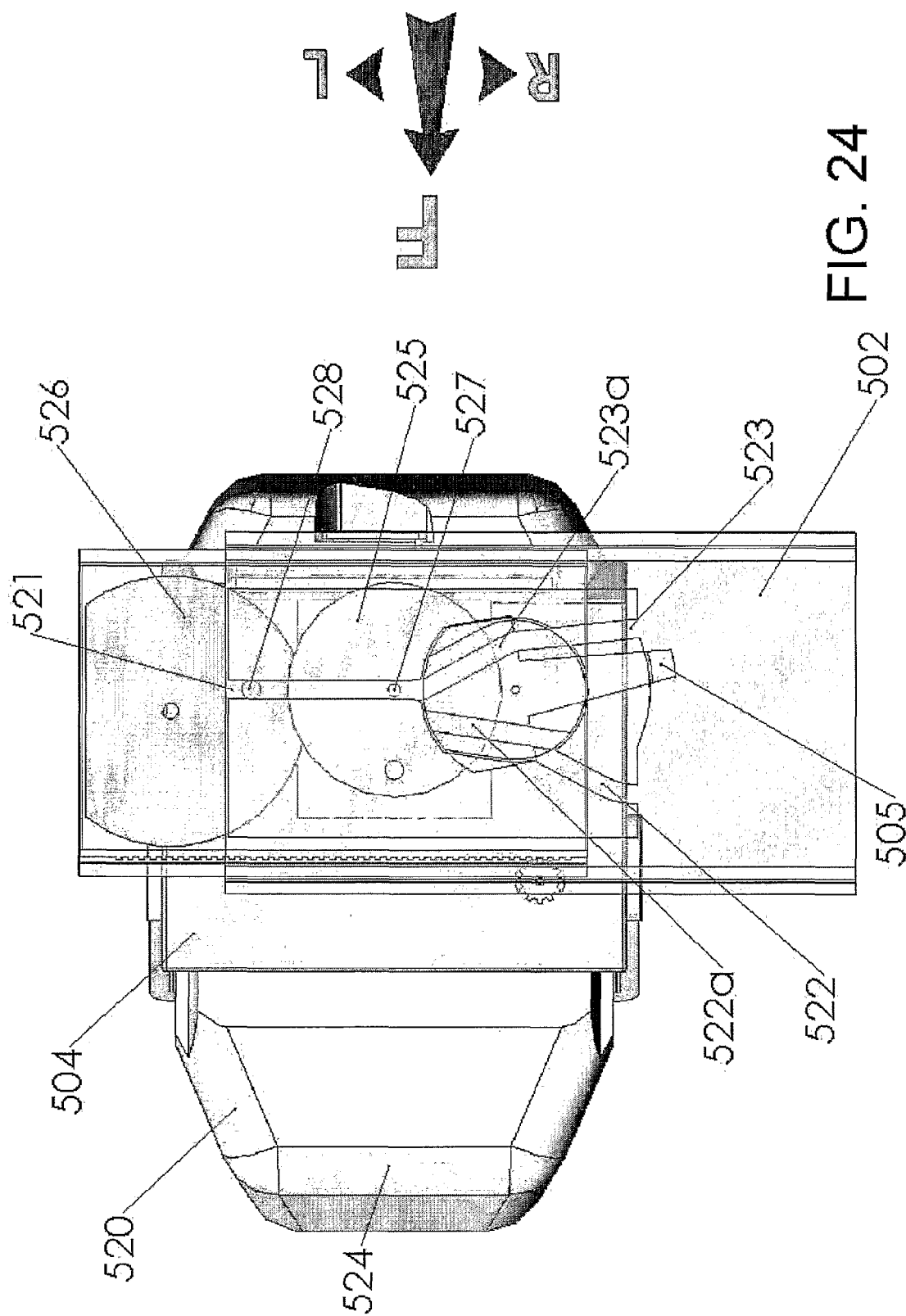
FIG. 24 shows the movement of the seat according to the second embodiment toward the middle-car state.
Figure 25:
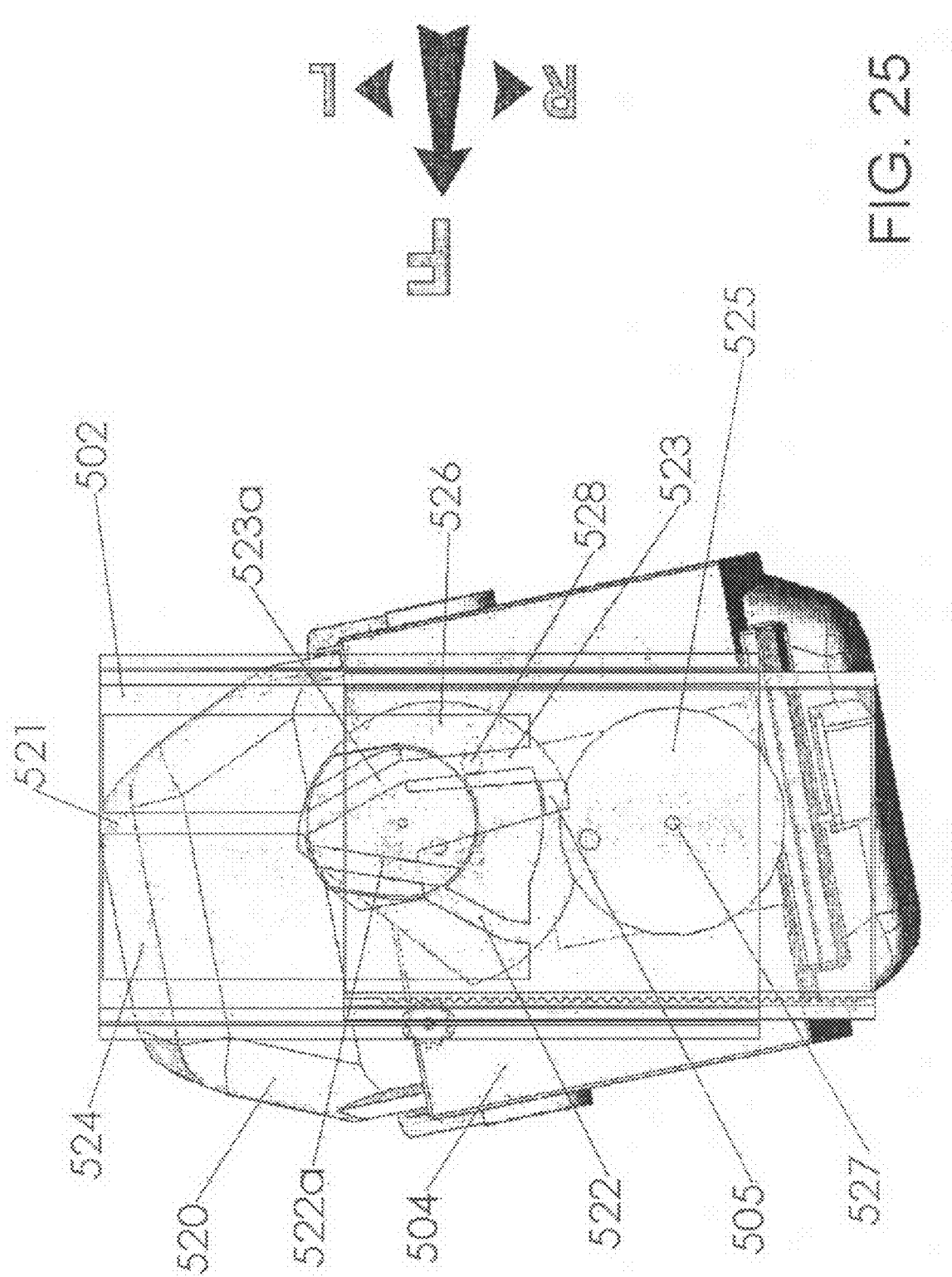
FIG. 25 shows the movement of the seat according to the second embodiment toward the loading/unloading state.

FIGS. 20 and 23 show the intermediate base portion 502 located within the lower base portion 501, while the upper base portion 503 is removed. The structure of FIGS. 20 and 23 are adapted for a case when the system is located close to the right rear door of the car. The intermediate base portion has a main slot 521, that splits into two secondary slots, a first secondary slot 522, and a second secondary slot 523. The switch 505, has two partial slots 522a and 523a, for continuing respectively the slots 522 and 523. As said, switch 505 has two states, a "baby seat state", and an "infant seat state". In each of said states, switch 505 forms continuation of the main slot 521 toward only one selective of the slots 522a or 523a, depending on the type of the seat that is attached to supporting portion 504. The route from the main slot 521 to the other, non-selective slot is blocked. In FIG. 20, the switch is positioned in a "older baby seat state", such that the main slot 521 continues toward slot 522a of the switch, and then toward slot 522. In FIG. 23, switch 505 is positioned in an "infant seat state", such that the main slot 521 continues toward slot 523a of the switch and then toward slot 523. In the "infant seat state", there is no connection from the main slot 521 toward slot 522. FIGS. 24 and 25 are bottom views of the baby seat system, according to the second embodiment of the invention. An infant seat 520 is attached to supporting structure 504. The head of the infant is located at 524. Support 504 is rigidly attached to wheel 525 by means of axle 527, such that when wheel 525 rotates, supporting structure 504 performs same rotation. Wheel 525 is engaged by means of gears (not shown) with wheel 526, such that when either one of said wheels rotates, the other wheel rotates also. Wheel 526 has a roller 528 at its bottom which is always located within and bounded by the main or secondary slots of the intermediate base portion 502. Therefore, as long as roller 528 is located within the main slot 521, wheel 526, and therefore also wheel 525 do not rotate. However, when the seat is pushed such that roller 528 arrives one of the secondary slots 522, 522a, (in the case of a "baby seat state") or 523, 523a (in the case of "infant seat state") a rotation of wheel 526 is caused, which causes a respective rotation of wheel 525 and the supporting portion 504.

In similarity with the first embodiment, the seat has three states, a normal driving state, a center-car state, and a loading/unloading state. FIG. 24 shows a movement of the seat toward the center-car state, wherein roller 528 is located within main slot 521. FIG. 25 shows movement of the seat toward the loading/unloading state, during which rotation of wheel 526 is caused, and therefore also rotation of wheel 525 and of the infant seat 520. At the loading/loading state, the seat completes rotation of about 30°-60°, enabling easy and convenient access of the parent to the seat as discussed above.

When an older baby seat 510 is installed to supporting portion 504 (as shown in FIG. 17), instead of the infant seat 520, the switch 505 is positioned by the parent at the "baby seat state". The operation of the system is similar to its operation as described above with respect to the infant seat 510. However, as the switch 505 is positioned in the "baby seat state", the roller 528 follows the route defined by the main slot 521 and secondary slots 522 and 522a, instead of the route defined by slot 521 and secondary slots 523 and 523a as in the "infant seat state". Therefore, the wheel 526 rotates in a direction opposite to the rotation direction of same wheel as caused in the "infant seat state". Preferably, the secondary slots 522 and 522a are designed such that the slot completes a rotation of about 100°-135°, as described with respect to the first embodiment.

Figure 18:
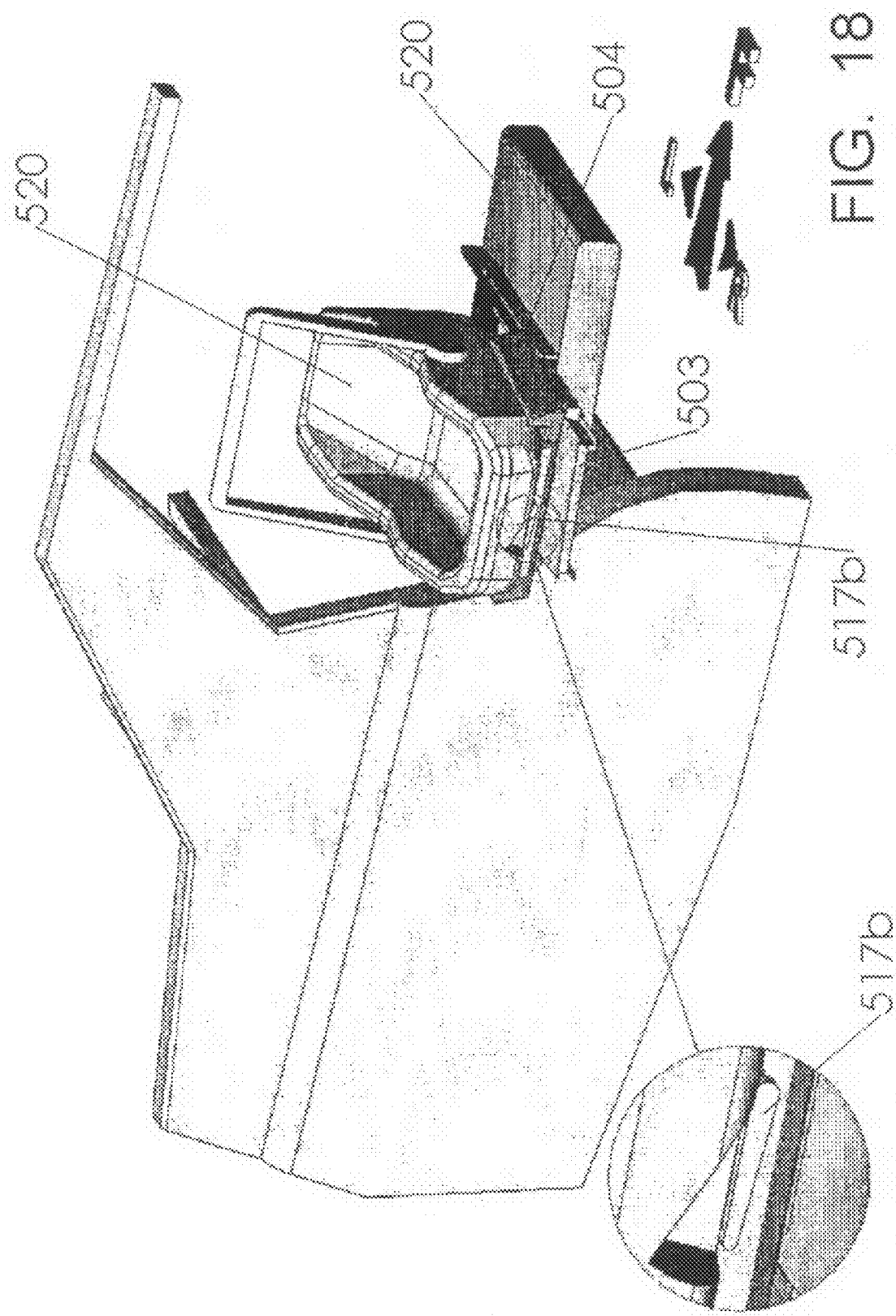
FIG. 18 shows the seat of the second embodiment at its loading/unloading state.

FIG. 22 shows the infant seat 520 in the center-car state. It can be seen the switch 505 can be accessed only during the center-car state, in order to prevent switching during regular use. FIG. 18 shows the seat 520 at the loading/unloading state. It can be seen the seat has completed about 90° of rotation (it should be noted that the 90° has been given herein as an example only, although as said a range of 30°-60° is preferable).

As shown, the second embodiment of the invention enables selective replacement between two seats, an older baby seat 510 or an infant seat 520. The second embodiment enables installation of an older baby seat in a front facing orientation, or an infant seat 520 in a rear-facing orientation. Moreover, in the loading/unloading state the baby seat 510 preferably completes a rotation in the range of about 100°-135°, while the infant seat 520 preferably completes a rotation in the range of about 30°-60°. The system of the second embodiment, like the system of the first embodiment has three location states, a center-car state which is safer, a normal driving state when the seat is positioned close to the side door, and a loading/unloading state.

It has been found that in some of the existing car models the rear surface of the back passengers seat cannot safely support the baby seat of the present invention, either because it is not strong enough, or because it is not adapted for receiving the connecting screws that are necessary for attaching the seat base to that surface. In order to overcome this drawback, the present invention also discloses two embodiments for a base unit for supporting the baby seat system.

It has been found that the bottom surface of most existing cars trunks have strong screws in proximity to the back support of the back passengers seat. The present invention uses these screws for the attachment of the base unit of the present invention.

Figure 26:
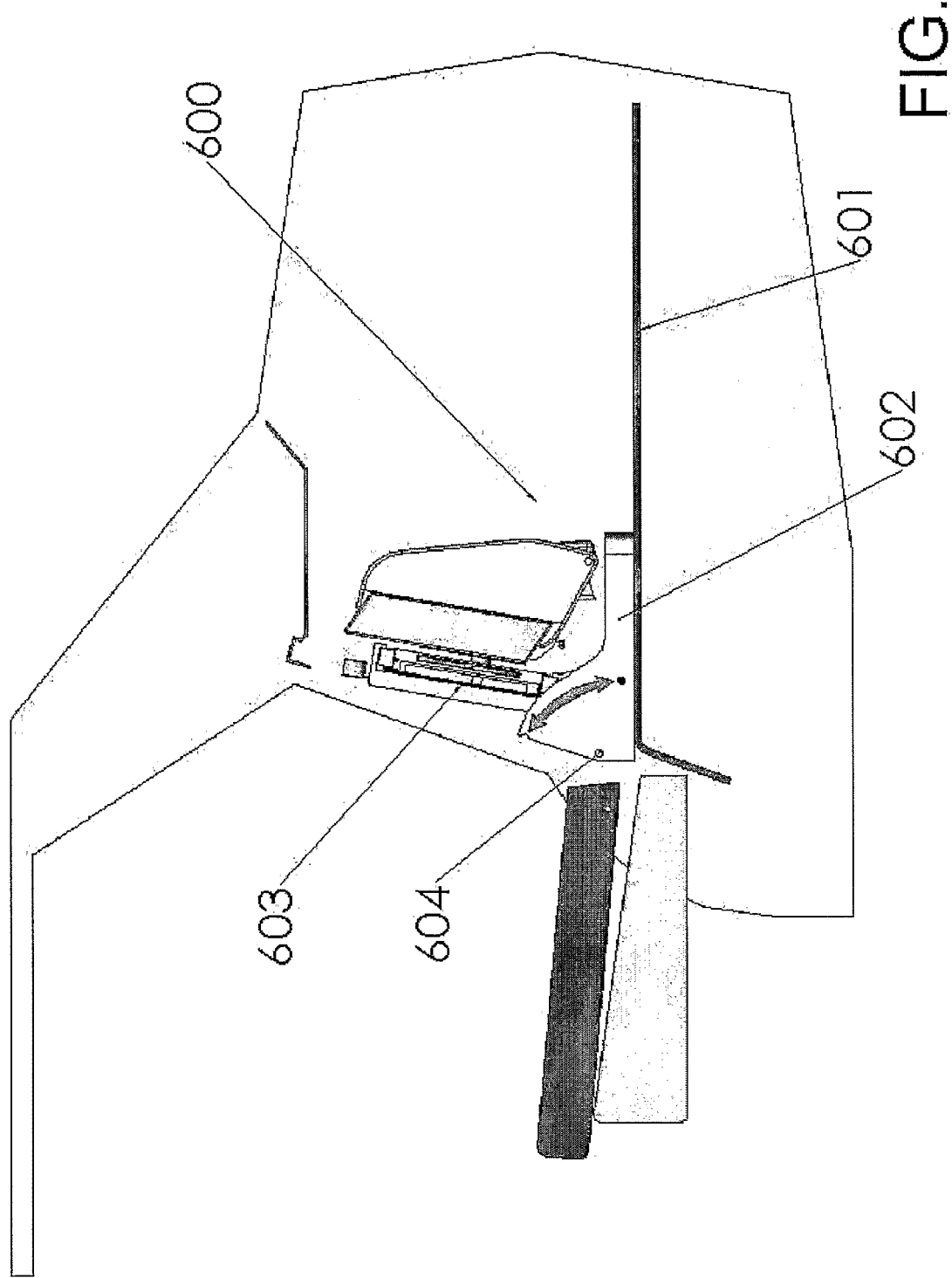
FIG. 26 shows a first embodiment of the base unit in its storage state within the trunk.
Figure 27:
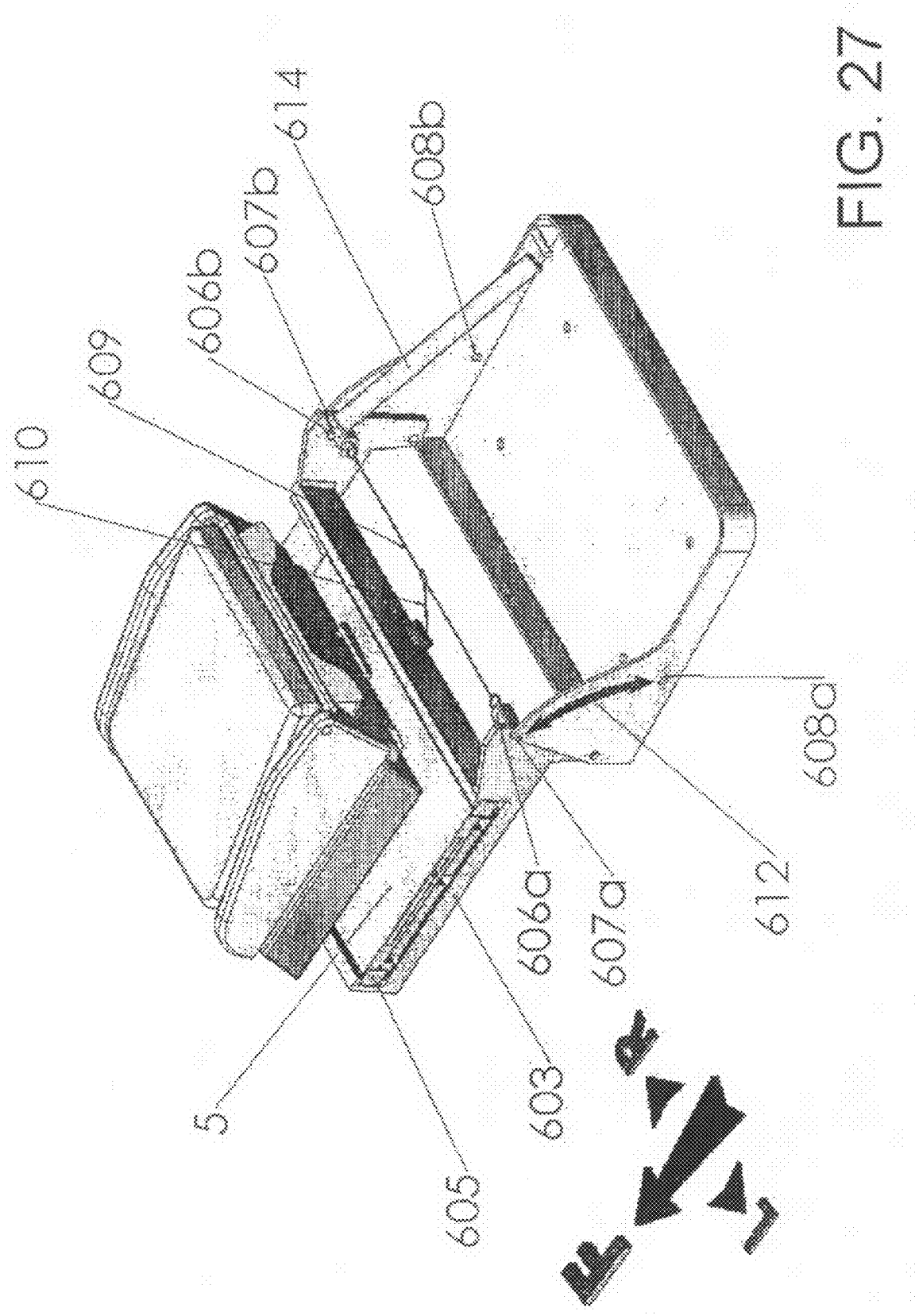
FIG. 27 is still another view of the base unit in its normal use state, while also showing the baby seat folded.
Figure 28:
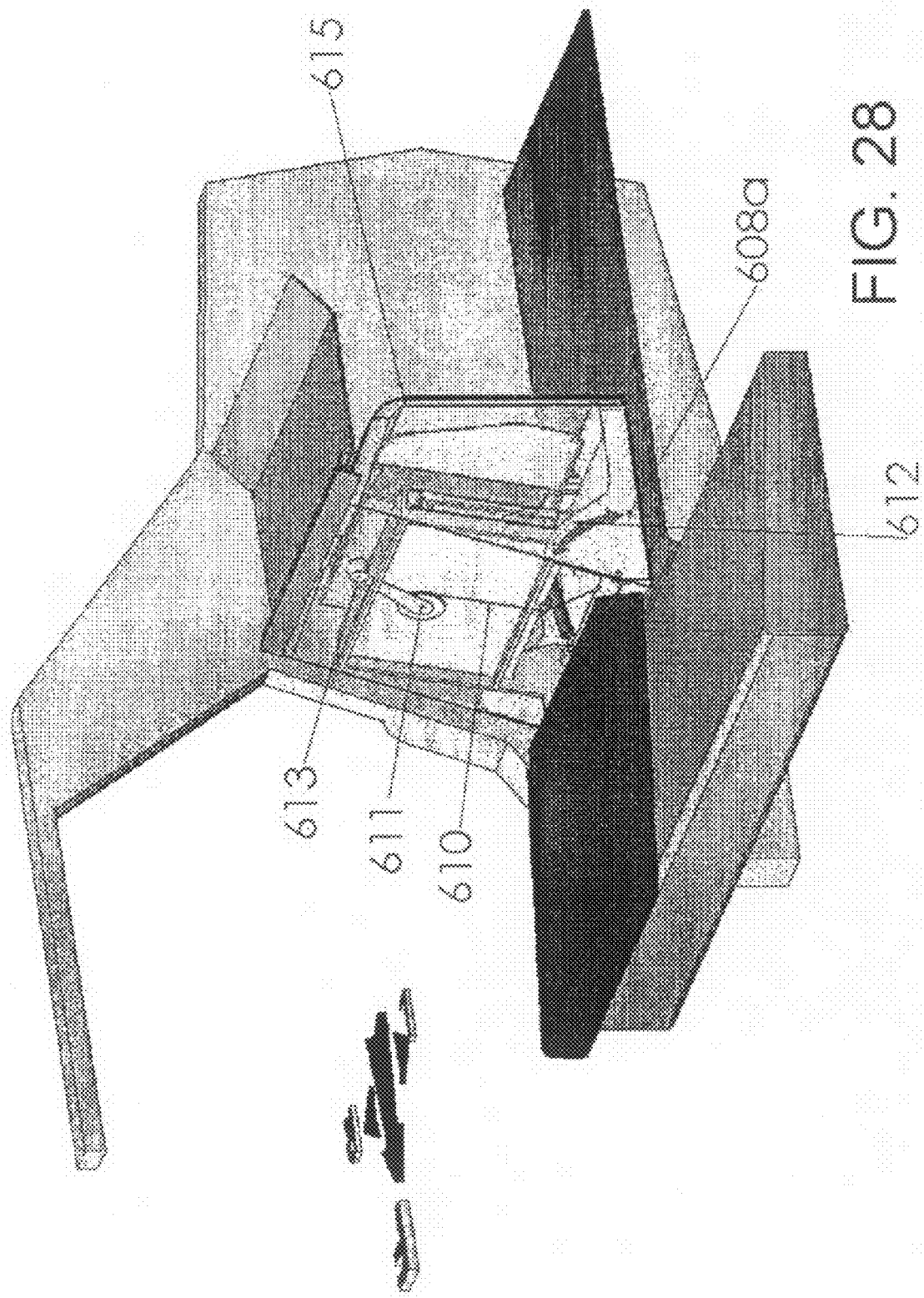
FIG. 28 is still another view of the base unit of FIG. 26 in its storage state within the trunk.
Figure 29:
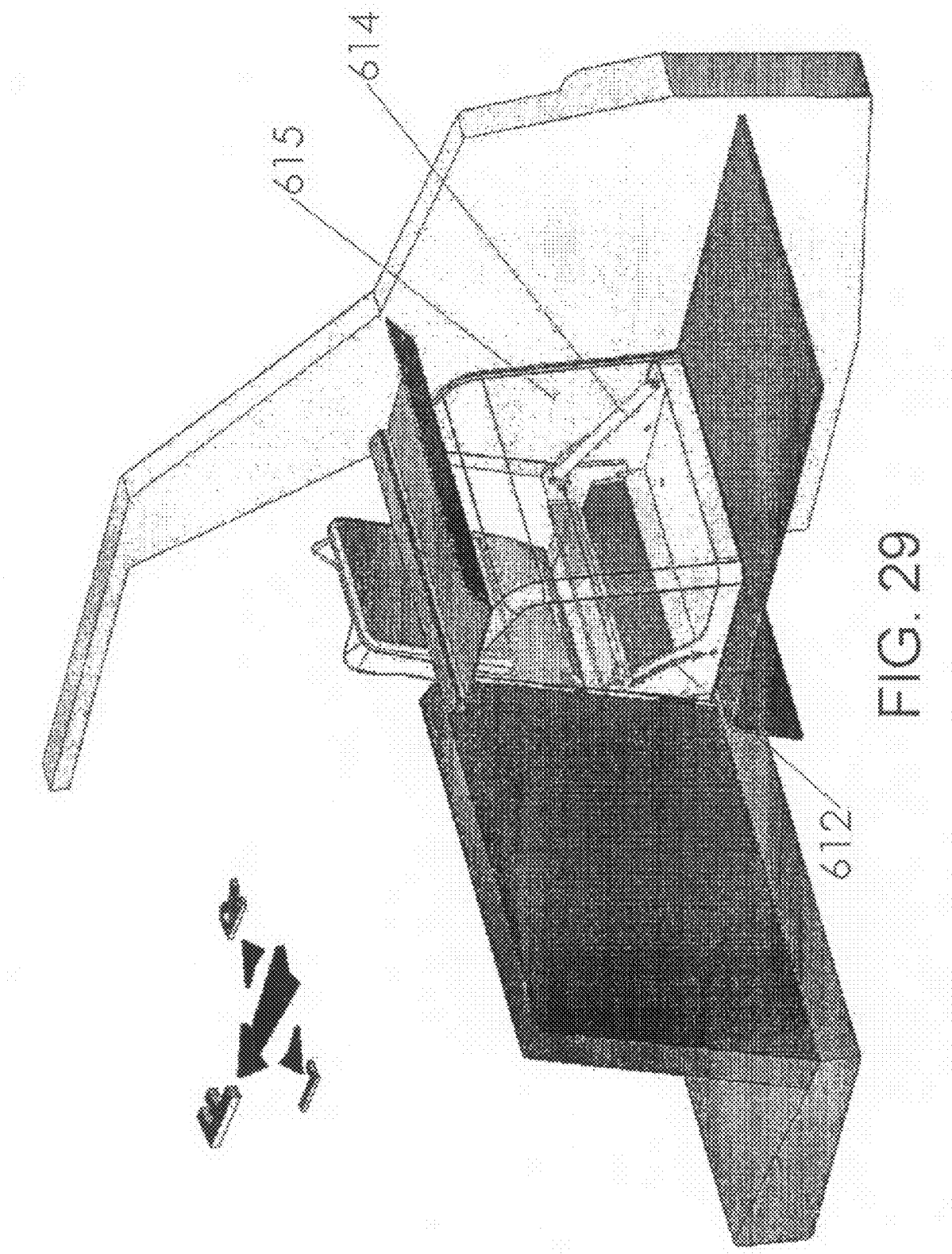
FIG. 29 shows a storage casing for accommodating the seat in its storage state, and which also buffers between the seat and the trunk.
Figure 30:
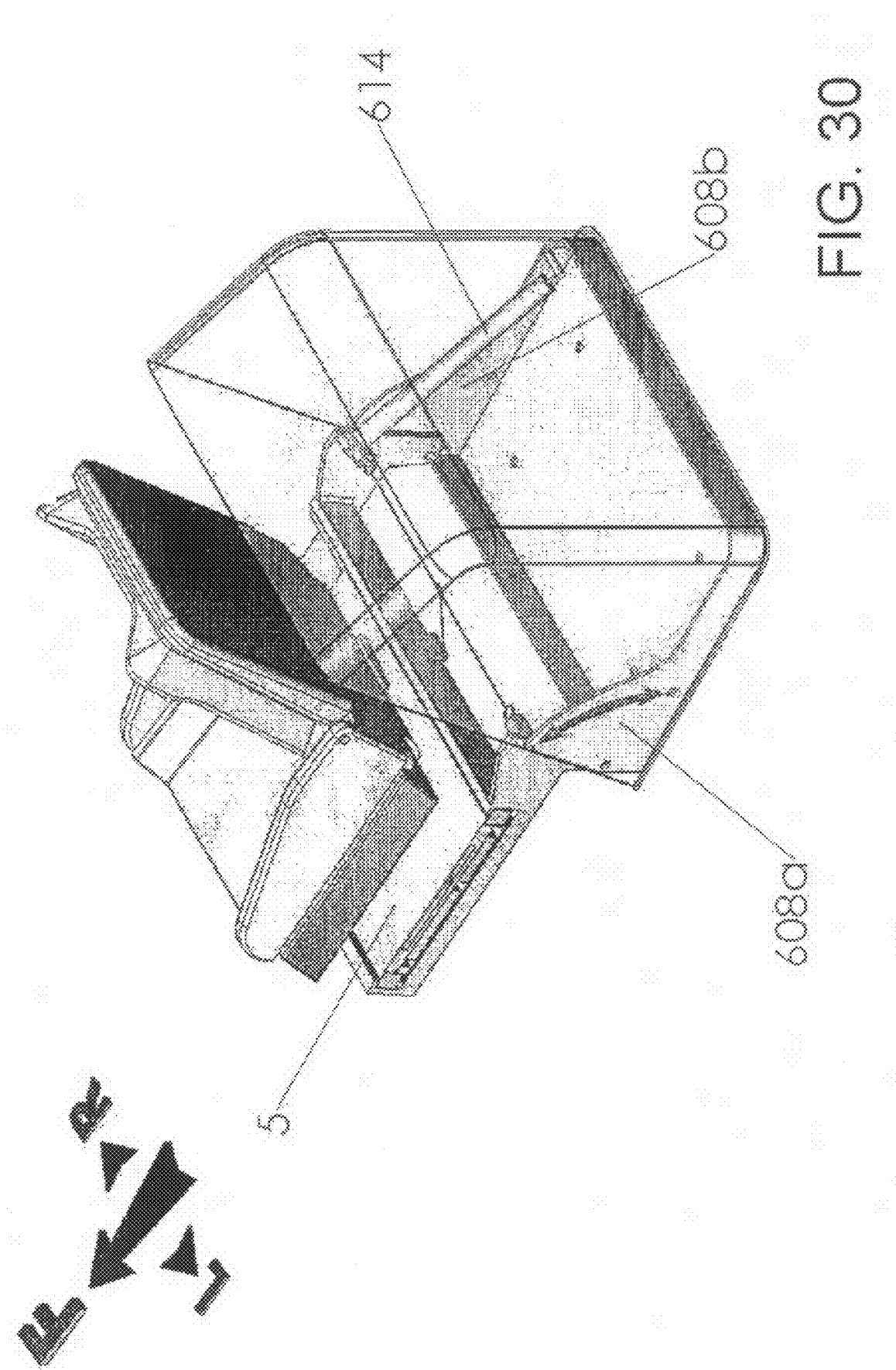
FIG. 30 is another view showing the storage casing and the baby seat in its normal use state.
Figure 31:
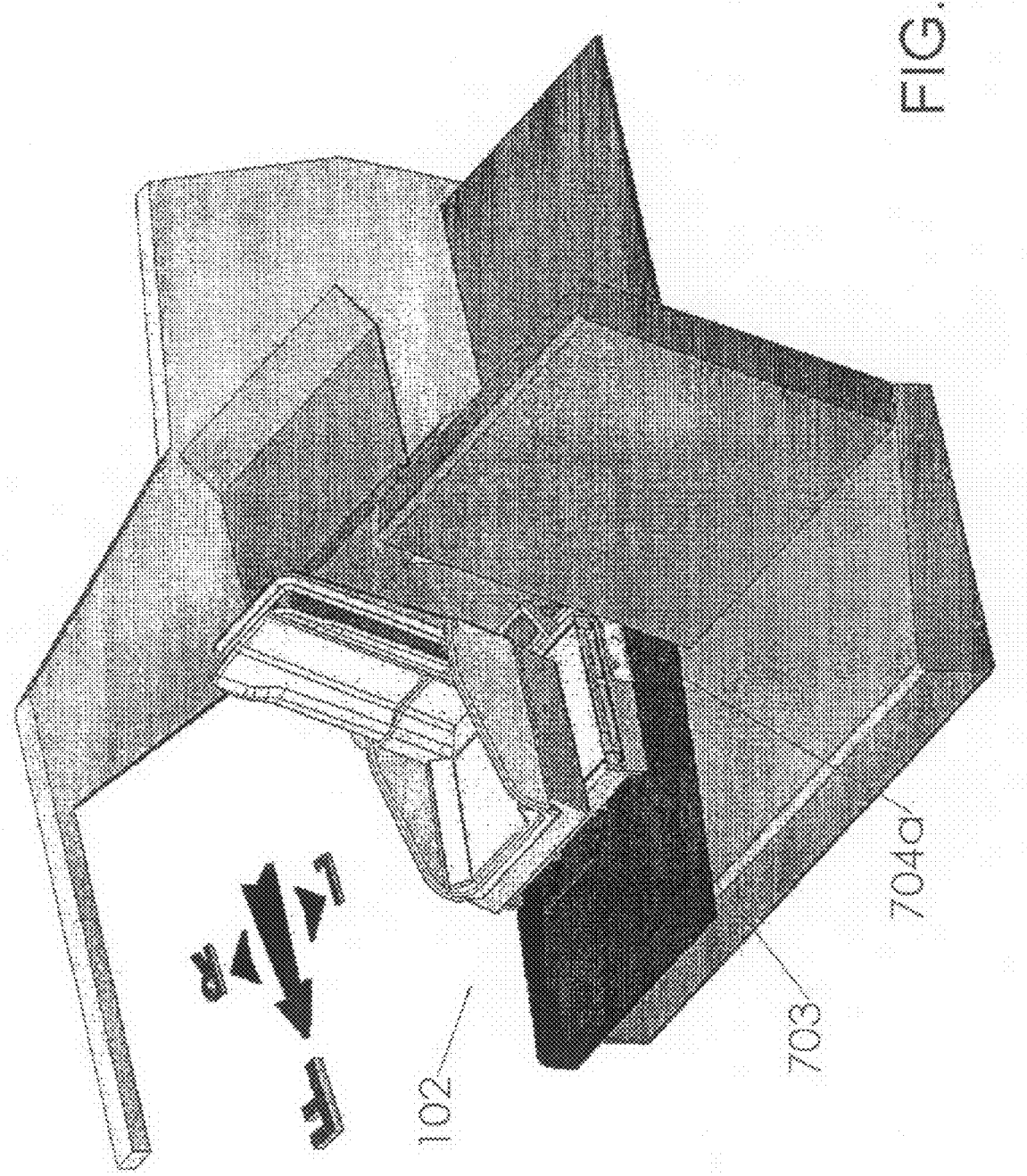
FIG. 31 shows a second embodiment of the base unit and the seat in their normal use state.
Figure 32:
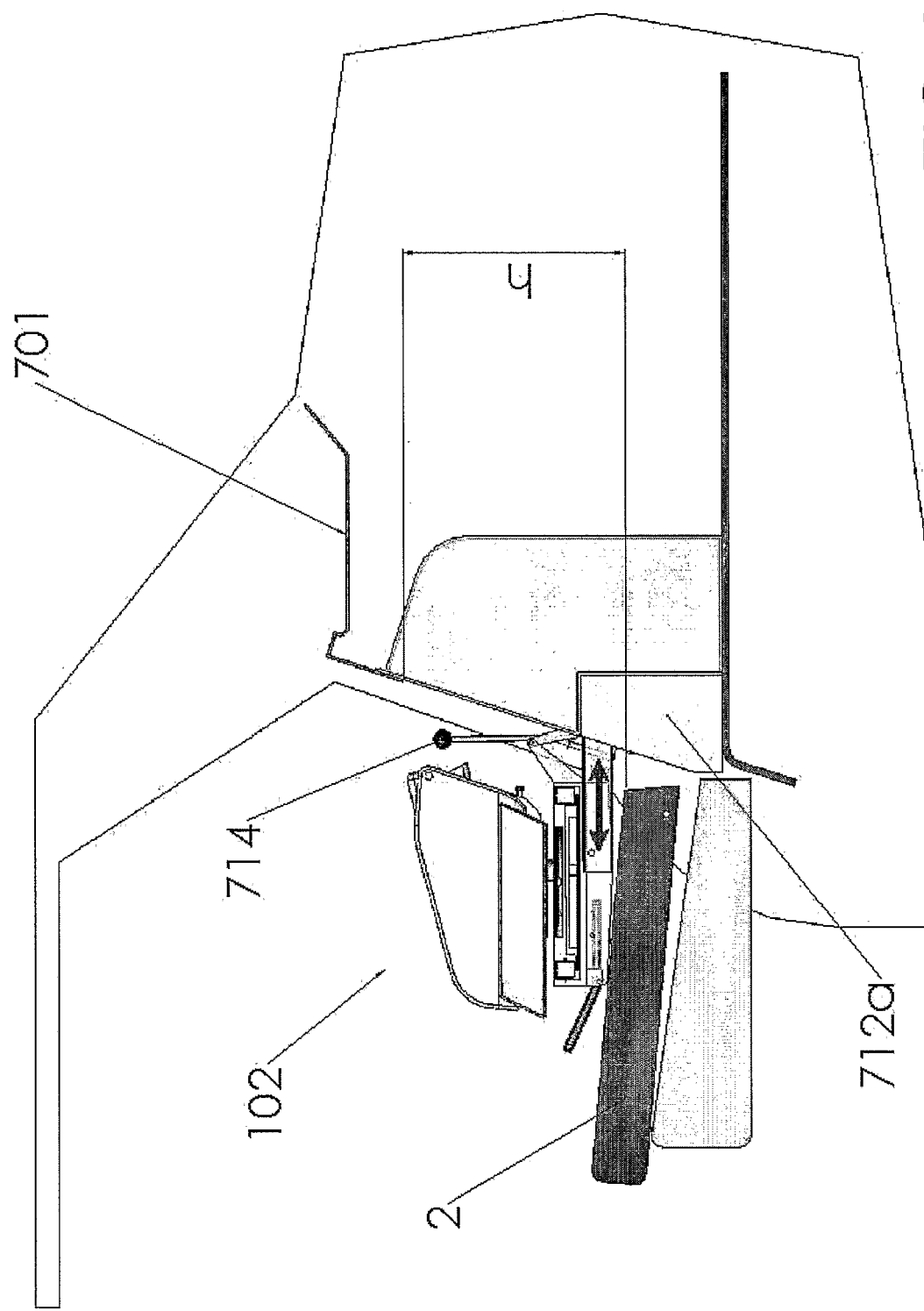
FIG. 32 is a side view showing the second embodiment of the base unit in its normal state, but with the seat folded.

FIG. 26 shows a first embodiment of a base unit 600. The base unit 600 comprises two main portions: a stationary portion 602 which is attached to the bottom surface 601 of the trunk by means of screws (not shown), and a foldable support 603 which is attached to said stationary portion by means of axle 604. The foldable support 603 can rotate about axle 604, therefore defining two states of the base unit 600, a folded state as shown in FIGS. 26, and 28, and active state as shown in FIGS. 27, 29, 30. The base of the seat is rigidly attached to the upper surface 605 (FIG. 27) of the foldable support 603 by any conventional means, for example by means of screws (not shown). The said foldable support 603, and particularly its upper surface 605 may have any suitable configuration as known to a skilled person in order to securely maintain and support the base 5 of the seat, for example as shown in FIG. 27. The foldable support 603 is maintained in either one of the two states of the unit (folded or active) by means of two security pin units 606a and 606b, which are located at the two opposing sides of support 603. The two pins are preferably of a type conventional in the art, and they are provided with springs enforcing the pins outward into corresponding holes, either holes 607a, 607b (in the active state) or 608a, 608b (in the folded state). Transversal string 609 connects between the two pins, and is attached correspondingly to each of the pins by means of a hole in the spring, or by means of a ring, which is in turn connected to the pin. The transversal string 609 is maintained stretched by means of the force of the two springs within the pin units 606a, 606b (not shown). A first side of longitudinal string 610 is connected to string 609 about at its middle. The other side of longitudinal string 610 is connected to (or preferably wounded around) pulley 611 (FIG. 28), which in turn connected to releasing handle 613. The releasing handle is normally maintained in a standby state in which it does not stretch longitudinal string 610. However, when a need arises to switch the foldable unit from one state to another (folded state to active state, or vice versa), the releasing handle 613 is switched to its release state in which it causes additional wounding of string 610 around pulley 611, therefore causing further stretching of string 610, which in turn further stretches the transversal string 609, thereby releasing the pins from the corresponding holes. In that case, the foldable support 603 is free to rotatably move from a first of its two states to the other (i.e., from a folded (storage) state to the active state, or vice versa). In that case, the pins move along a circular route 612 until they arrive to the second pair of the side holes, in which the base unit is locked again. The unit is preferably also comprises a spring or gas spring 614 which helps in moving the foldable support between the two states. As shown in FIG. 27, and in order to save space, the baby seat itself is folded before switching the base unit 600 into its storage state. FIG. 30 shows the base unit and the seat in their normal use state. Preferably, the system also comprises a storage casing 615 (FIG. 29) which buffers between the seat 1 and the trunk.

FIGS. 31 to 35 show a second embodiment of the base unit. There are car models in which the folding of the portion of the back seat support 2 does not provide a high enough h opening (shown in FIG. 32) for accepting the baby seat into the trunk while transferring it into the storage state. In that case, the first embodiment of the base unit of FIGS. 26 to 30 cannot be used. The second embodiment of the base unit is therefore suitable particularly for cases in which there is a limited h opening. This is generally due to some type of an upper buffer 701 that exists in such car models.

Figure 33:
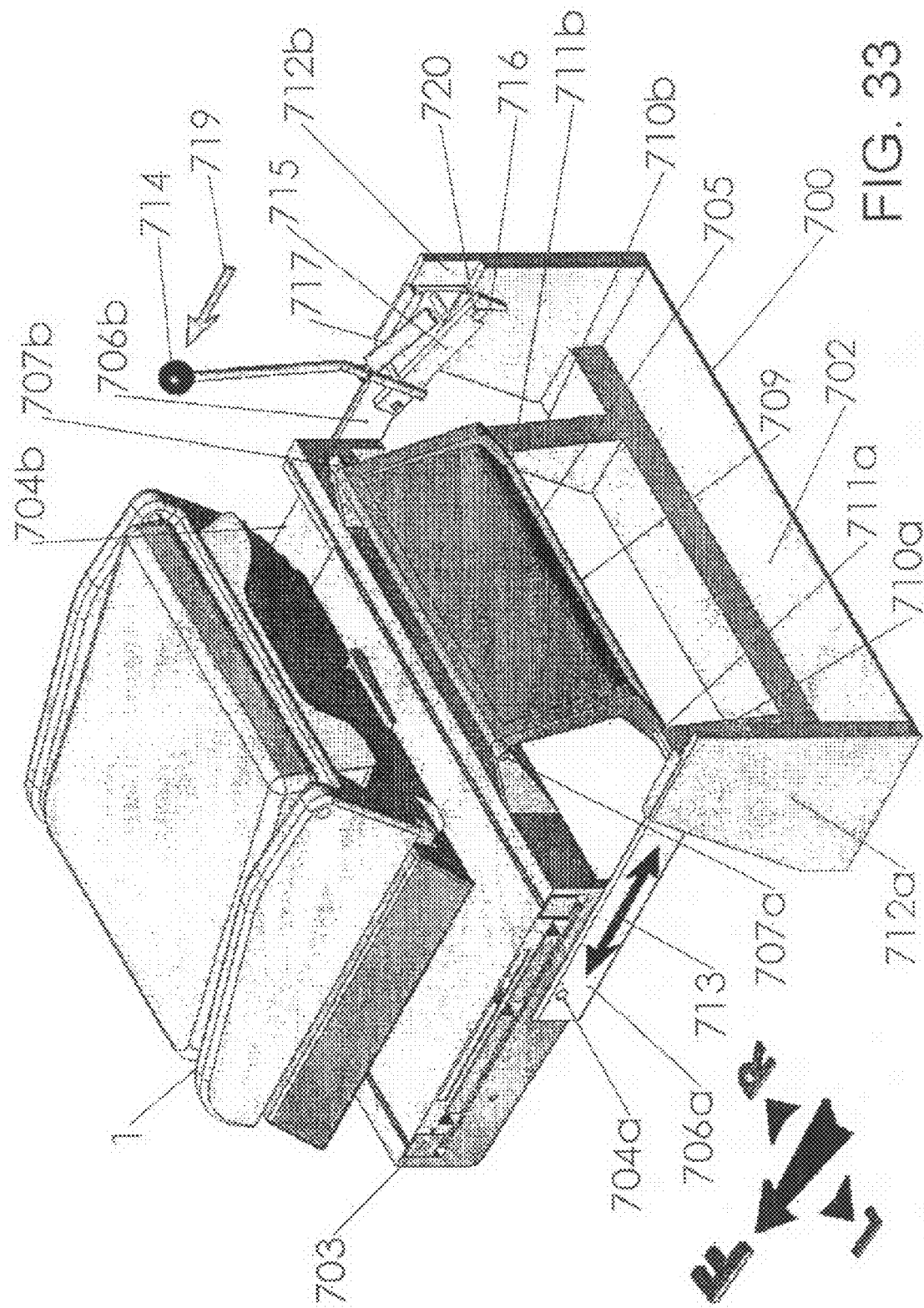
FIG. 33 also shows the second embodiment of the base unit, in its normal state, but with the seat folded.

With reference to FIG. 33, the bottom surface 702 of the base unit 700 is attached to the bottom surface of the trunk (not shown in this figure) by any conventional means. In the most preferable case, some connecting screws that already exist in the trunk at the location of the base unit are used for connecting the base unit to the bottom of the trunk, therefore eliminating the need for drilling new holes for the screws. The multi-portion base (which includes, for example, portions 501, 502, 503 of FIG. 14) of the baby seat is indicated by numeral 703. Base 703 is connected to rails 706a and 706b, and can be rotated about a first axis which is defined by axles 704a and 704b (not shown). The base is also connected to a first side of L-shaped plate 705 and is rotatable about second axle 707 passing through locations 707a and 707b at said first side. The L-shaped plate 705 is rotatably connected at its other side 709 to two essentially vertical extensions 710a and 710b which extend from the bottom surface 702 of the base unit. The L-shaped plate can therefore also rotate about third axial points 711a and 711b. The rails 706a and 706b, are so connected to the two side extensions 712a and 712b that in some condition they can slide in the horizontal direction as marked by arrow 713. Handle 714 is used for switching the seat between a storage state (at the trunk) to a normal use state. Handle 714 is rigidly attached to arm 715, which has in its other end a recess 716, that is adapted to accept a blocking pin 720. Spring 717 is used for assisting in the transfer of the seat between the two, storage and normal use states.

Figure 34:
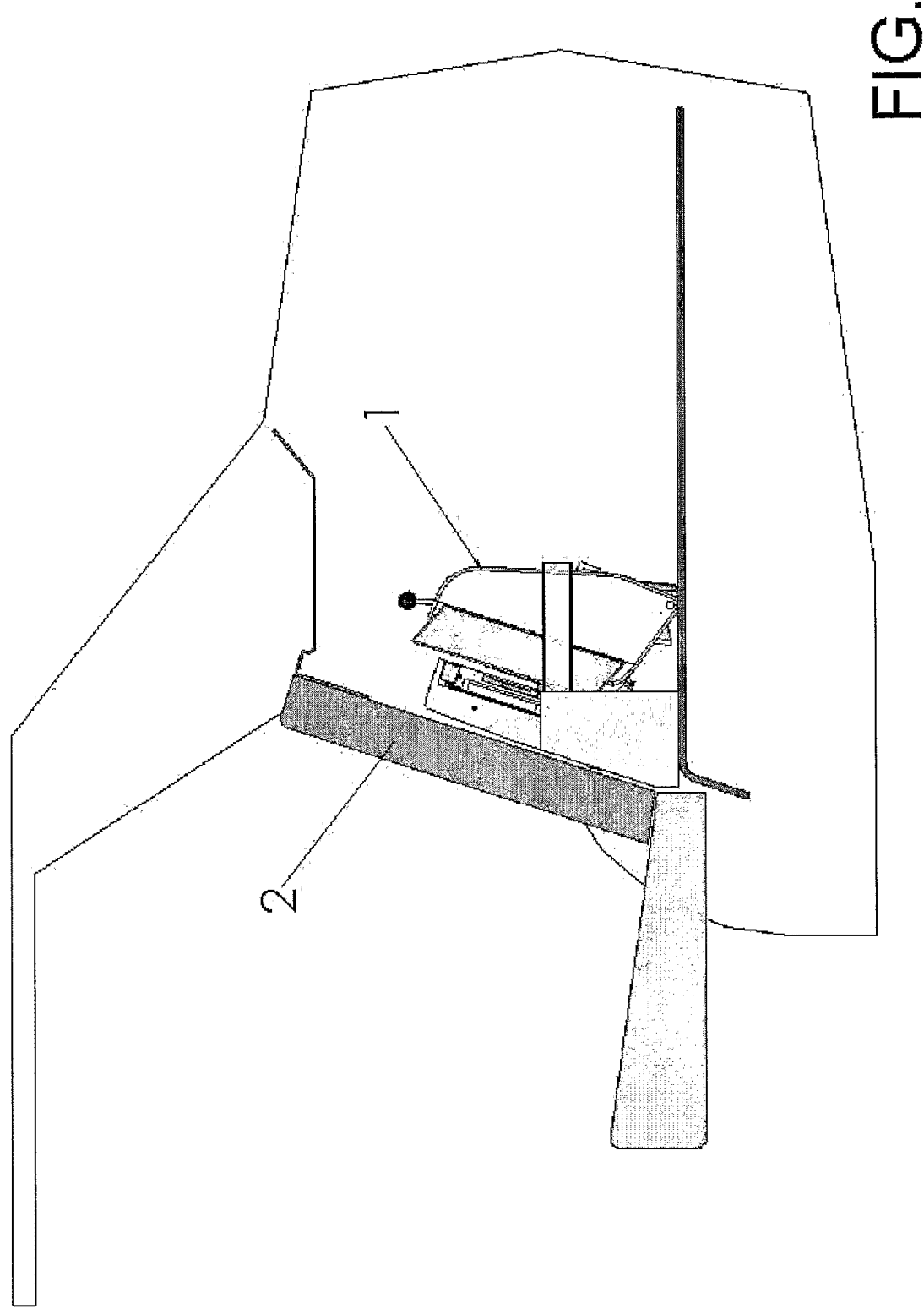
FIG. 34 shows the second embodiment of the base unit, folded within the trunk.
Figure 35:
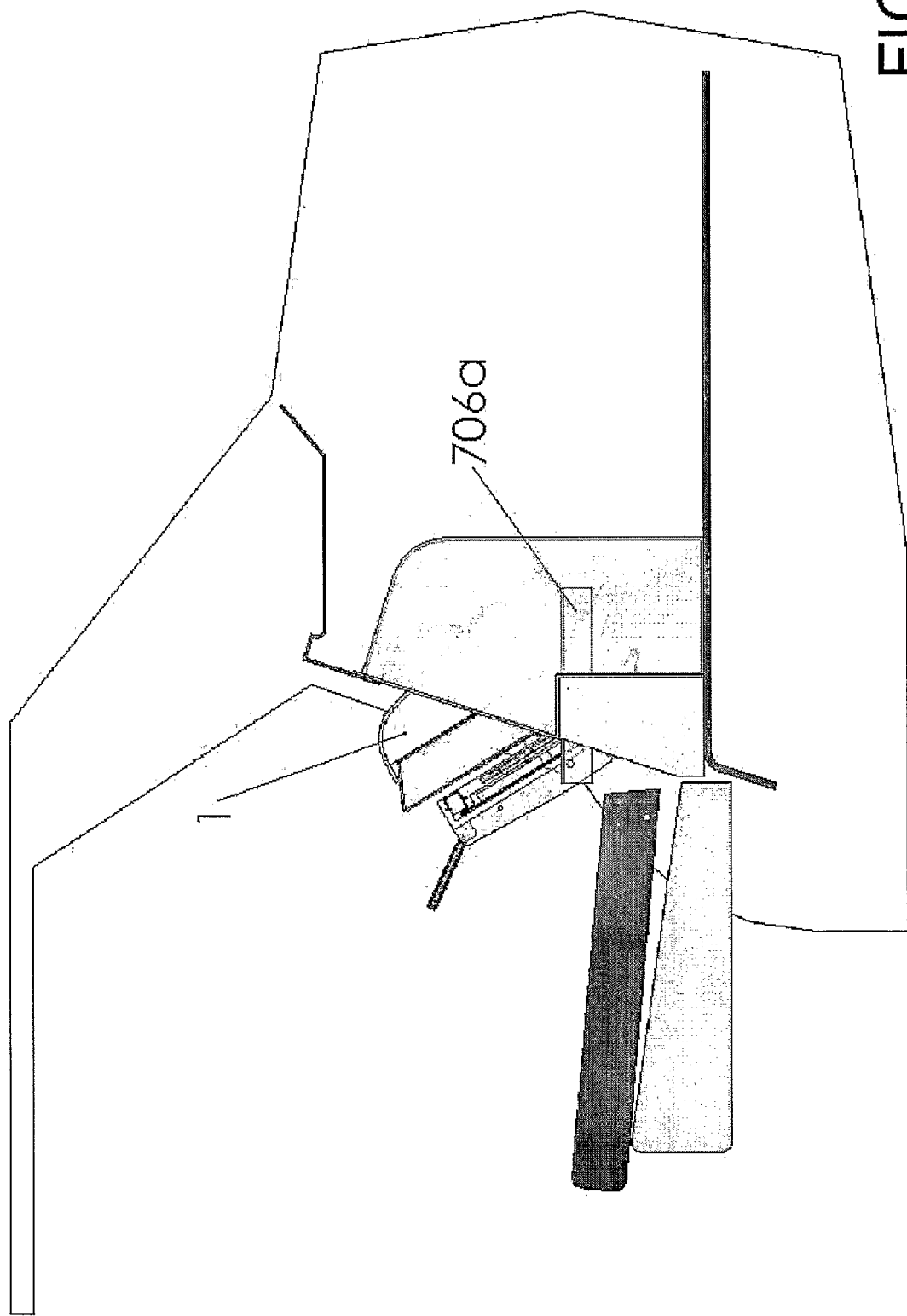
FIG. 35 shows the second embodiment of the base unit, in a transitional state between a folded state within the trunk and a normal use state.

FIG. 33 shows the baby seat in its normal use state. In that case, the seat 1 is in a horizontal orientation, and arm 715 secures the seat in that state, as the blocking pin 720 which is located within recess 716 prevents any movement. Whenever there is a need to switch to a storage state of the seat 1, the handle 714 is pulled in the direction shown by arrow 719. This action releases plate 715 from the limitation caused by pin 720. In that case, rails 706a and 706b are free to slide toward the trunk with the seat 1 (with its back folded). FIG. 35 shows the system in its transit toward the storage state. It can be seen that rails 706 moved in the rear direction into the trunk. Initially, the seat 1 moves in a horizontal direction, but at some stage, the horizontal movement of rails 706a and 706b causes the L-shaped plate 705 to rotate about axis 711, rotation which enforces seat 1 to rotate toward a vertical orientation as shown in FIG. 35. FIG. 34 shows the seat in its storage state. It can be seen that the seat 1 is in a vertical orientation, and the back support 2 is in its normal state, enabling adults to sit in a normal manner.

FIGS. 36 to 44 show a baby car seat system according to a third embodiment of the invention. While in the first two embodiments, when the baby seat is in the center-car state it occupies two passengers' seats, according to the third embodiment the baby seat occupies only one passengers' seat, no matter where it is positioned. Furthermore, while in the first two embodiments in an active (normal baby operation) state one back support of the rear passengers' seat has to be maintained folded, in the third embodiment this requirement is eliminated.

FIGS. 36 to 44 show a general view of the system 800 according to the third embodiment. The baby seat 801 is supported by a seat support arm 815, having an S-like shape. At the trunk, adjacent and parallel to the back support unit 830 of the rear seat, and transversal to the car, an elongated plate 825 is mounted.

The plate 825 is firmly attached, e.g., by means of screws to the floor of the trunk. The elongated plate has a slot 823, in which a distal end of the arm 825 is mounted in such a manner that it can slide along the slot.

The rear passengers' seat 870 is modified with respect to the structure of the conventional prior art rear passengers' seat. It comprises the back support unit 830, and the lower support 840. Each of the portions 802, 805, and 803 of the back support 830 can be separately folded (see for example FIG. 41) toward the lower support 840 in a conventional manner. Furthermore, whenever in the normal state of the rear seat, a transversal slot 816 is formed between the back support 830 and lower support 840 of the seat. The slot 816 extends essentially through all the length of the rear passengers' seat, except the two end locations (left most and right most) in which the two back support portions 803 and 802 are hingedly connected to lower portion 840. In this manner, the arm 815 which carries the seat 801, and which passes through slot 816 can transversally slide from the left to right and vice versa, and therefore can accordingly position the baby seat 801 essentially at any location along this route.

Figure 38:
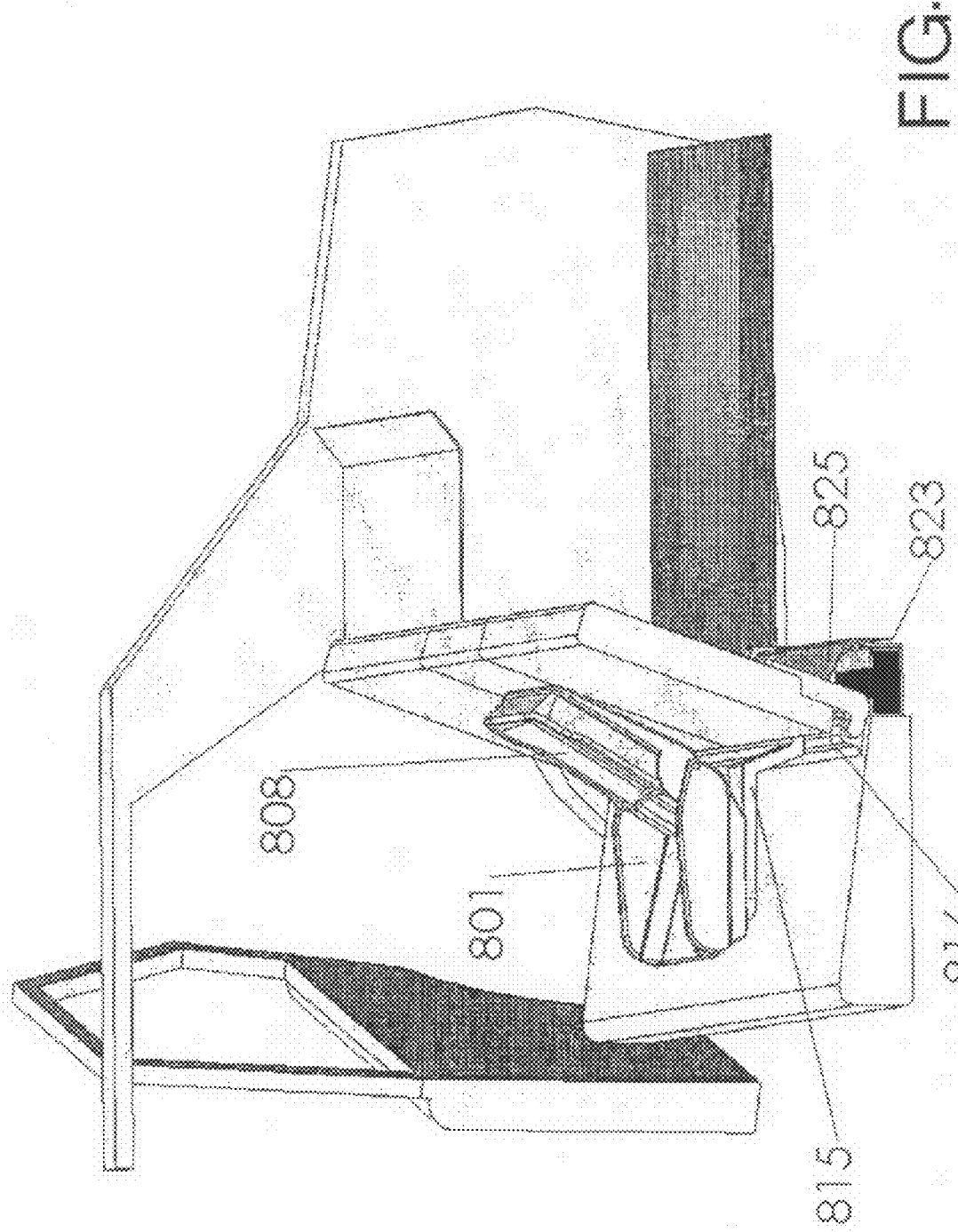
FIG. 38 shows the baby seat of FIG. 36, at its normal use state, while being positioned at the center of the car.
Figure 39:
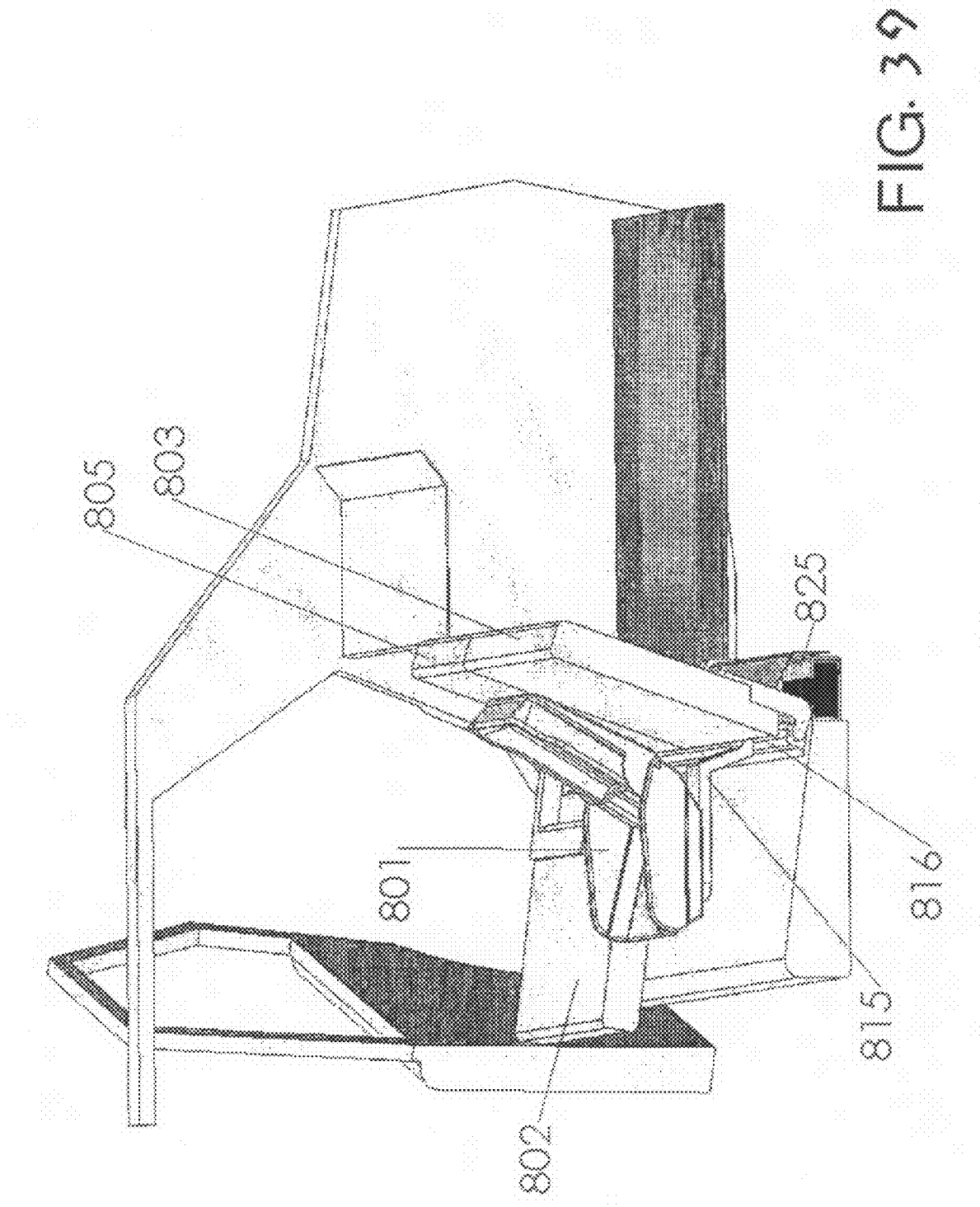
FIG. 39 shows the baby seat of FIG. 36, in its normal use state at the center of the car, while a portion of the back support of the rear passengers' seat being still folded.

As shown by arrow 838 (FIG. 44), the baby seat 801 can be raised and positioned in the trunk in an erected orientation (not shown in FIG. 44), or lowered (of course when support portion 802 is folded) to the passengers space of the car. Whenever in the trunk, the baby seat 801 is in its storage position, as described with respect to the previous embodiments. Of course, when in the storage position, the back support 802 is generally raised in order to enable a conventional use of the rear passengers' seat 870 by three adults. In order to bring the baby seat 801 into use, the back support portion 802 is first folded, and then the seat 801 is lowered into the passengers' space as shown, for example, in FIGS. 37, and 44. Next, the seat is transversally pushed toward the central back portion 805, and in this stage the folded portion 802 can be raises into its normal state, as shown in FIG. 38. At this stage, when the three back support portions are in their conventional states, the baby seat 801 can slide to essentially any transversal location along the rear passengers' seat. For example, the baby seat 801 can be positioned in the preferable, safest location for the baby in the center of the car (next to portion 805), at the right of the car (next to portion 802), or at the left of the car (next to portion 803). Of course, suitable stoppers (not shown, but conventional in structure) have to be provided in order to maintain the baby seat 801 in each of said positions.

Figure 40:
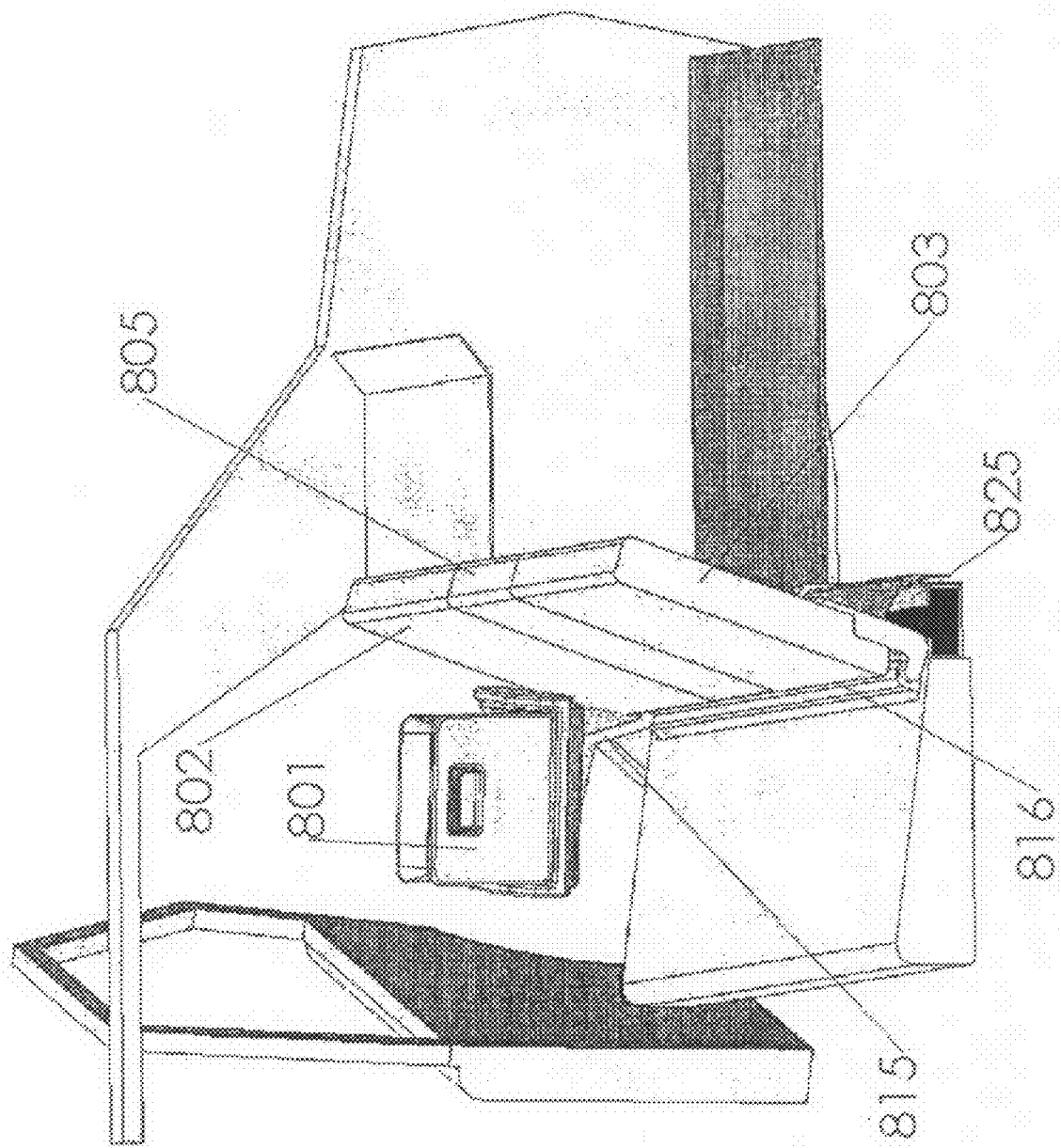
FIG. 40 shows the baby seat of FIG. 36, in its loading/unloading state.
Figure 43:
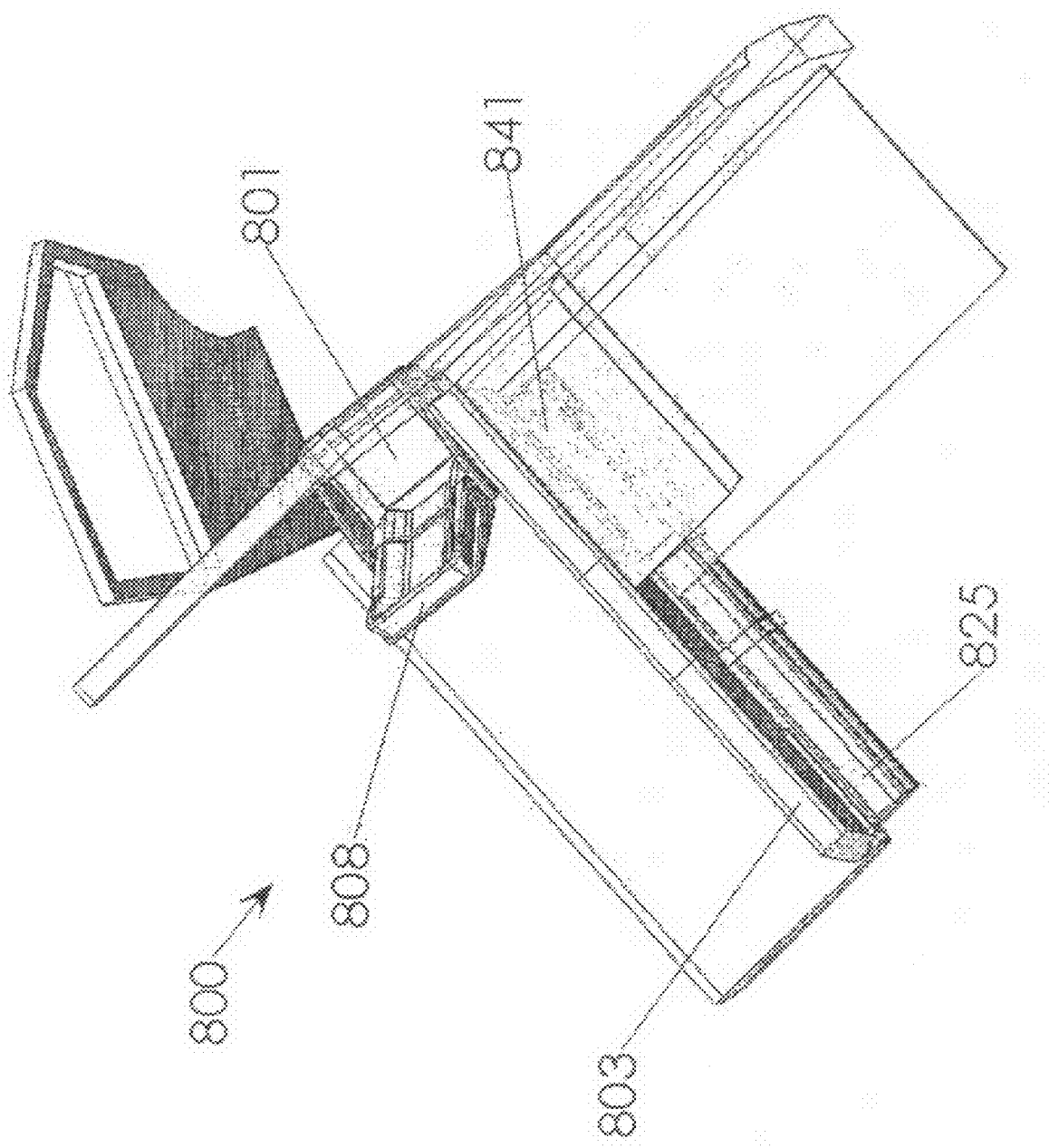
FIG. 43 shows a top view of the third embodiment of the invention, in the loading/unloading state.
Figure 44:
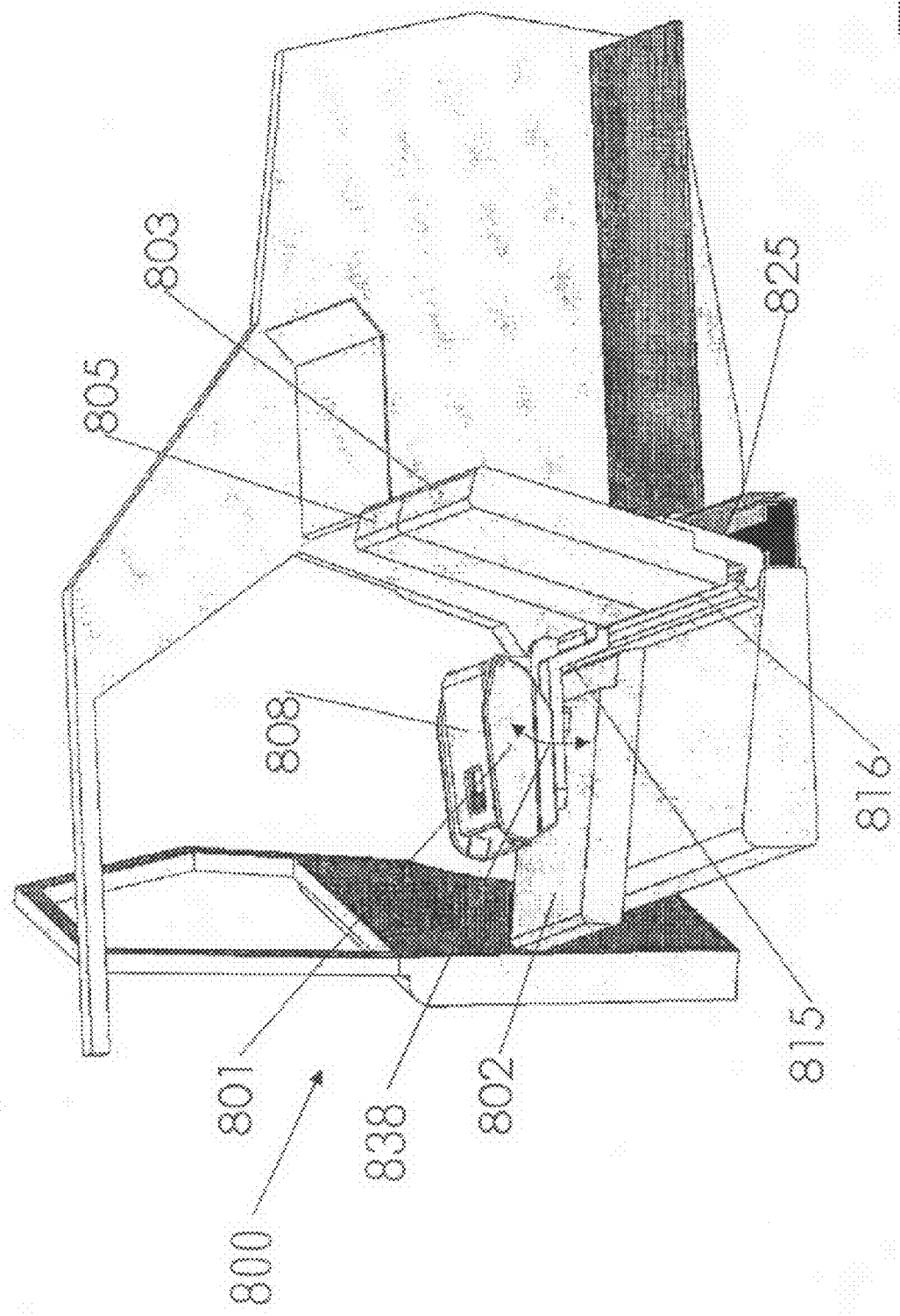
FIG. 44 shows the baby seat of j FIG. 36, in a transitional state toward the normal use state.

As described also with respect to the first two embodiments of the invention, the car seat 801 also has a loading/unloading state, partially out of the car space. As shown in FIG. 40, in order to bring the baby seat 801 into its loading/unloading state, the baby seat 801 is rotated about a vertical axis (not indicated) to enable an easy loading or unloading of the baby, in a similar manner to the seats of the first two embodiments. Furthermore, and as shown in FIG. 43, the arm 815 may have some degree of freedom rotation at its distal end close to the longitudinal plate 825 in order to bring the baby seat 801 at least partially out of the car space, thereby to provide even more convenient loading or unloading, and to enable rotation of the baby seat without requiring additional space in front and behind the seat. As said, there are several elements which limit the rotation of the baby seat when it is located inside the car. For example, in order for the rotation to be possible, there must be provided some space between the baby seat and the back support of the rear passengers' seat and from the baby seat and the front (for example, the driver) seat. Otherwise, the rotation may be cumbersome, inconvenient, or even impossible. The fact that the rotation of the baby seat takes place at least partially outside of the car space eliminates said limitation. This comment and the advantage resulted from it applies to all the embodiments of the invention as described.

Figure 42:
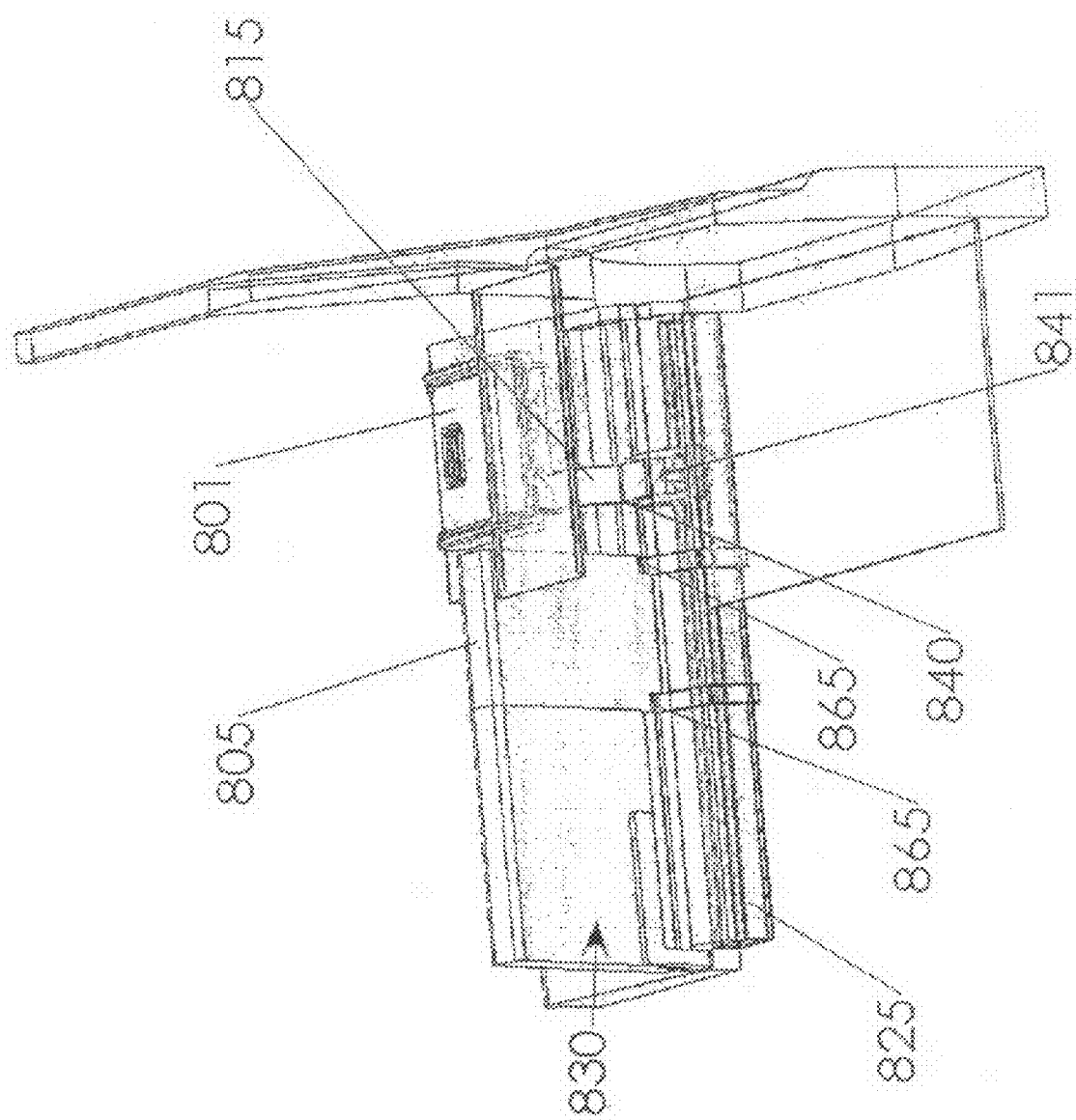
FIG. 42 shows a view of the third embodiment of the present invention, as seen from the trunk.

Following are the degrees of freedom the system has: FIG. 42 shows the folded baby seat 801, while being at the passengers' space, as seen from the trunk. Horizontal hinge 840 enables raising the baby seat by means of arm 815 in order to position it in the trunk in its stored state, or lowering the arm 815 in order to bring the baby seat into its active state within the passengers apace. Moreover, the arm 815 may be rotated about hinge 841 in order to bring the baby seat at least partially out of the car space in the loading/unloading position. Furthermore, as said the arm 815 can slide right or left along slot 823 (shown in FIG. 37). Finally, the seat is rotatable about a vertical axis in order to bring the car into a loading/unloading state, or return it into a normal use state.

Figure 36:
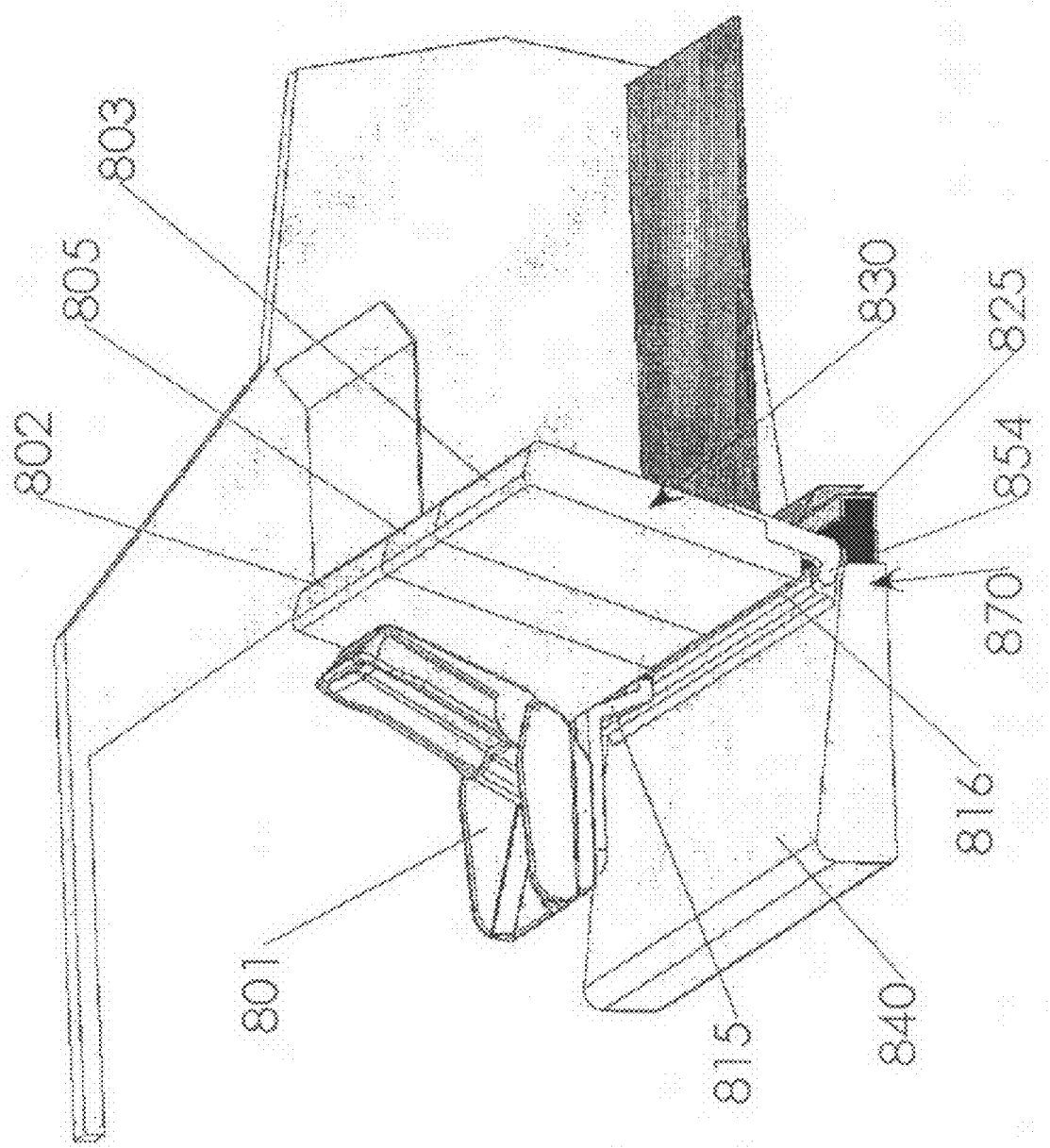
FIG. 36 shows a general view of a baby car system according to a third embodiment of the invention.
Figure 37:
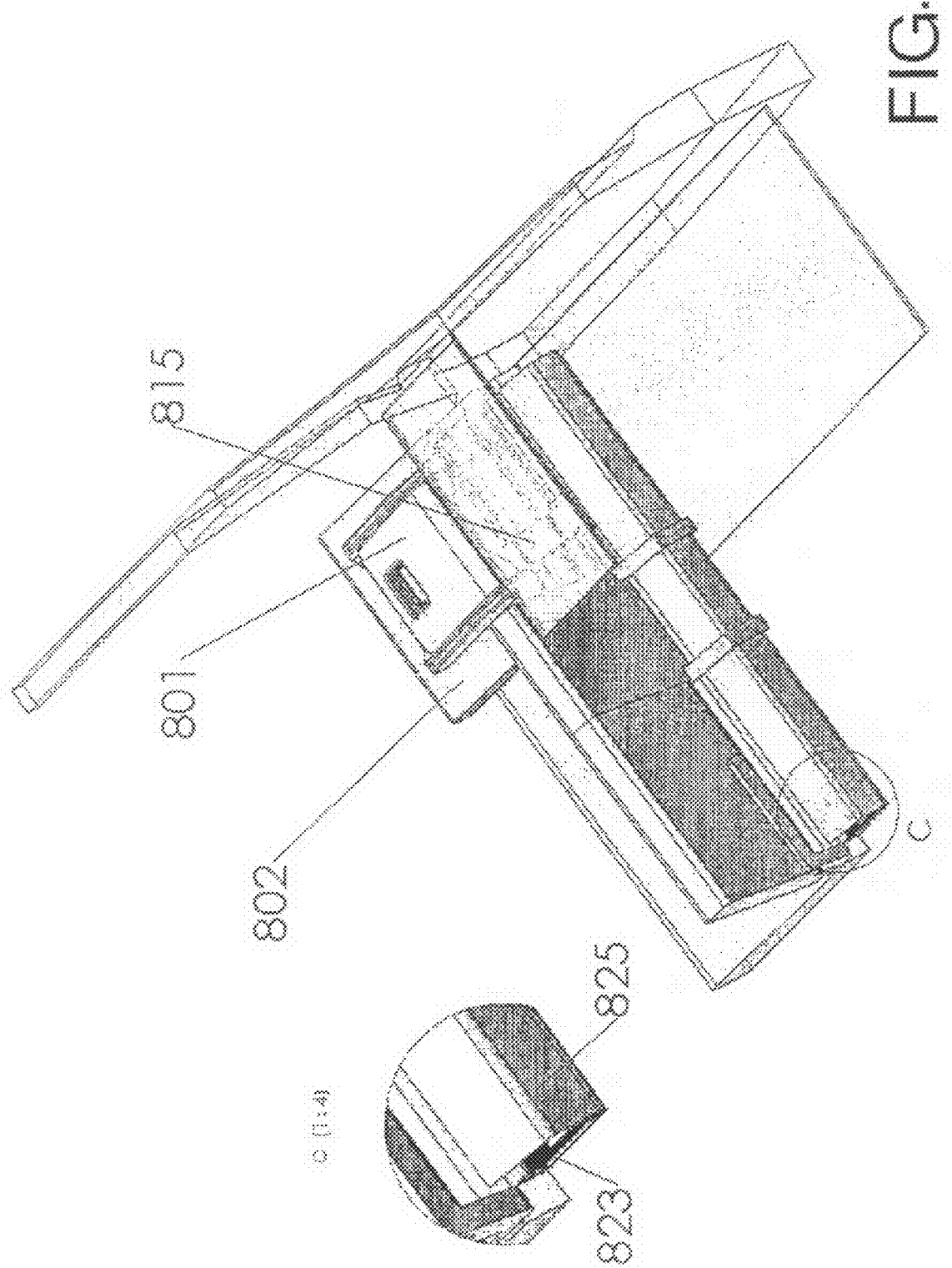
FIG. 37 shows the baby seat of FIG. 36, in a transitional state toward a normal use state.
Figure 41:
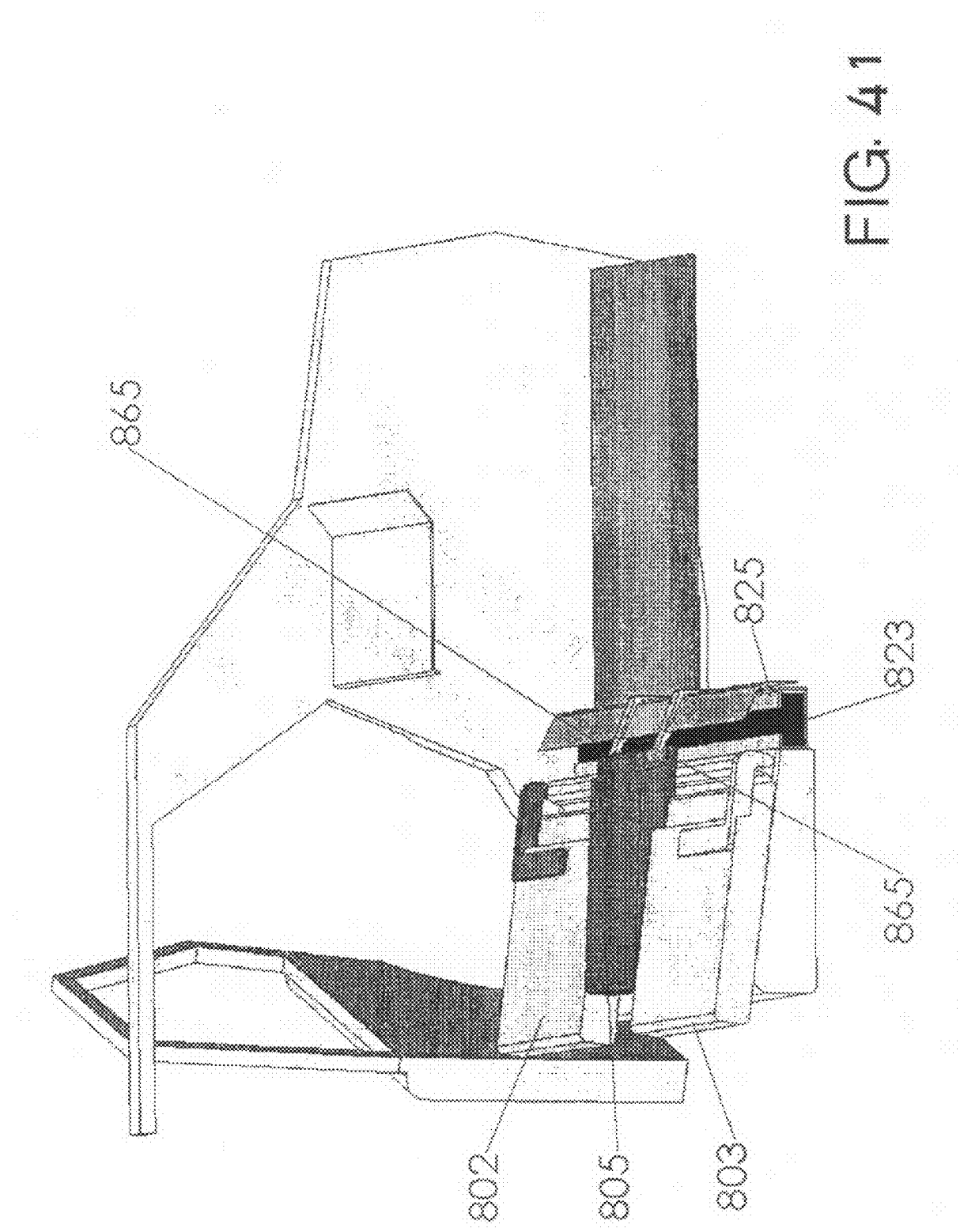
FIG. 41 shows the rear passengers' seat while all the back support portions are folded, showing their structure according to the third embodiment of the invention.

As said, the back support portions 802, 805, and 803 of the rear passengers' seat are also modified with respect to conventional prior art seats. They are made slightly shorter than the conventional ones, in order to provide the necessary transversal slot 816. Each of the side support portions 802 and 803 are hingedly connected to the lower portion 840 at only one of their end side, the one close to the side door of the car. The one hinge 854 location of back support 803 is shown in FIG. 36. The middle back support portion 805 is hingedly connected to the floor of the trunk, behind the plate 825, by means of two extensions 865. In this manner the back support portion 805 forms a space at its bottom from the lower seat portion 830, but can still be folded. Moreover, the extensions formed in this manner do not block the full transversal sliding of arm 815, which supports seat 801. FIG. 41 shows the three back support portions 802, 805, and 803 in their folded state (without baby seats).

It should be noted that the system of the third embodiment can support up to three baby seats. Of course, when three baby seats are used, the two extreme seats that are close to the car doors cannot slide to the middle of the car. However, they can still be rotated to the loading/unloading position partially out of the car space as described, and can still be stored within the trunk.

Figures 45A, 45B:
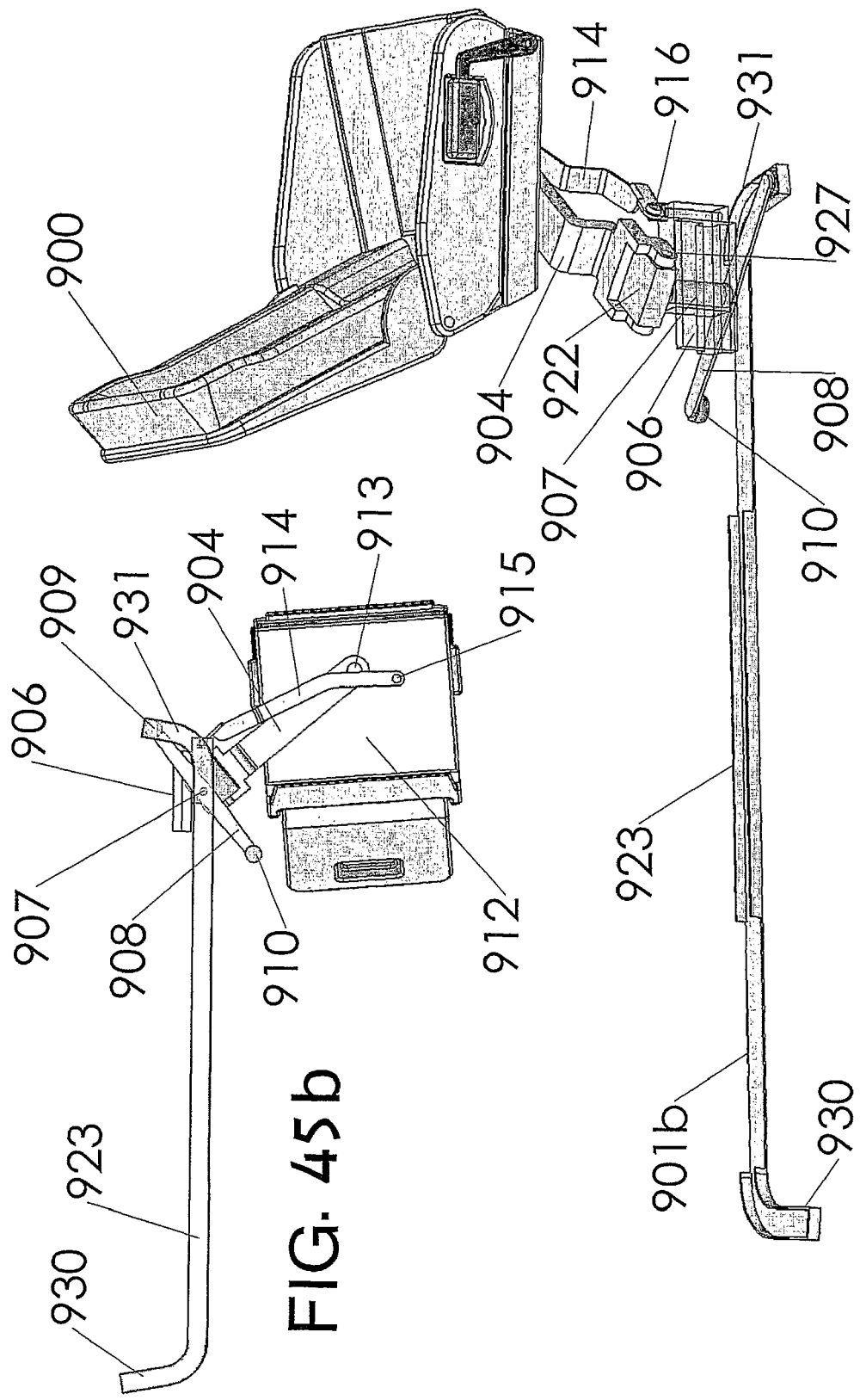
FIG. 45*a* is a schematic perspective view illustrating a synchronized system for gradually bringing the baby seat of the third embodiment into its loading/unloading state.
FIG. 45*b* is a bottom view of the system of FIG. 45*a*.

FIGS. 45a, 45b, 46a, 46b, and 46c disclose an improvement system to the baby seat system of said third embodiment, which includes synchronization between the linear transversal movement of the seat and its rotation movement when the seat approaches the door location, a synchronization similar to as discussed with respect to the first and second embodiments embodiments. As described before, the seat is positioned on an arm 904, which is in turn attached to a first end of axle 907 by means of support arrangement 922. The support arrangement 922 on one hand is firmly attached to a first end of axle 907, and on the other hand comprises a horizontal axle 927 for enabling folding of the seat into the trunk during the storage state. The seat axle 907 is positioned within carriage 906, which in turn is arranged to move to the right and left along a main rail 902. In its second end, axle 907 is firmly attached to a guide means. The guide means comprises a guide arm 908, with two rollers 909, and 910 at it two opposite ends. The guide means moves along a secondary rail 923, or more particularly, the two rollers 909 and 910 of the guide means are enclosed within a slot in secondary guide rail 923. Secondary guide rail 923 has curves 930 and 931 in its two opposite ends close to the car doors, wherein said two curves lead the corresponding roller to a direction facing the back of the car. Furthermore, secondary guide rail 923 has two short openings 901*a* and 901*b* proximate to the two doors, to enable exit of a first of the two rollers 909 or 910 from the secondary guide rail 923 while the second of said rollers moves is maintained within curve 930 or 931. Therefore, and as shown in FIGS. 45*a* and 45*b*, when roller 909 approaches and starts to move along curve 931, it causes gradual rotation of guide arm 908, therefore forcing roller 910 out of secondary rail 923. Roller 909, however, is maintained within the secondary arm 923. The said rotation of guide arm 908 causes rotation of axle 907, therefore also rotation of the arm 904. As best shown in FIGS. 45*a*, and 45*b*, the system also comprises an assisting arm 914. Assisting arm 914 is axially connected in its first end 916 to carriage 906, and its second end 915 is axially connected to the bottom 912 of baby seat 900. Therefore, the rotation of axle 907 and rotation of arm 904, together with rotation of assisting arm 914, cause a gradual rotation of the car seat 900 about its main axis 913 when approaching the door, until reaching the loading/unloading position in which the seat is positioned at least partially outside of the car space, as described above. By means of partially, it is meant at least 25% outside of the car space. It should be noted that assisting arm 914 helps in increasing the rate of rotation of the seat on one hand (as it is located off the center of the seat), and it also limits said rotation when finally reaching the loading/unloading position. Furthermore, axis 916 enables raising arm 914 in order to bring the seat into its storage state.

When pushing the seat out of the loading/unloading state and toward the center of the car, roller 910 that was out of guide rail 923 gradually returns to the rail such that both of the rollers 909 and 910 are enclosed within the guiding rail 913 as shown in FIG. 46*c*.

An important feature of the seat system of the third embodiment is that the baby seat, while in use is relatively narrow and occupies a relatively small space from the car passengers' seat, and therefore it leaves much space for the other sitting passengers. This is because it does not occupy two passengers' seats as in the first and second embodiments, and as it does not require a relatively large and wide base as in conventional seats.

It is important to note that in all the embodiments of the present invention the approaching into the loading/unloading position is preferably made synchronized in the sense that the seat performs both a transversal linear motion and a rotation motion toward that state. The movement out of said state is also similarly synchronized but in the reverse direction. Furthermore, it is also important to note that in the loading/unloading state the baby seat is positioned at least partially out of the car space. By means of "partially" it is meant that about at least 25% of the seat is positioned out of the car space, and in some cases even 100% of the baby seat is positioned out of the car space, in a rotated orientation in order to enable both loading convenience to the parent and easy rotation of the seat. The movement into and out of the loading/unloading position is preferably synchronized and gradual.

It should be noted that the system of the invention as described includes a baby seat moving by means of rails, or by means of a supporting arm sliding within a slot. Of course, there are various other equivalent ways for providing such a movement (transversal and rotation of the baby seat), as required, all within the scope of the invention.

The invention claimed is:

1. A car baby seat system for operation in a car having a rear passengers' seat, a passengers' space, at least one door and a car trunk, the system comprises:
   a. a baby seat;
   b. a supporting device for the baby seat;
   c. positioning mechanism associated with said supporting device and baby seat for:
      i. transversally moving the supporting device and baby seat along the rear passengers' seat and within the passengers space of the car between at least two states, a first center-car state in which the baby seat is positioned essentially at the center of the rear passengers' seat, and a second side-car state in which the baby seat is positioned next to the car door; and
      ii. supporting the baby seat at a third storage state in which the baby seat is positioned in the car trunk;
   wherein at least the baby seat and a portion of the supporting device are pulled from the trunk to the passengers space of the car when transferring between said third state and one of said first or second states, and pushed back to the trunk when transferring between said first or second states to said third state, wherein said pulling or pushing operations involve at least temporarily folding down a portion of the back support of the rear passengers' seat.

2. The car baby seat system according to claim 1, wherein said positioning mechanism further provides a forth loading/unloading state, wherein at the loading/unloading state the baby seat is positioned at a rotated orientation relative to the normal use orientation, thereby enabling convenience of loading and unloading of the baby.

3. The car baby seat system according to claim 2, wherein in said loading/unloading state the positioning mechanism positions the baby seat at least partially outside the car.

4. The car baby seat system according to claim 3, wherein in the loading/unloading state at least 25% of the baby seat is positioned outside of the car space.

5. The car baby seat system according to claim 2, wherein when a transversal movement is applied to the supporting device and baby seat from said first or second states, and when approaching said loading/unloading state, said positioning mechanism provides to said baby seat a rotation movement synchronized with said transversal movement until finally reaching said loading/unloading state.

6. The car baby seat system according to claim 2, wherein in the loading/unloading state the rotated orientation of the baby seat is between 25° and 90° relative to the car's longitudinal axis.

7. The car baby seat system according to claim 1, wherein the baby seat is foldable, and wherein in the storage state said positioning mechanism positions the baby seat within the trunk in a folded configuration.

8. The car baby seat system according to claim 7, wherein said baby seat comprises two portions, a lower support portion and a back support portion, wherein said back support portion of the baby seat is foldable toward the lower support portion of the baby seat by means of an essentially horizontal hinge type connection between said two portions.

9. The car baby seat system according to claim 1, wherein said positioning mechanism and said supporting device are included within a base, wherein said base is pulled and positioned on top of the rear surface of one of the back support portions of the rear passengers' seat while said back support portion is in its folded down state.

10. The car baby seat system according to claim 9, wherein after the transfer of the baby seat to its storage state within the trunk the back support of the rear passengers' seat is returned to its normal use state.

11. The car baby seat system according to claim 9 wherein the base is a multi-portion base, and wherein at least one portion of said multi-portion base is stationary and positioned on top of the rear surface of a portion of a back support of the rear passengers' seat, when said seat portion being folded down, and wherein at least another portion of said multi-portion base is movable between said at least two transversal states, the center car state, and the side car state.

12. The car baby seat system according to claim 11 wherein said at least another portion of said multi-portion base is also movable to a fourth loading/unloading state at least partially out of the car space at a rotated orientation relative to the normal use orientation, thereby enabling convenience of loading and unloading of the baby.

13. The car baby seat system according to claim 11, wherein the baby seat is supported by the base portion which is movable.

14. The car baby seat system according to claim 11 wherein the base portion which is movable is connected to rails, and wherein said rails are also connected to the stationary portion to enable relative movement therebetween.

15. The car baby seat system according to claim 11 further comprising locking means for preventing relative movement between the stationary and moveable base portions while in normal, driving use.

16. The car baby seat system according to claim 12, wherein said movement and rotation is performed by means of providing at least one wheel having at least one roller connected thereto, and wherein said roller being maintained within at least one slot, and wherein the baby seat being connected to the wheel, and wherein rotation of the wheel causes a corresponding rotation of the baby seat.

17. The car baby seat system according to claim 16 wherein said rotation is obtained by means of providing a curve within the slot.

18. The car baby seat system according to claim 11, further comprising a seat carriage connected to said movable base portion, said carriage being adapted for selectively receiving either a seat for an older baby or a seat for an infant.

19. The car baby seat system according to claim 18, wherein during driving with the older baby seat, the head of the baby faces the driving direction, and during driving with the infant seat, the head of the baby faces the rear of the car, opposite to the driving direction.

20. The car baby seat system according to claim 19, further comprising a switch for causing a first direction of rotation when using an older baby seat and approaching a loading/unloading state, and an opposite direction of rotation when using an infant seat.

21. The car baby seat system according to claim 11, wherein the multi-portion base of the baby seat is supported by a base unit, wherein said base unit having a first portion which is connected to the bottom surface of the car trunk, and a second portion which is movable between two states, a normal use state in which it supports the baby seat within the passengers space of the car, and a storage state in which it maintains the baby seat within the space of the trunk.

22. The car baby seat system according to claim 1, wherein the supporting device is an arm which protrudes at least during said first and second states from the trunk into the passengers' space of the car through a transversal passengers' seat slot formed between a back support of the rear passengers' seat and a lower portion of said passengers' seat, said arm having a proximal end which supports the baby seat, and a distal end which is connected at the trunk to said positioning mechanism.

23. The car baby seat system according to claim 22, wherein said positioning mechanism further provides a fourth loading/unloading state, wherein at the loading/unloading state the baby seat is positioned at a rotated orientation relative to the normal use orientation, thereby enabling convenience of loading and unloading of the baby and wherein the system further comprises axial means at essentially the proximal end of said arm for enabling rotation of the baby seat about a vertical axis relative to the proximal end of the arm.

24. The car baby seat system according to claim 22, wherein said positioning mechanism at the trunk comprises at least a transversal plate attached to the trunk floor, said plate having at least one guiding slot adapted for guiding said arm at least transversally while moving between said first and second states.

25. The car baby seat system according to claim 24, wherein said guiding slot elongates along at least most of the width of the car.

26. The car baby seat system according to claim 24 wherein said guiding slot is further adapted to provide to said arm a synchronized transversal and rotation movement while approaching a loading/unloading state.

27. The car baby seat system according to claim 24, wherein the distal end of said arm is connected to a carriage, and wherein said carriage is slidably connected to said plate via said at least one guiding slot, and adapted to slidably follow said guiding slot.

28. The car baby seat system according to claim 23, further comprising synchronizing means for causing a synchronized movement when approaching or leaving the loading/unloading state, in which transversal movement of the arm and rotation of the baby seat about said arm are simultaneously performed.

29. The car baby seat system according to claim 22, further comprising horizontal axial means at the distal end of said arm, for enabling rotation of the arm about a horizontal axis, thereby transferring the system between said storage state in which said arm is in an essentially vertical orientation and the baby seat is positioned within the trunk, and a normal use state in which the arm is in an essentially horizontal orientation and the baby seat is positioned within the passengers' space of the car.

* * * * *